US006058201A

United States Patent [19]

Sikes et al.

[11] Patent Number: 6,058,201

[45] **Date of Patent: *May 2, 2000**

[54] DYNAMIC REFLECTIVE DENSITY MEASURING AND CONTROL SYSTEM FOR A WEB PRINTING PRESS

[75] Inventors: Dale R. Sikes, Lake Zurich; Herman C. Gnuechtel, Arlington Heights, both of Ill.

[73] Assignee: Web Printing Controls Co., Inc., Lake Barrington, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/434,244

[22] Filed: May 4, 1995

[51] Int. Cl.[7] .......... G06K 9/00

[52] U.S. Cl. .......... 382/112; 250/559.07

[58] Field of Search .......... 382/112; 250/559.05, 250/559.06, 559.07, 559.08; 358/406

[56] References Cited

U.S. PATENT DOCUMENTS

| | | | |
|---|---|---|---|
| 4,003,660 | 1/1977 | Christie, Jr. et al. | 356/407 |
| 4,602,160 | 7/1986 | Mactaggart | 250/341.5 |
| 4,637,728 | 1/1987 | Kipphan et al. | 356/402 |
| 4,668,978 | 5/1987 | Gokita | 355/501 |
| 4,694,502 | 9/1987 | Ozawa et al. | 382/167 |
| 4,794,453 | 12/1988 | Gnuechtel et al. | 348/88 |
| 4,845,374 | 7/1989 | White et al. | 250/559.4 |
| 4,852,485 | 8/1989 | Brunner | 101/211 |
| 4,993,405 | 2/1991 | Takamura et al. | 348/65 |
| 5,025,676 | 6/1991 | Perretta | 74/441 |
| 5,043,904 | 8/1991 | Sikes et al. | 364/469.04 |
| 5,063,845 | 11/1991 | Perretta | 74/484 |
| 5,125,037 | 6/1992 | Lehtonen et al. | 382/112 |
| 5,155,005 | 10/1992 | Sato et al. | 430/257 |
| 5,182,652 | 1/1993 | Stephenson, III | 358/296 |
| 5,182,721 | 1/1993 | Kipphau et al. | 364/526 |
| 5,412,577 | 5/1995 | Sainio et al. | 364/469.03 |
| 5,517,575 | 5/1996 | Ladewski | 382/108 |

*Primary Examiner*—Von J. Couso
*Attorney, Agent, or Firm*—Greer, Burns & Crain, Ltd.

[57] ABSTRACT

A system for use with a web printing press for measuring the reflective density of printed ink in real time during high speed operation. The system digitizes images of color block sets of the web, analyzes the images to determine reflective density of cyan, magenta, yellow and black. The system compensates for light scattering, light discontinuities and strobe intensity variation.

59 Claims, 44 Drawing Sheets

DYNAMIC REFLECTIVE DENSITY MEASURING AND CONTROL SYSTEM FOR A WEB PRINTING PRESS

The present invention generally relates to a method and apparatus for measuring reflective density of predetermined areas printed patterns of ink and also for using the measurements to control the application of printing ink by the press.

Web printing presses of the type which print full color magazines and other printed material at high speeds generally have a number of printing stations, each of which prints a different color on the web as the web passes through the press. Such presses generally have multiple printing stations which generally print the colors cyan, magenta and yellow, as well as black. The quality of the printed matter is a function not only of the proper registration of each of the colors by the respective printing stations, but also by the amount of ink and its resultant pattern of distribution that is printed for each color by the printing stations.

The distribution of ink that is transferred to the web during a printing operation is fundamentally controlled by a number of ink zone control mechanisms, commonly referred to as "keys" that are spaced across the width of the printing press, typically at approximately every 1 to 2 inches, depending upon the press type, and these keys effectively determine zones that regulate the amount of ink that is available to be ultimately transferred to a web. For each color that is being printed, there may be very little or a relatively large amount of ink transferred at each key location of each printing station, depending upon the perceived color in the image that is printed. As is well known to those skilled in the art, a woman in a bright red dress that takes up a significant portion of the area of an impression would require a larger amount of magenta and yellow ink being applied at the magenta and yellow printing stations, since red is a combination of magenta and yellow. The keys in the area of the red dress would be controlled to provide more of such ink than in other areas of the impression being printed. As a general matter, the transfer of the ink being printed at each printing station is important to achieve the desired perceived color in the resulting product.

It has long been a practice in the operation of full color printing presses to print certain test targets of each color of ink in an area outside of the actual impressions, (e.g., a page of a magazine) for the purpose of qualifying the quality of the final finished product by measuring the reflective density of the final printed product using a small hand-held densitometer. Such densitometers give readings that range from approximately 0.5 to 2.5 with the larger number being substantially reduced reflectivity, i.e., black. Such densitometers are quite sensitive in their operation and must often be calibrated to give reliable reflective density readings. After a printing job has been set up, pressmen must take samples at periodic intervals during a press run and perform reflective density measurements to insure that the transfer of ink has not changed. If it has, then they make appropriate adjustments to the press to bring the measurements into conformance. It is also known in the art that adjustment of the press does not result in an immediate change in the transfer of ink. For example, adjustment of one ink key may have an effect on adjacent keys.

It has been recognized for many decades that it would be desirable to have a system that could measure the transfer of ink printed on a web by a printing press while the press is running. While there have been attempts to provide such a system, the attempts have not met with success because of the dynamic nature of web printing presses.

Accordingly, it is a primary object of the present invention to provide an improved system for measuring the quality of predetermined areas that are printed on a web by a high speed web printing press, with the measurements being made during operation of the printing press.

It is another object of the present invention to provide such an improved system which is operable to produce a reflective density value for each of several colors of ink while the press is operating at high speed, which reflective density values are accurate and reliable.

Another object is to provide such an improved reflective density measuring apparatus which utilizes a CCD matrix sensor and a strobe for acquiring matrix images of the web, including a test print area containing various types of blocks of the colors being printed by individual printing stations of a printing press and analyzing the acquired images to obtain the reflective density value for each of the blocks.

Still another object of the present invention is to provide such an improved apparatus which is capable of performing the reflective density analysis on the acquired pixel data on a real time basis, with the press running at high speed.

Yet another object of the present invention is to provide such an improved apparatus whereby test print areas are printed on the web which include color blocks of each color printed by a color station and wherein the test print areas are printed adjacent each of the key locations of the printing press so that separate reflective density values can be determined for each color at each key location thereby providing extremely reliable and accurate reflective density values. The test print area can include solid color blocks as well as screen color blocks, combination screen and solid color blocks and multiple solid color blocks that have been overprinted.

Another object of the present invention is to provide such an improved apparatus which acquires a pixel data image during operation of the press, splits the image into three separate channels of red, green and blue, digitizes and analyzes the resultant images for each channel to provide an accurate reflective density value for the colors of cyan, magenta, yellow and black that are printed.

Still another object of the present invention is to provide such an improved apparatus which is extremely reliable and accurate in determining reflective density values, because of the extremely sophisticated compensation and calibration techniques that are utilized by the apparatus. A corollary object lies in the provision for compensating for variation in intensity and color temperature of a particular strobe firing, as well as compensating for any discontinuity in distribution of light from the strobe on the web from which the image is acquired. Another corollary object lies in the provision for calibrating the digitizing portion of the apparatus to minimum and maximum reflectivity values using highly reflective i.e., white and highly nonreflective, i.e., black, certified standards to insure consistency of the calibration over time.

A related object lies in the provision for providing digitized images of the analog image acquired by a CCD matrix sensor and analyzing the digitized images on a pixel by pixel basis during various operations of the apparatus. Such analysis enables the apparatus to ignore dust spots and other blemishes on a virtually pixel by pixel basis during various analyses that are made by the apparatus, as well as provide geometric measurement of the size of shapes and screens contained in acquired images.

Other objects and advantages will become apparent upon reading the following detailed description, while referring to the attached drawings, in which.

Figure 12:
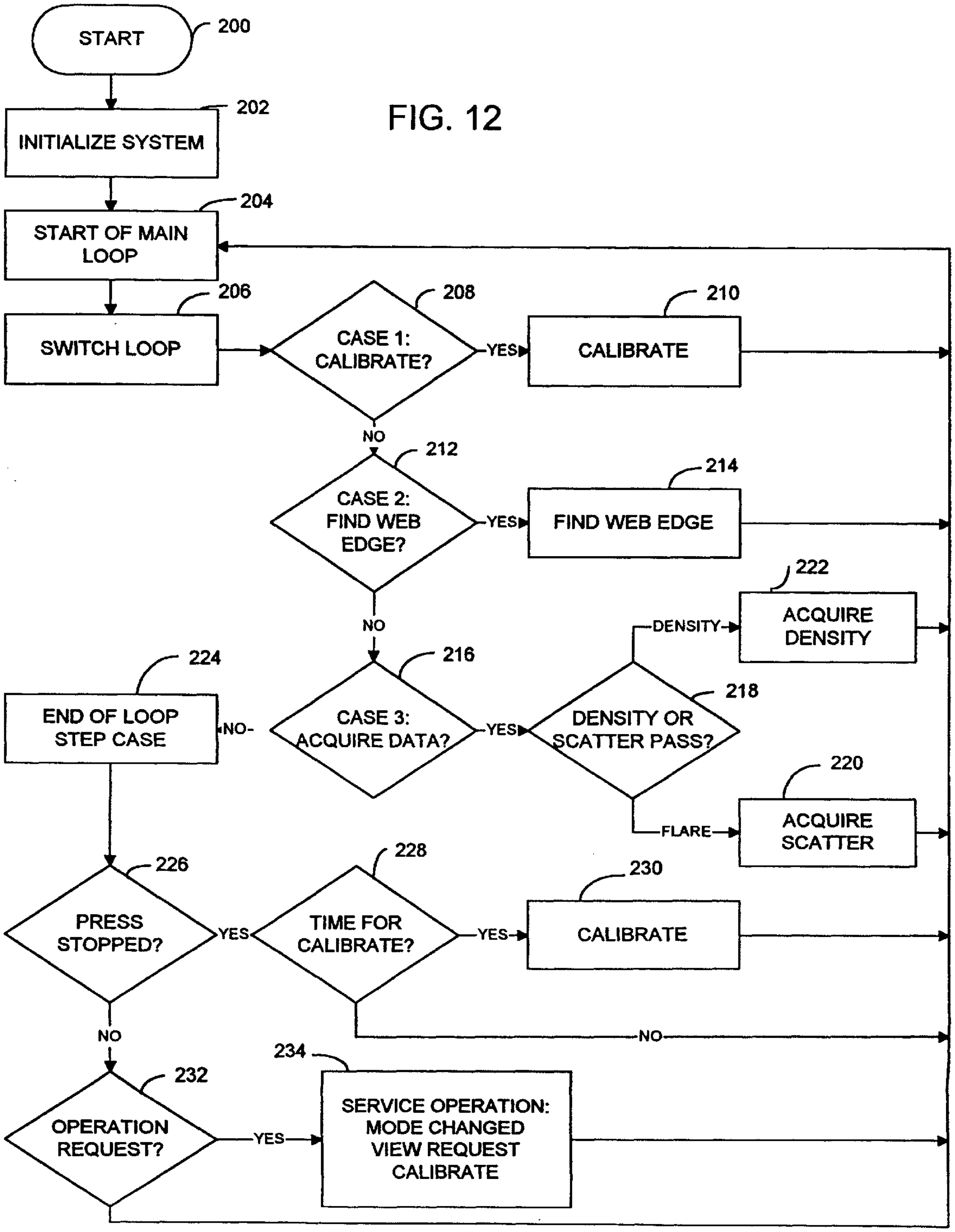
FIG. 12 is a flow chart illustrating the operation of the main image control program.
Figure 13A:
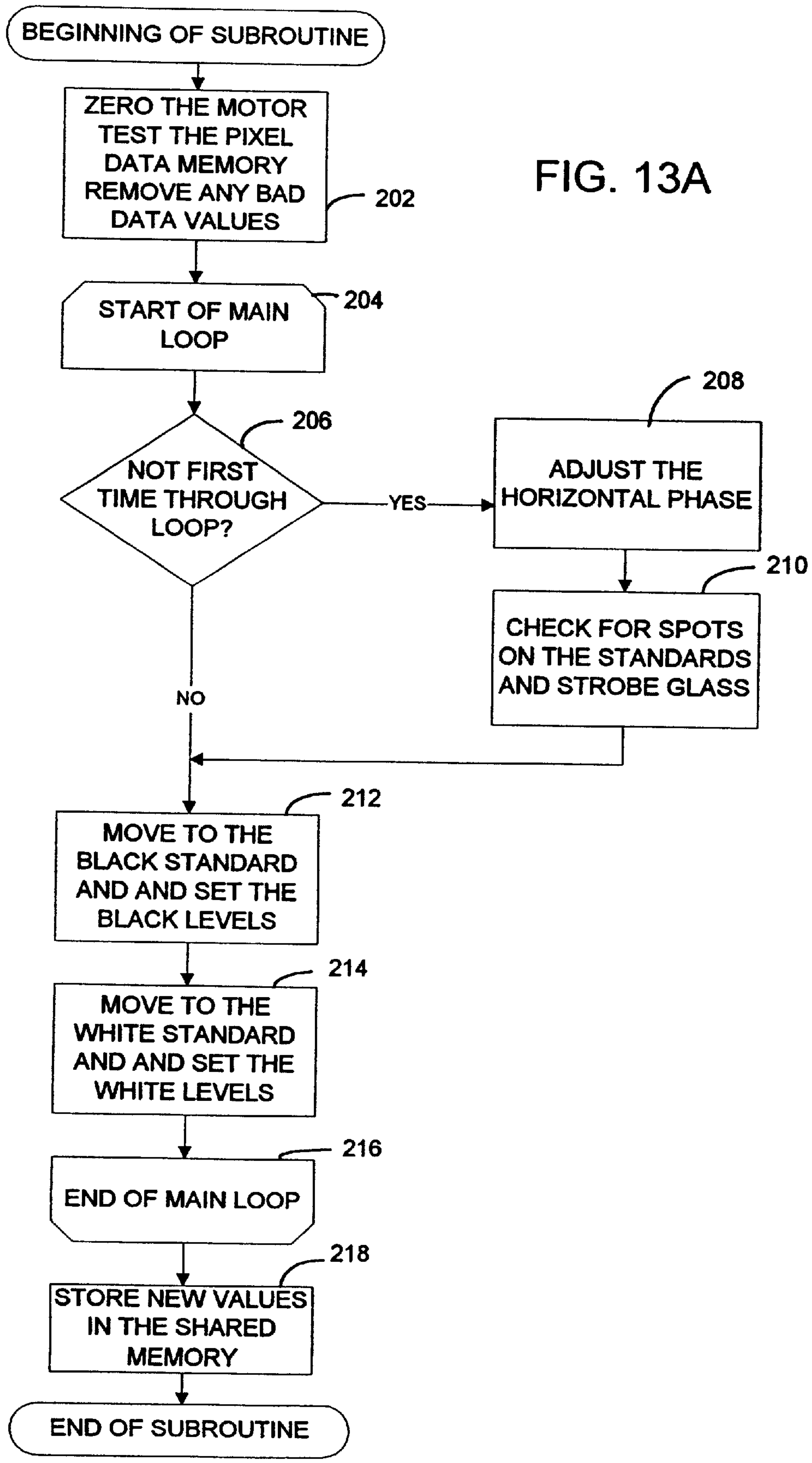
Figure 13B:
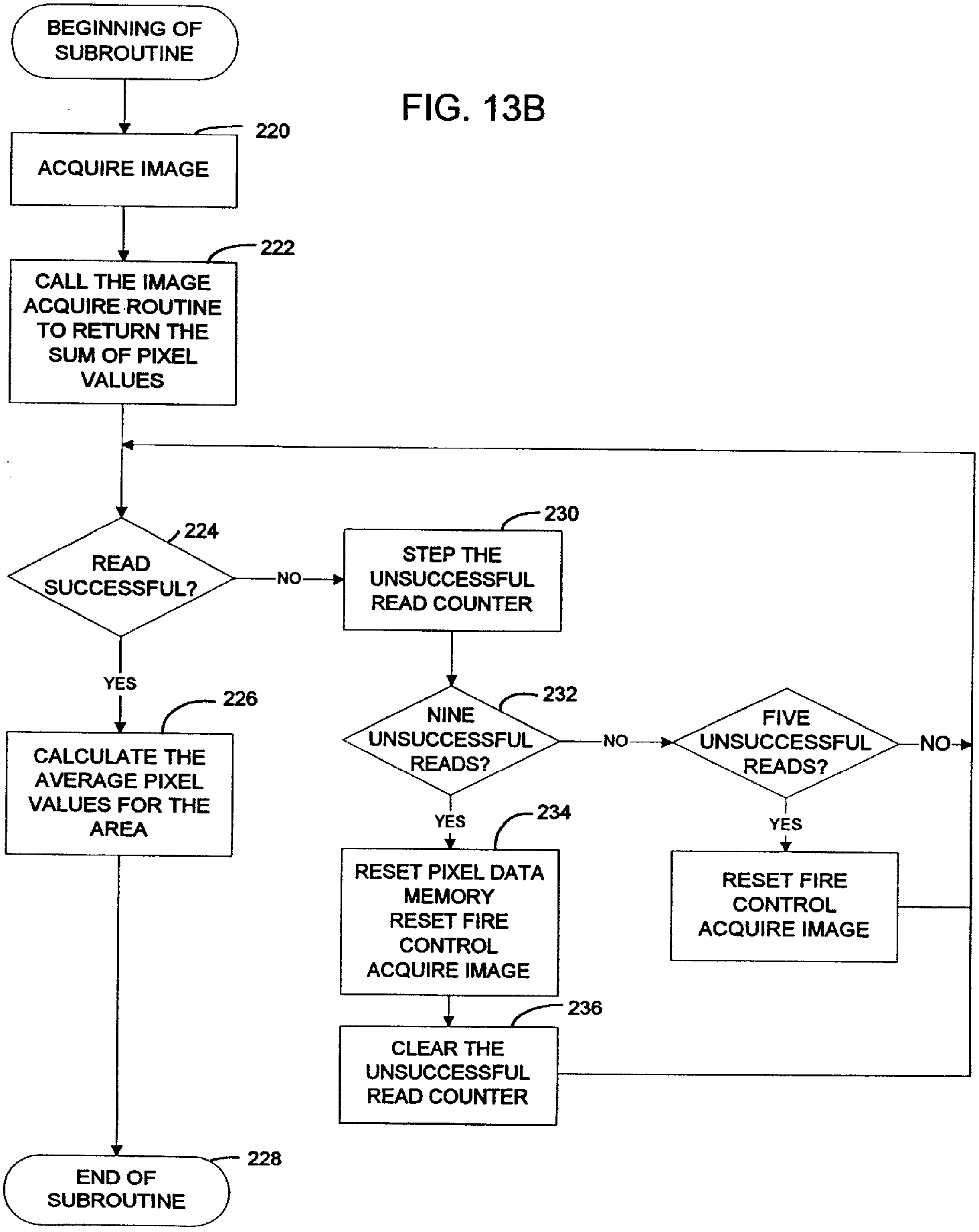
Figure 13C:
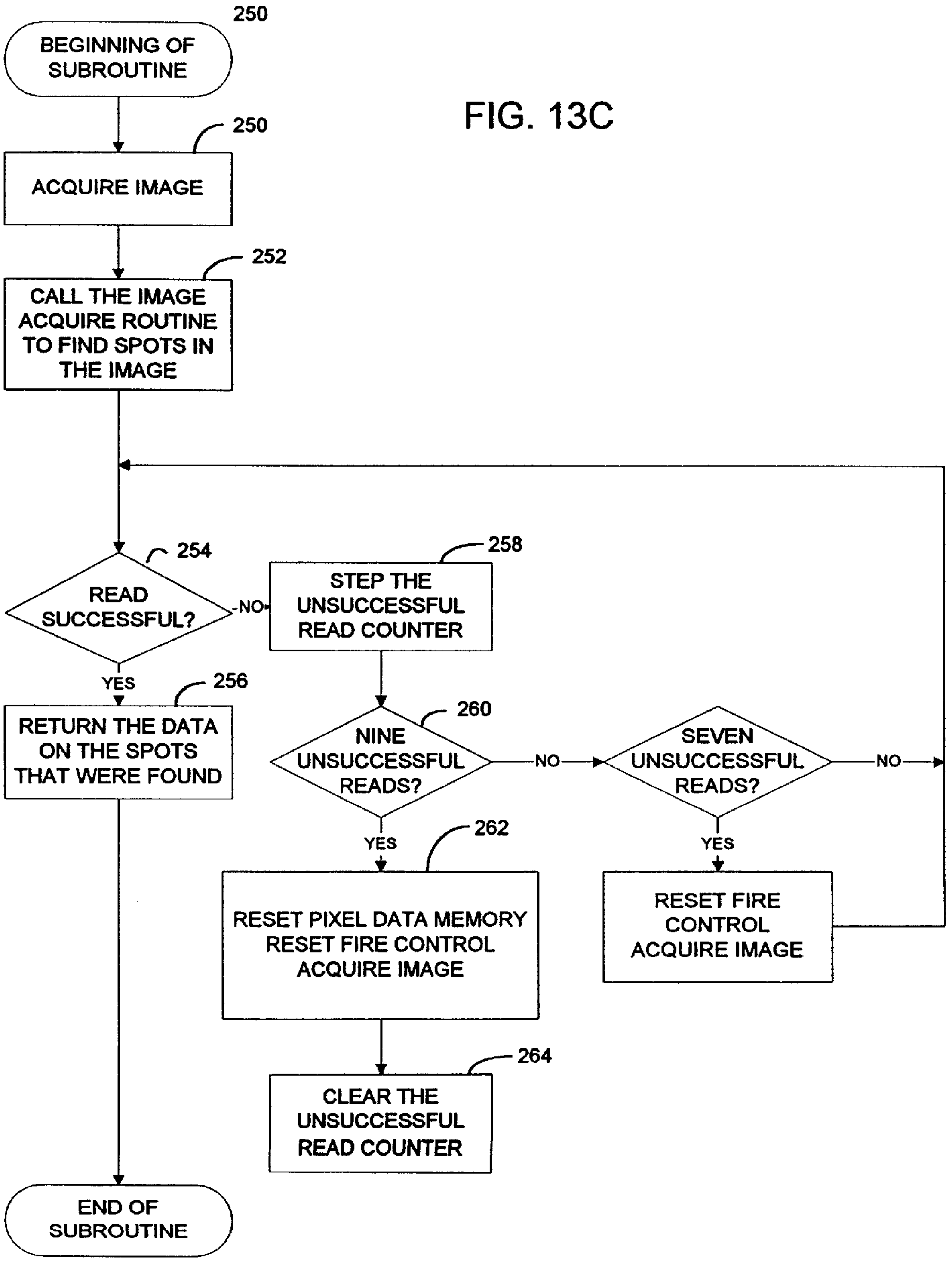
Figure 14:
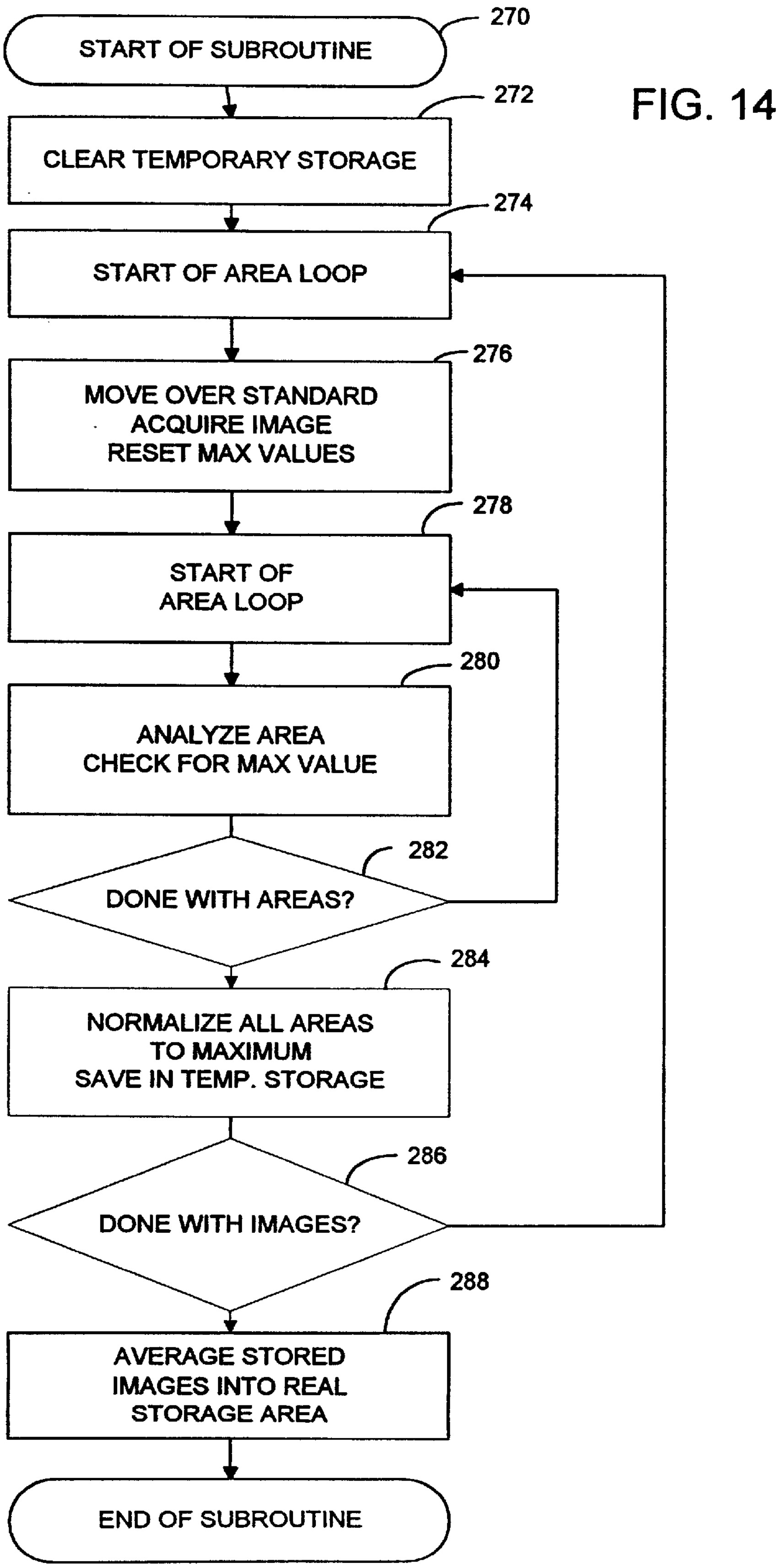
Figure 15A:
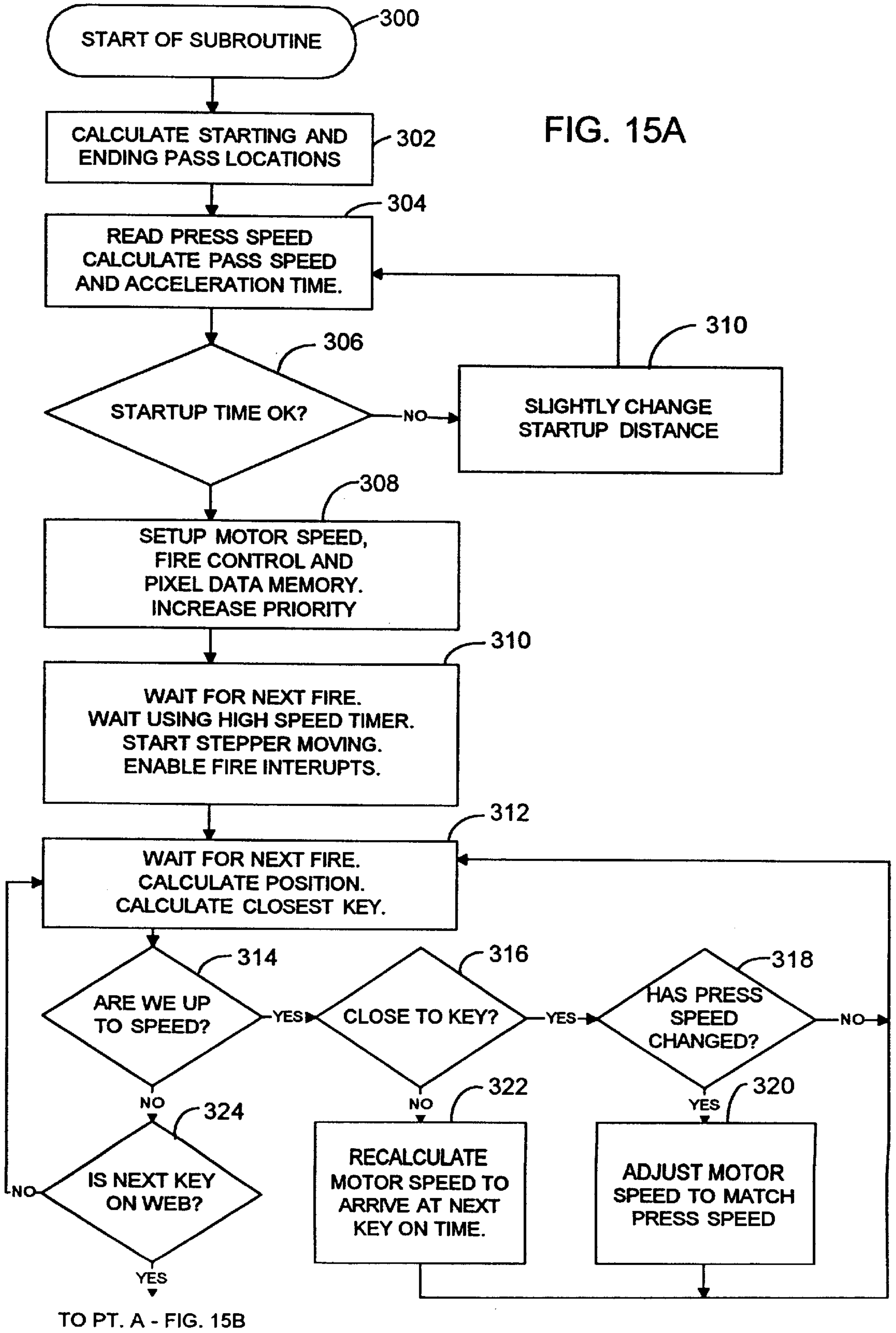
Figure 15B:
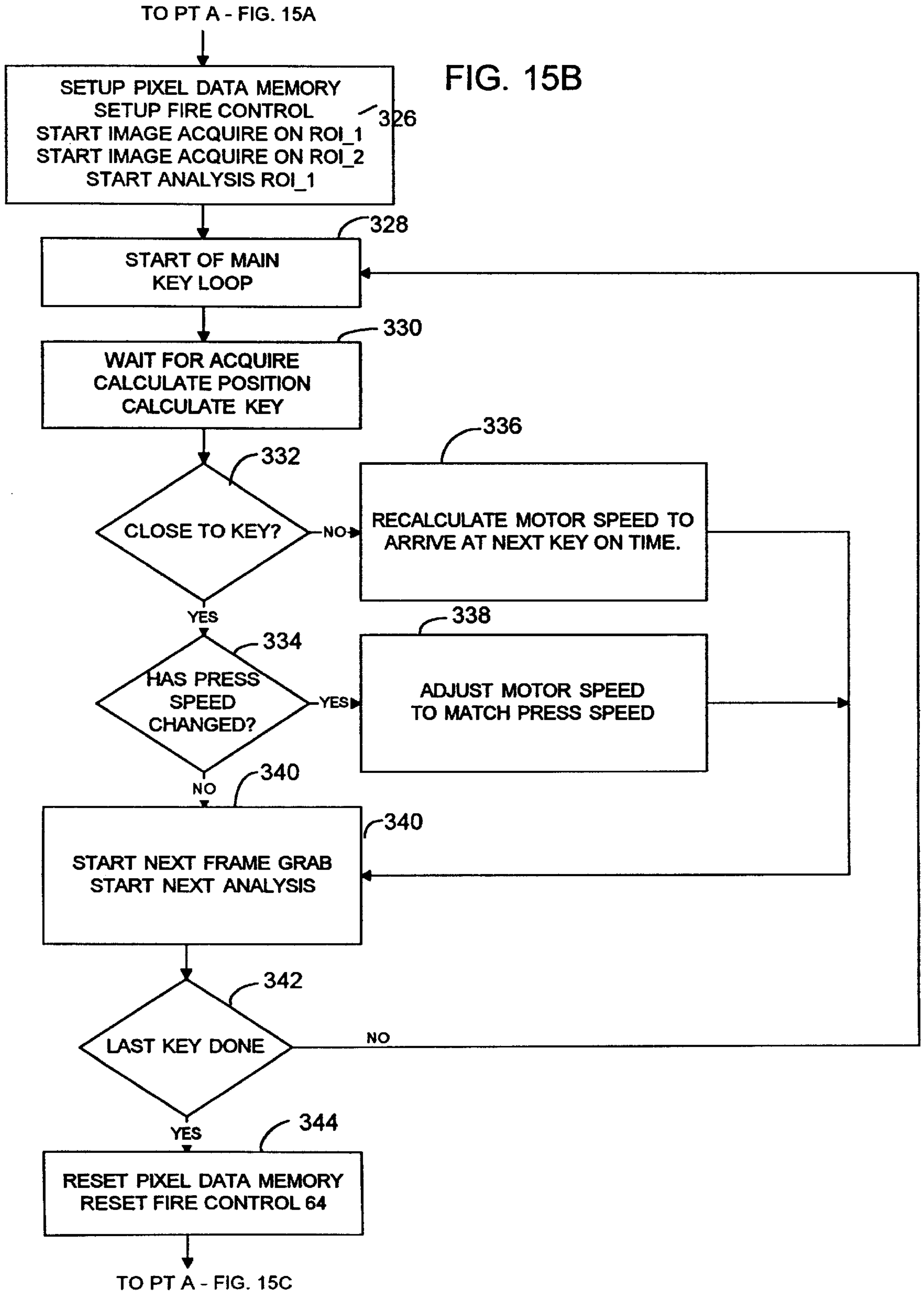
Figure 15C:
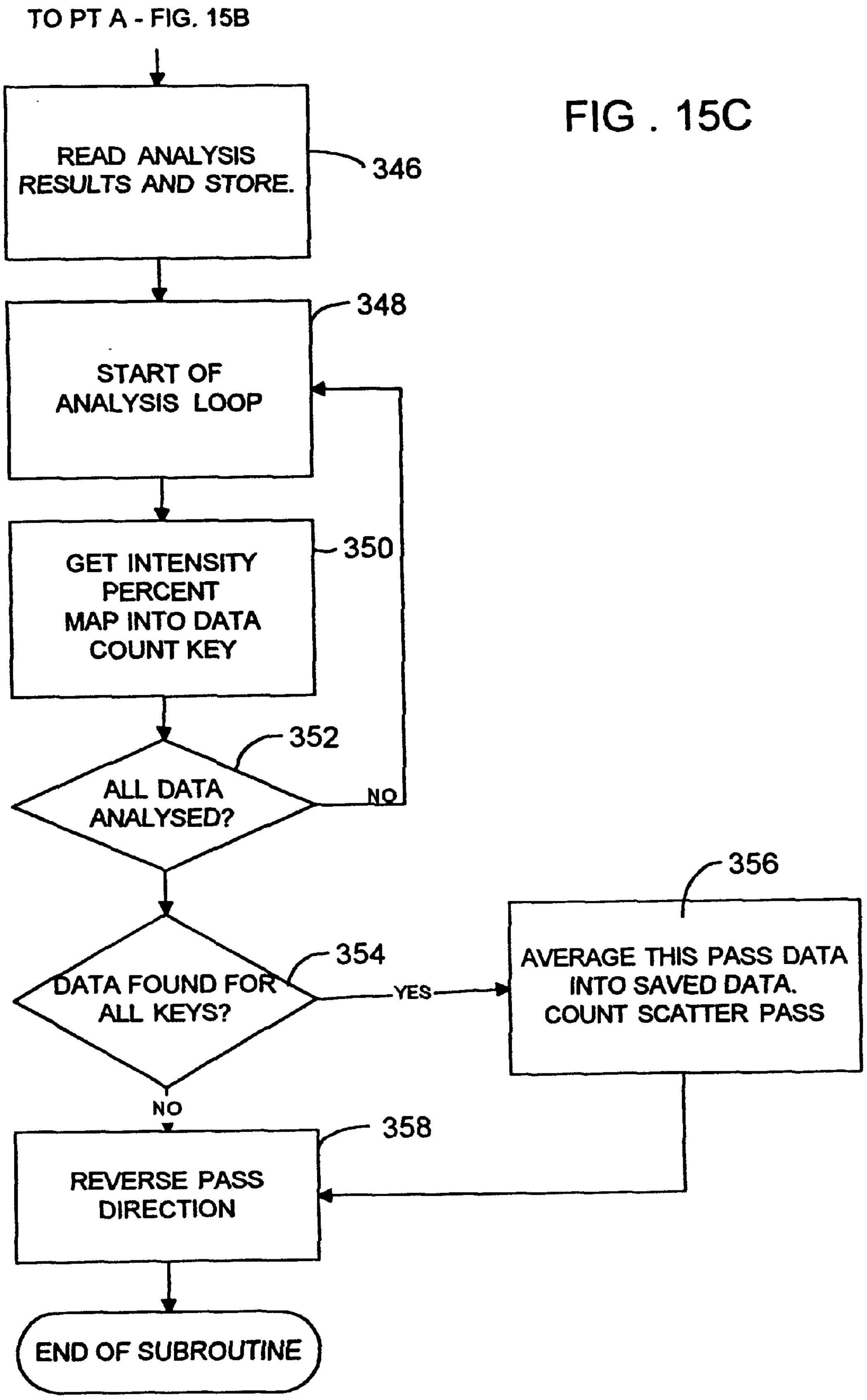
Figure 16A:
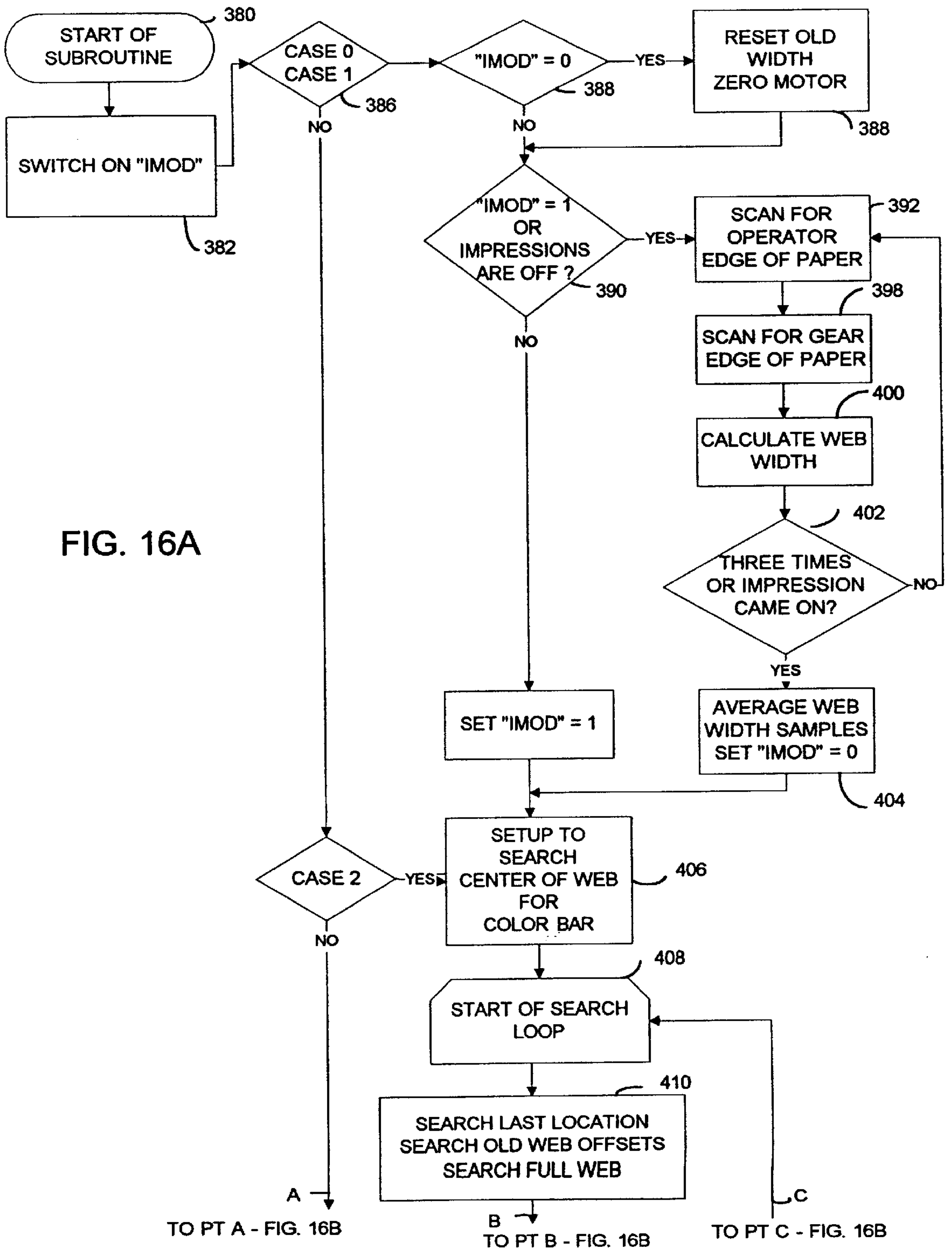
Figure 16B:
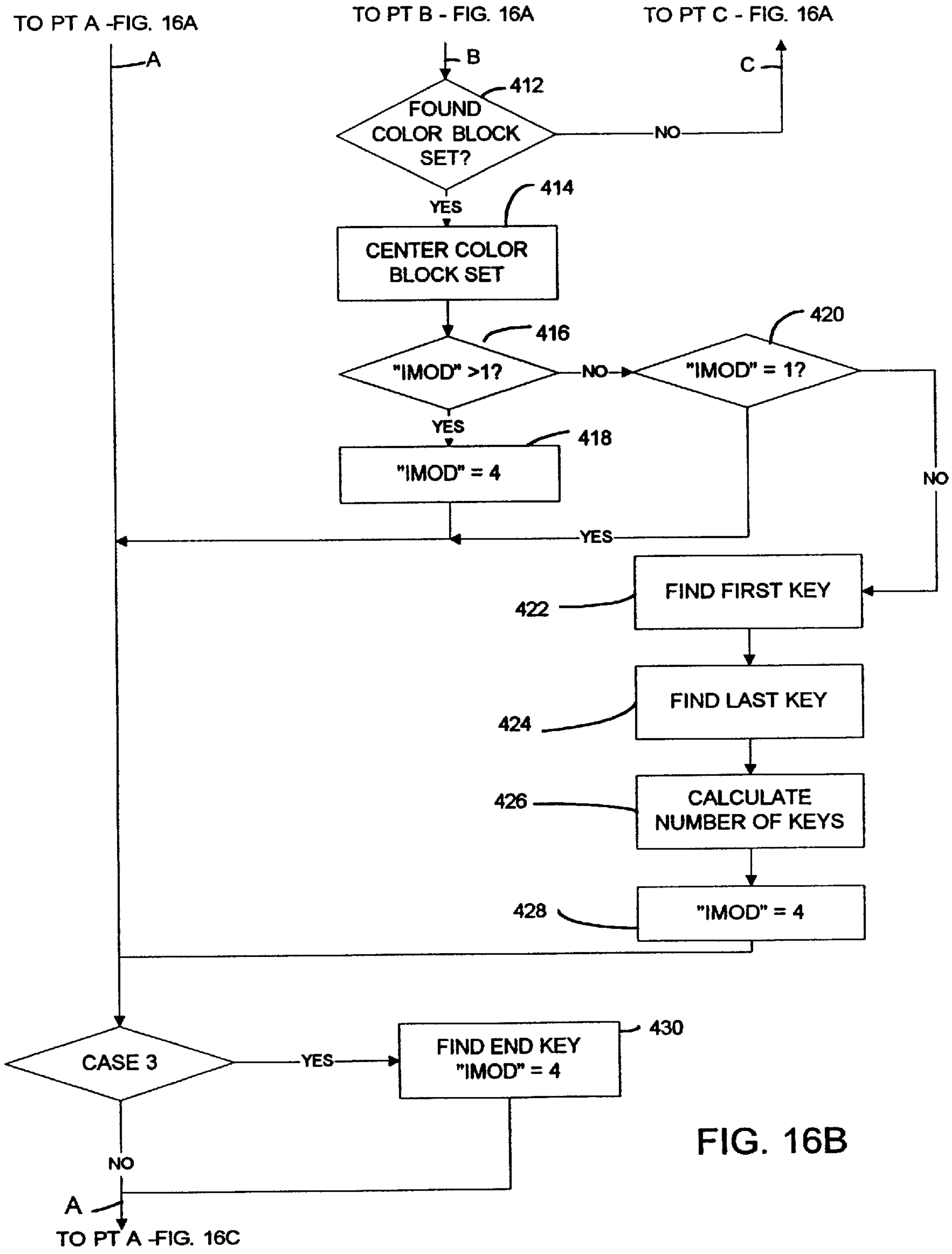
Figure 16C:
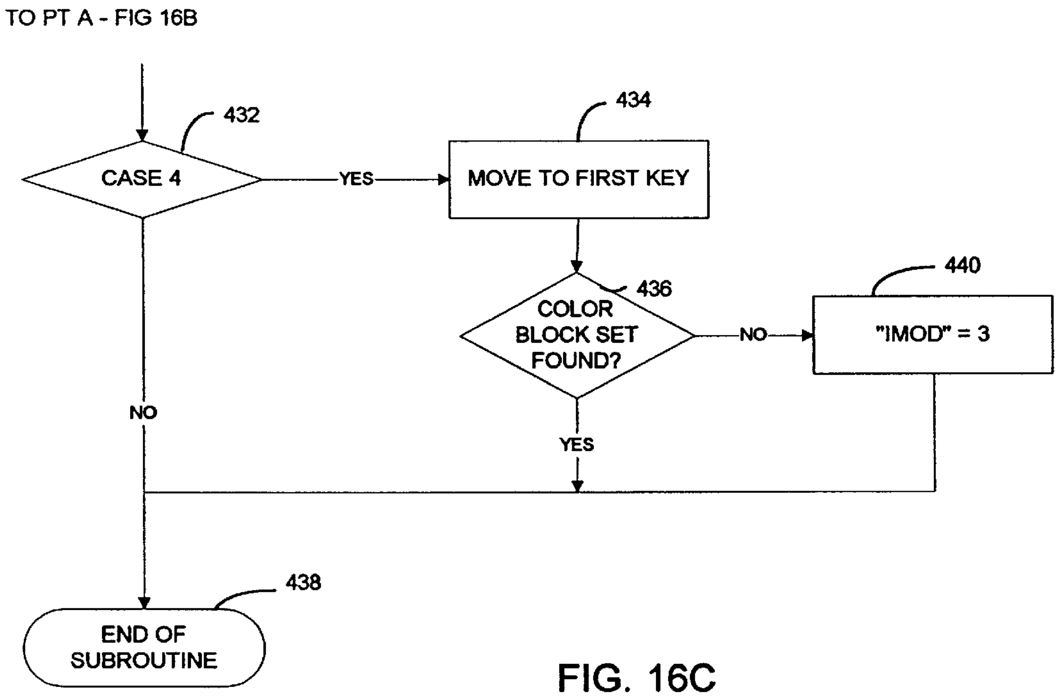
Figure 17A:
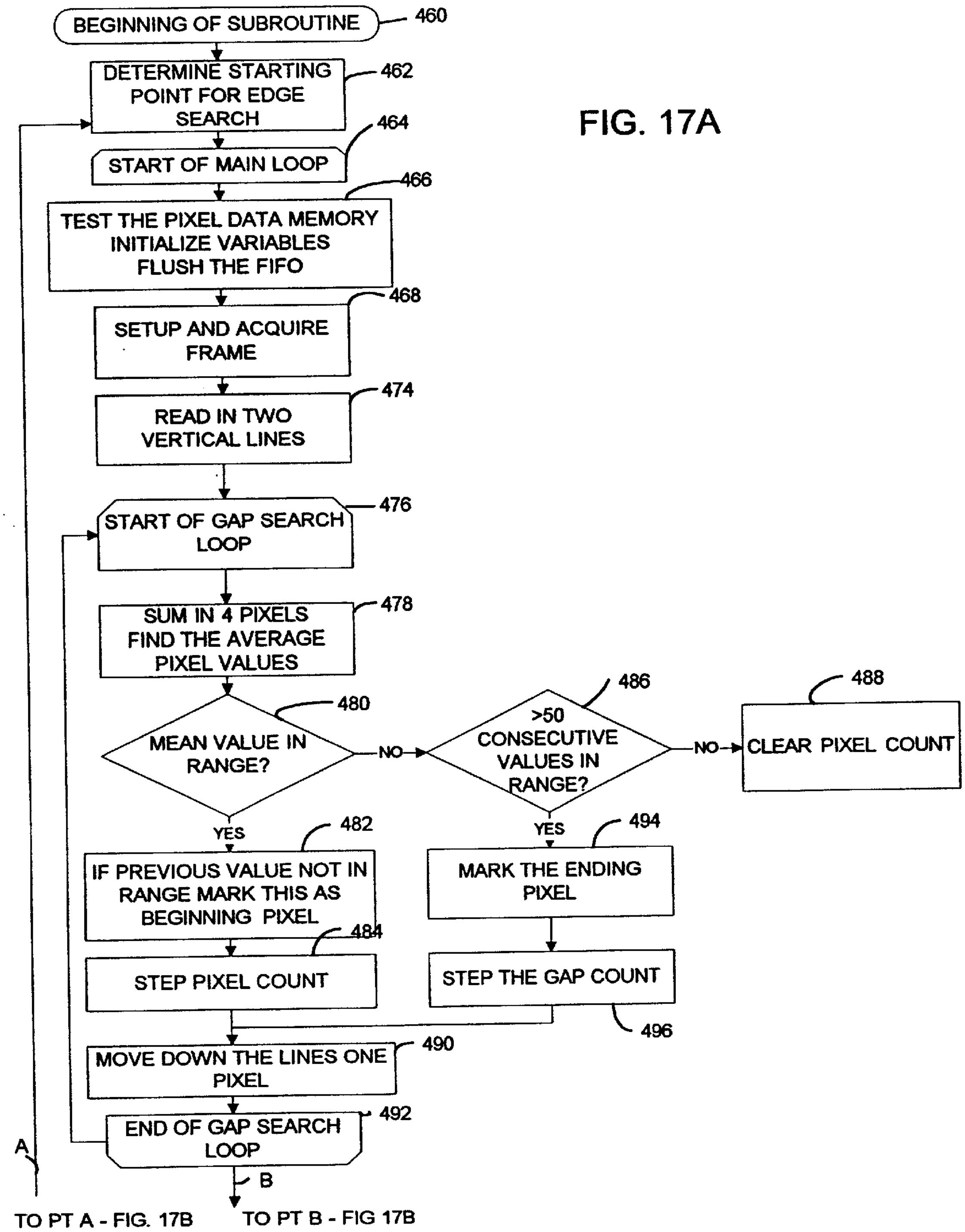
Figure 17B:
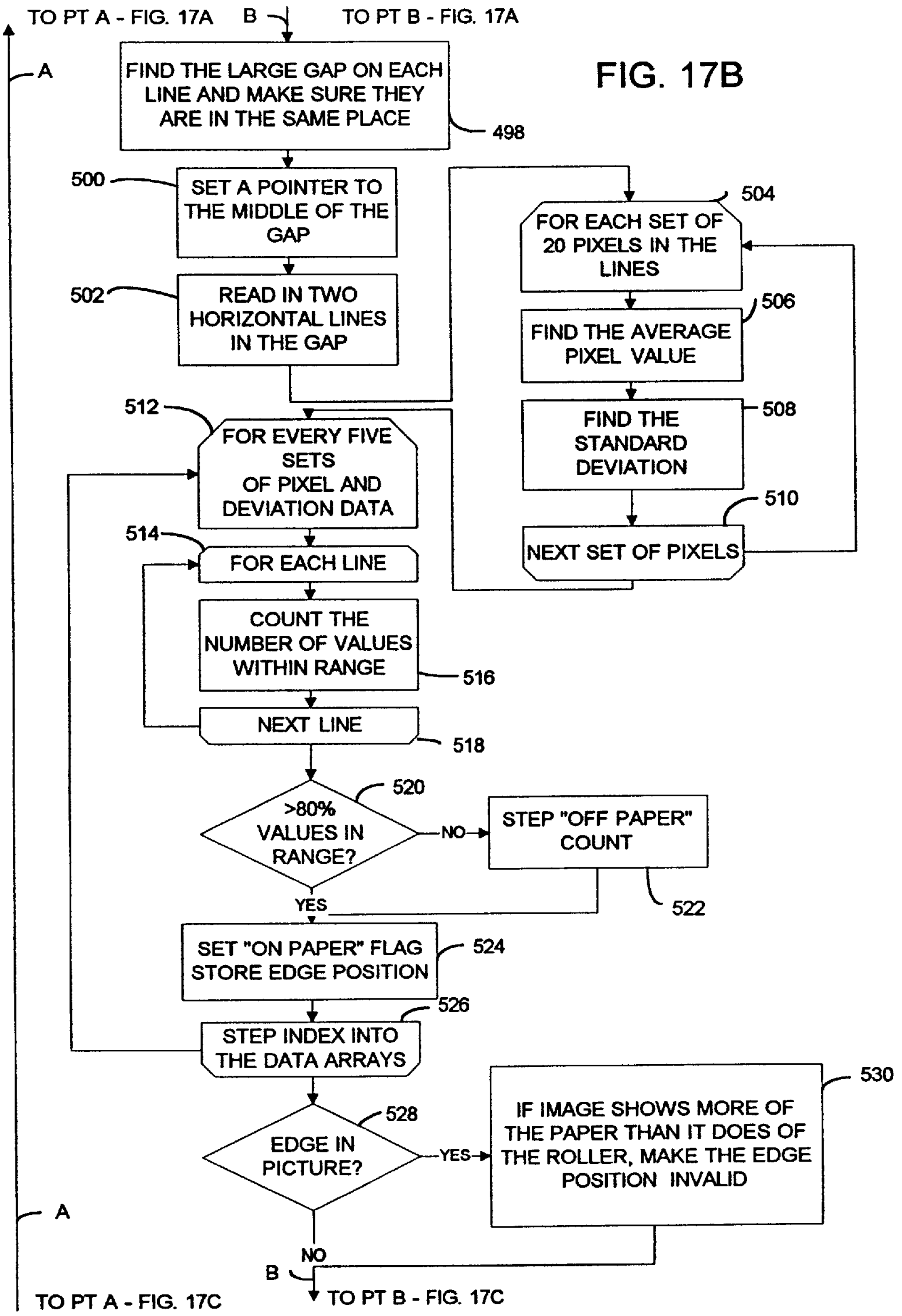
Figure 17C:
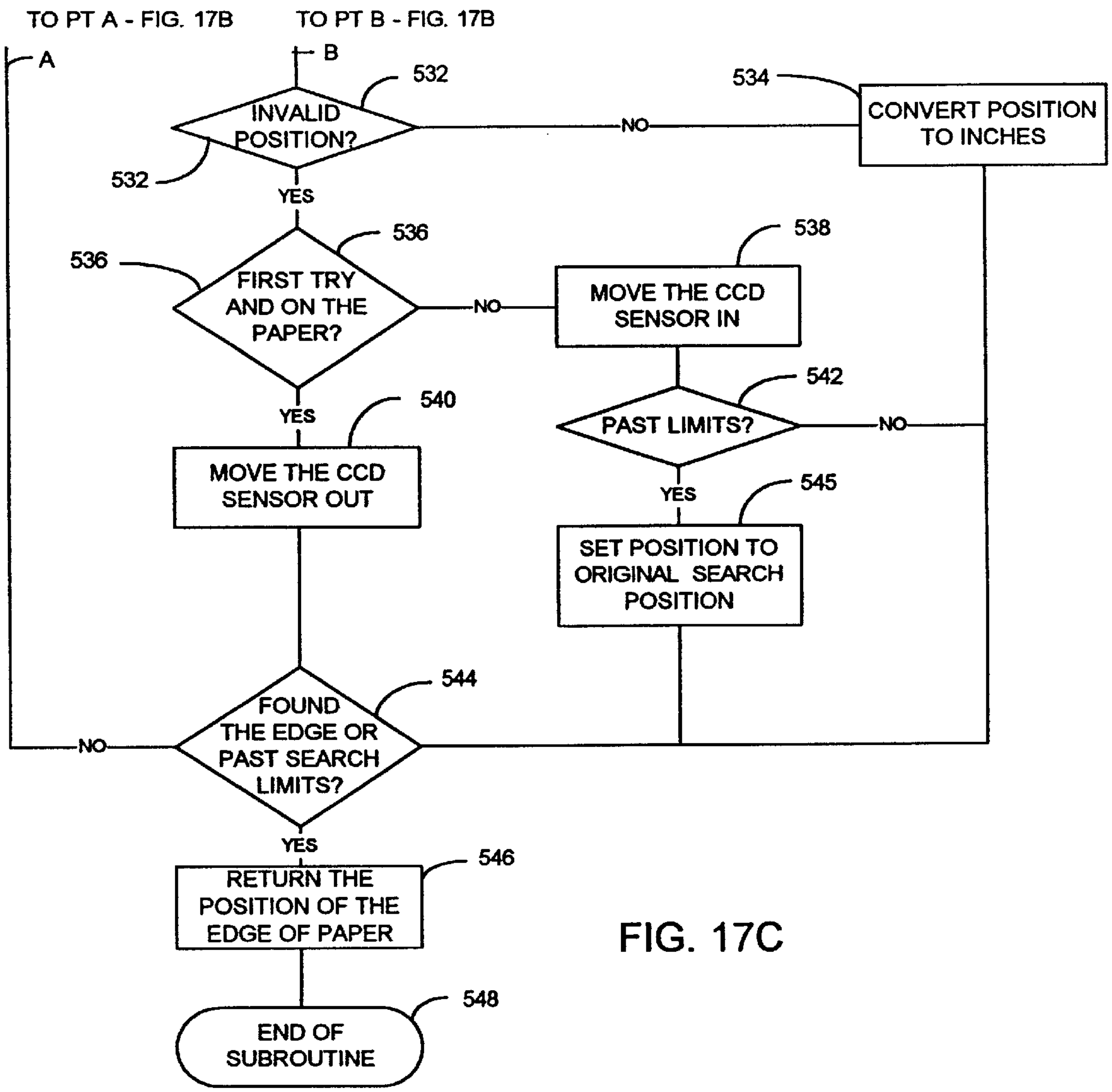
Figure 18A:
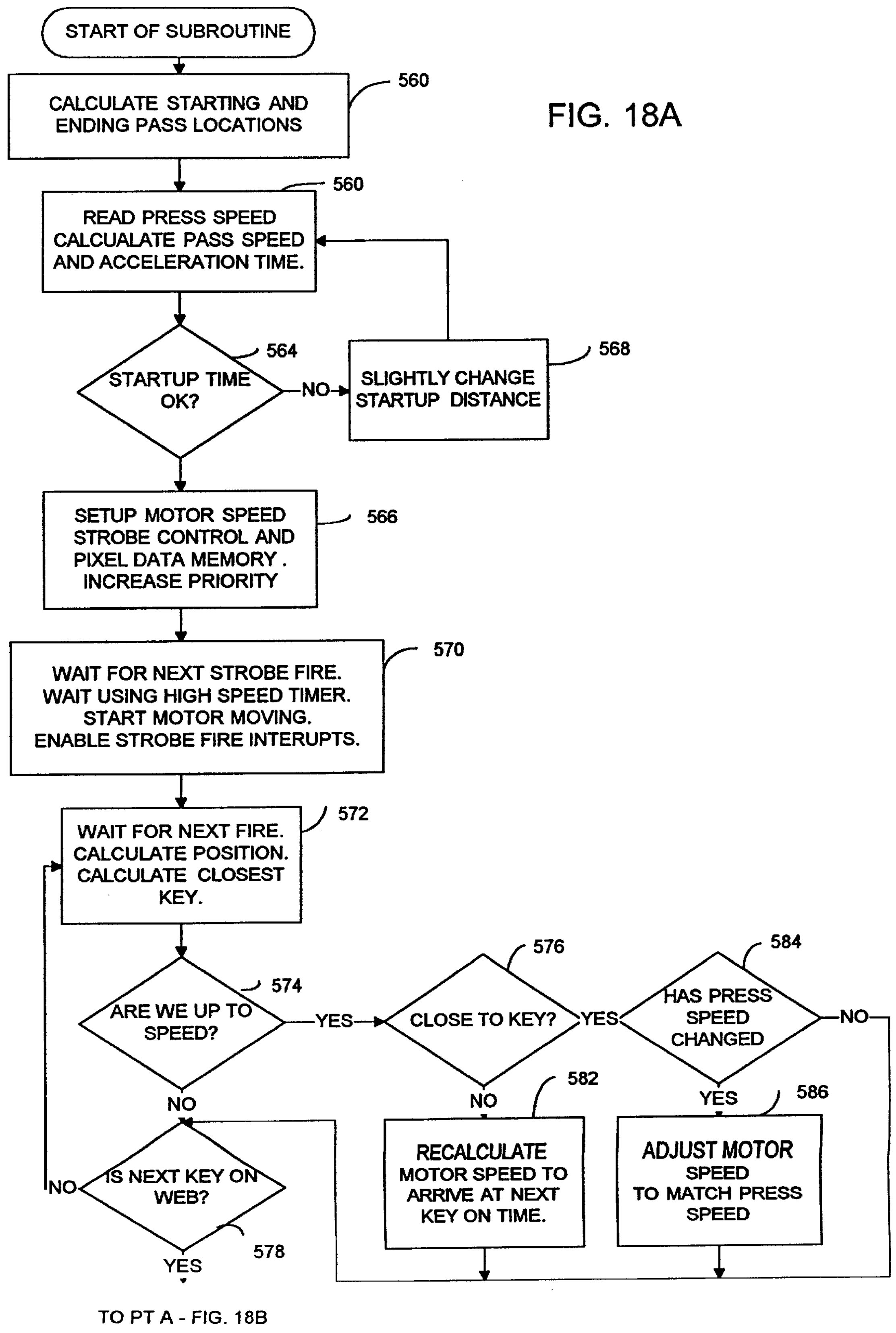
Figure 18B:
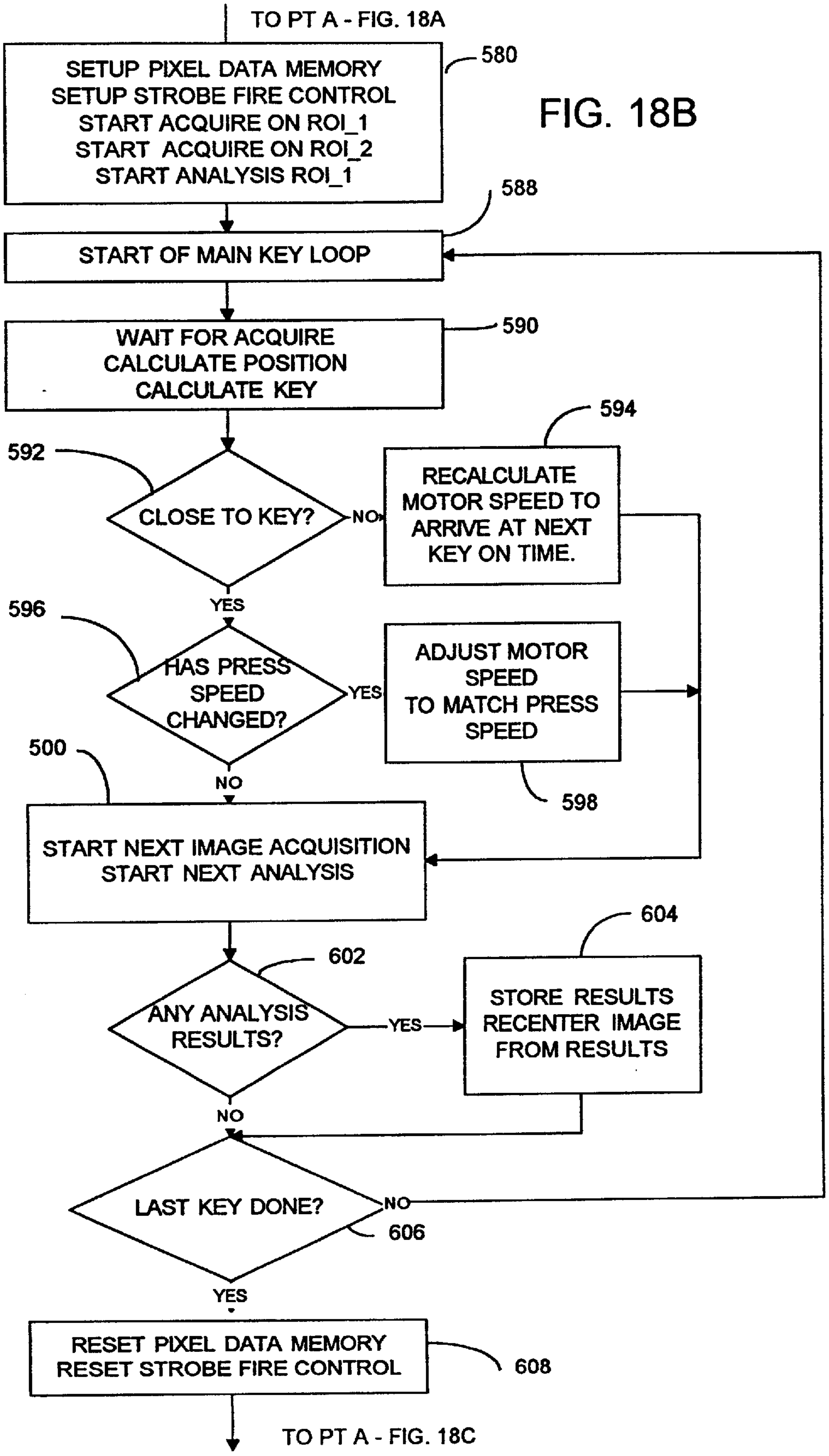
Figure 18C:
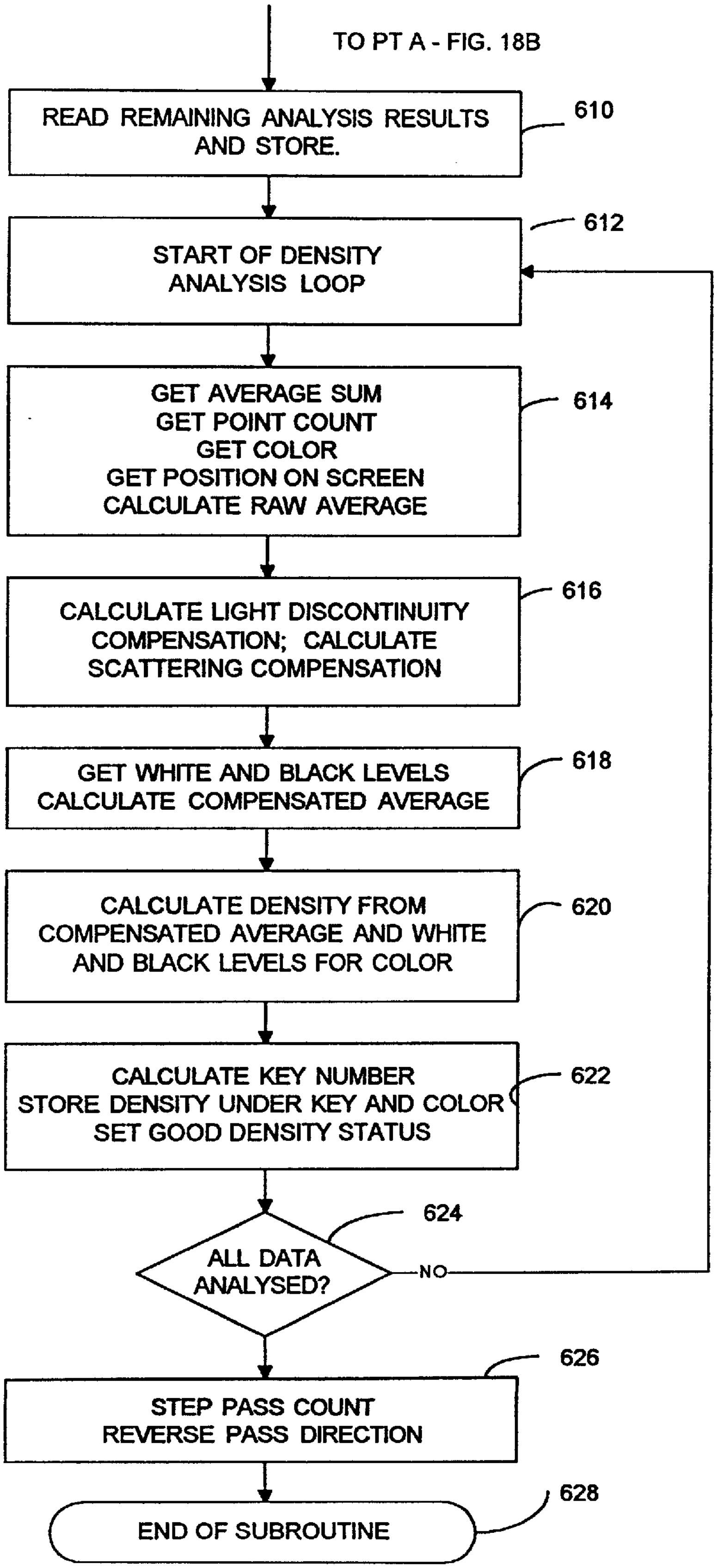
Figure 19A:
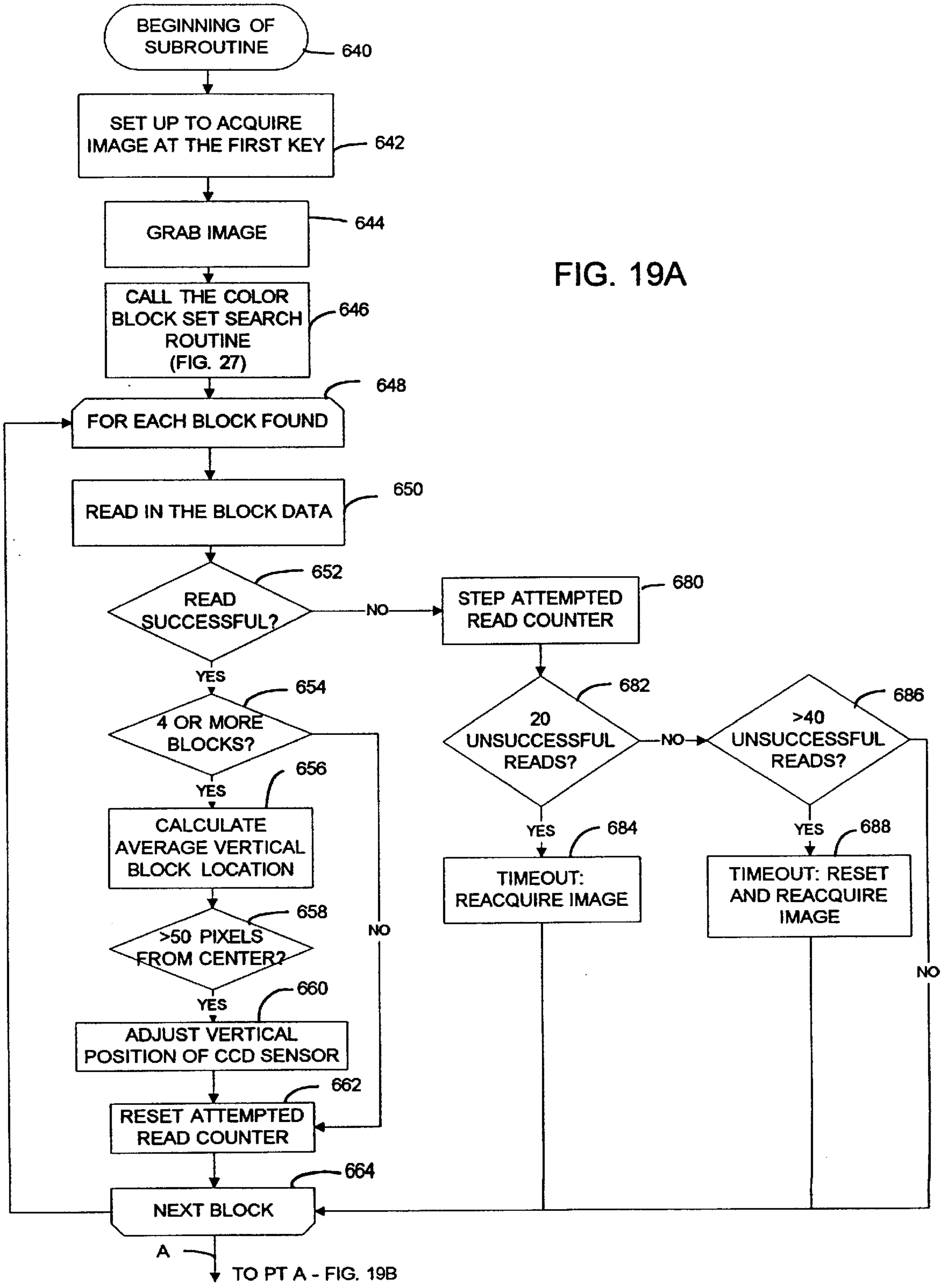
Figure 19B:
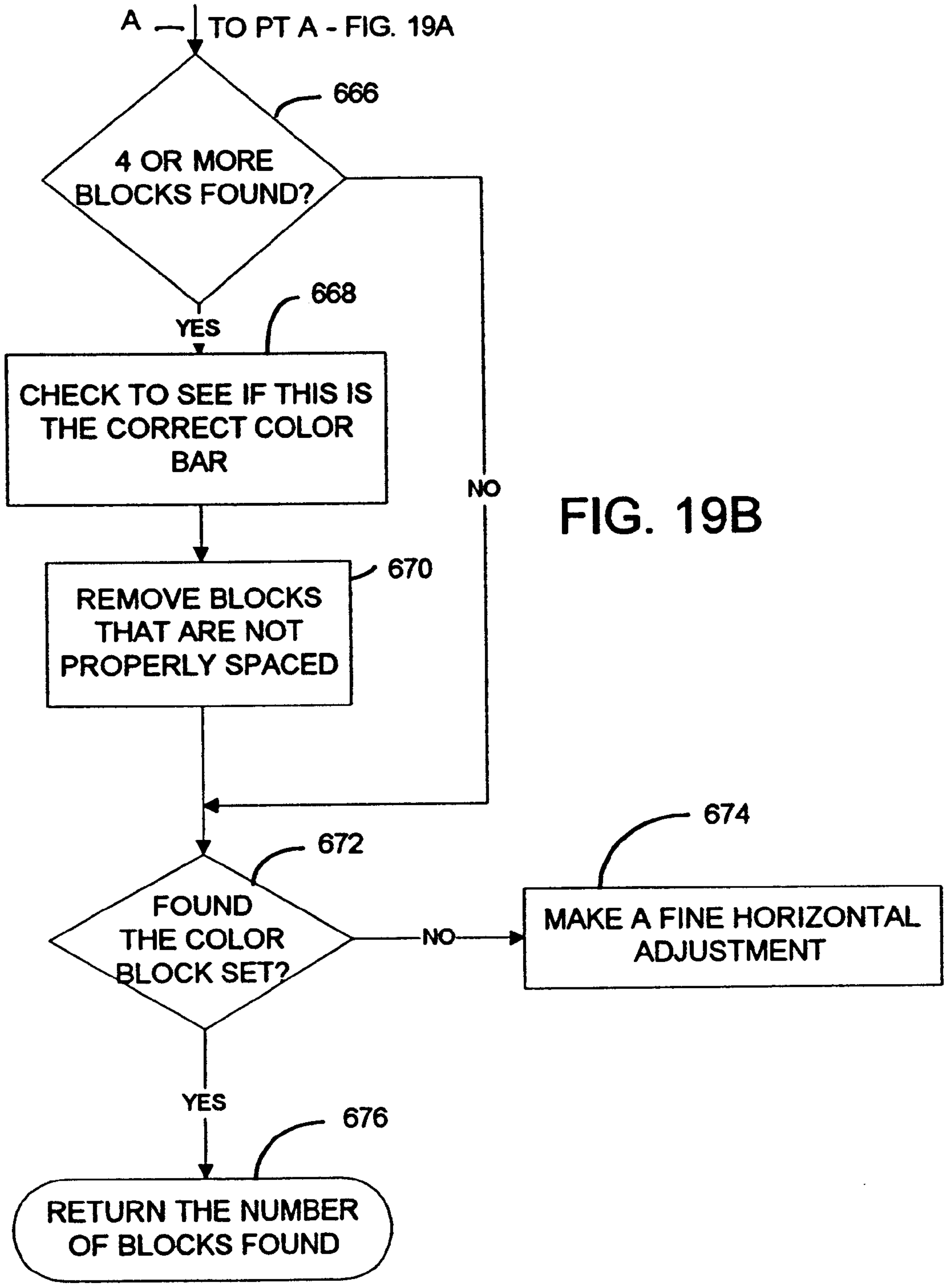
Figure 20A:
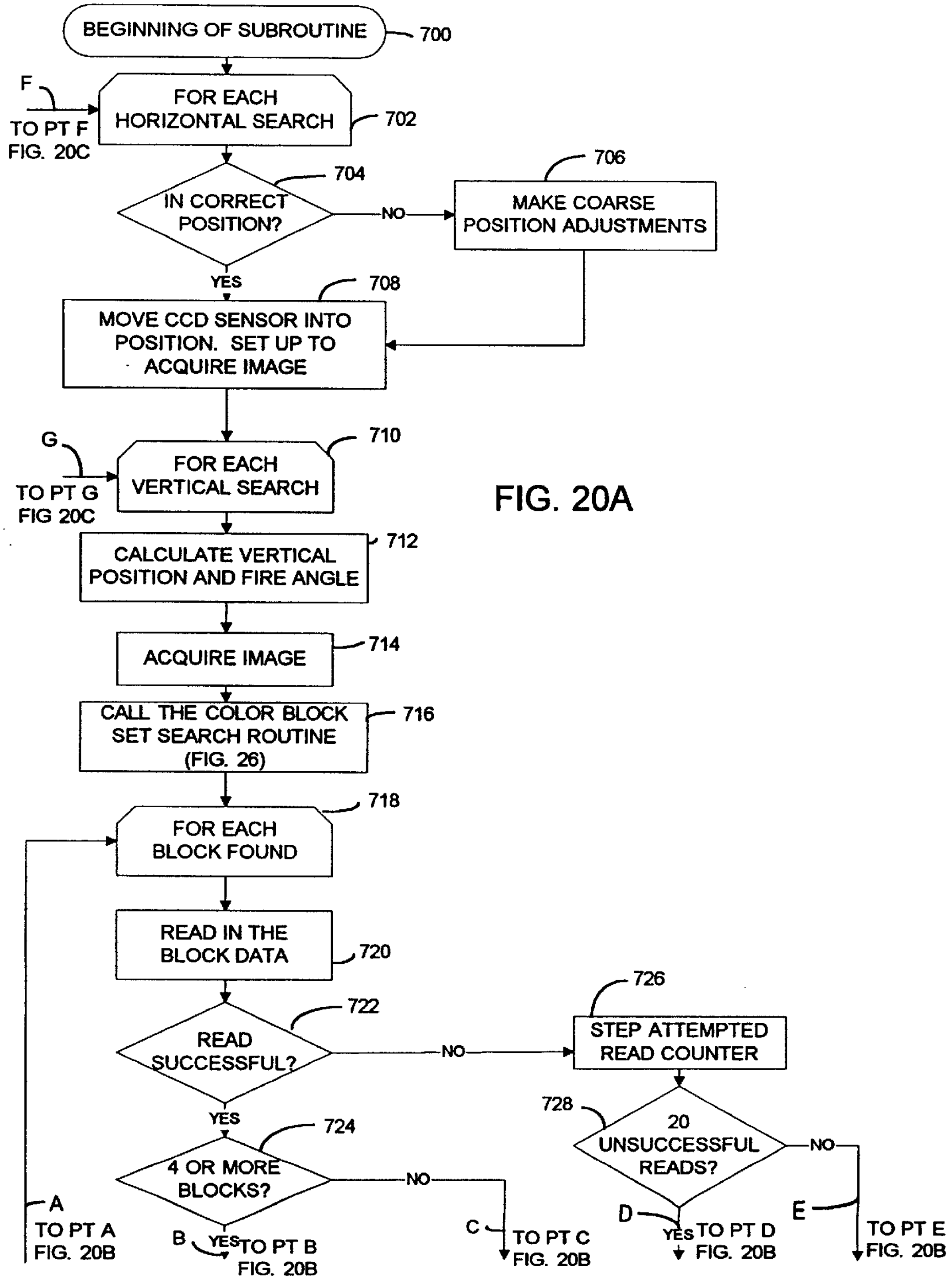
Figure 20B:
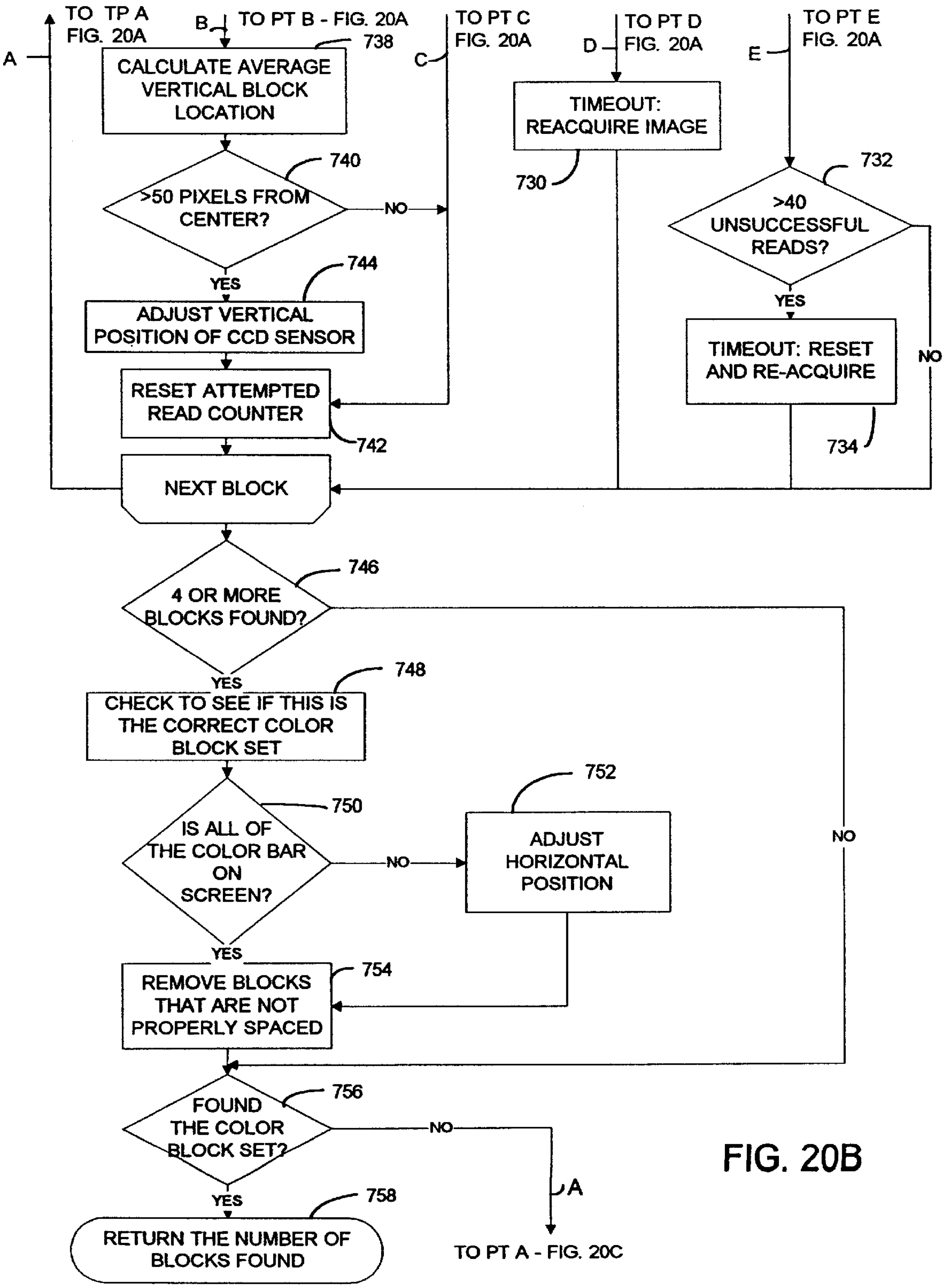
Figure 20C:
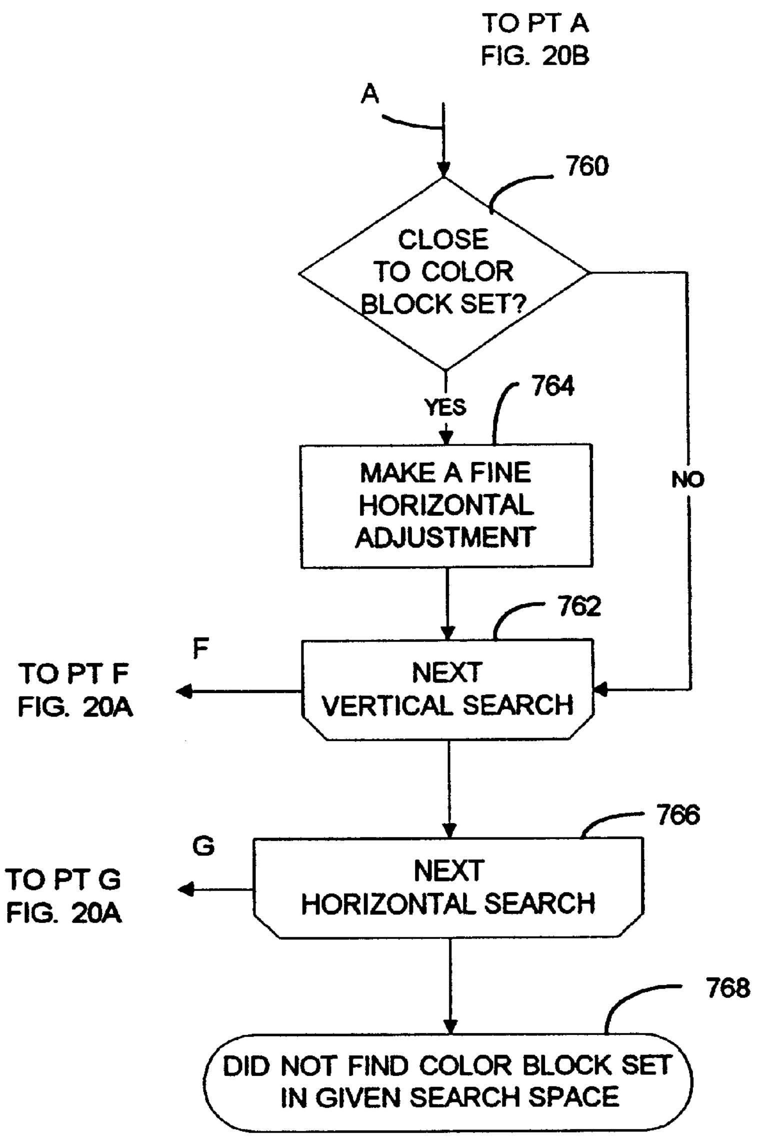
Figure 21A:
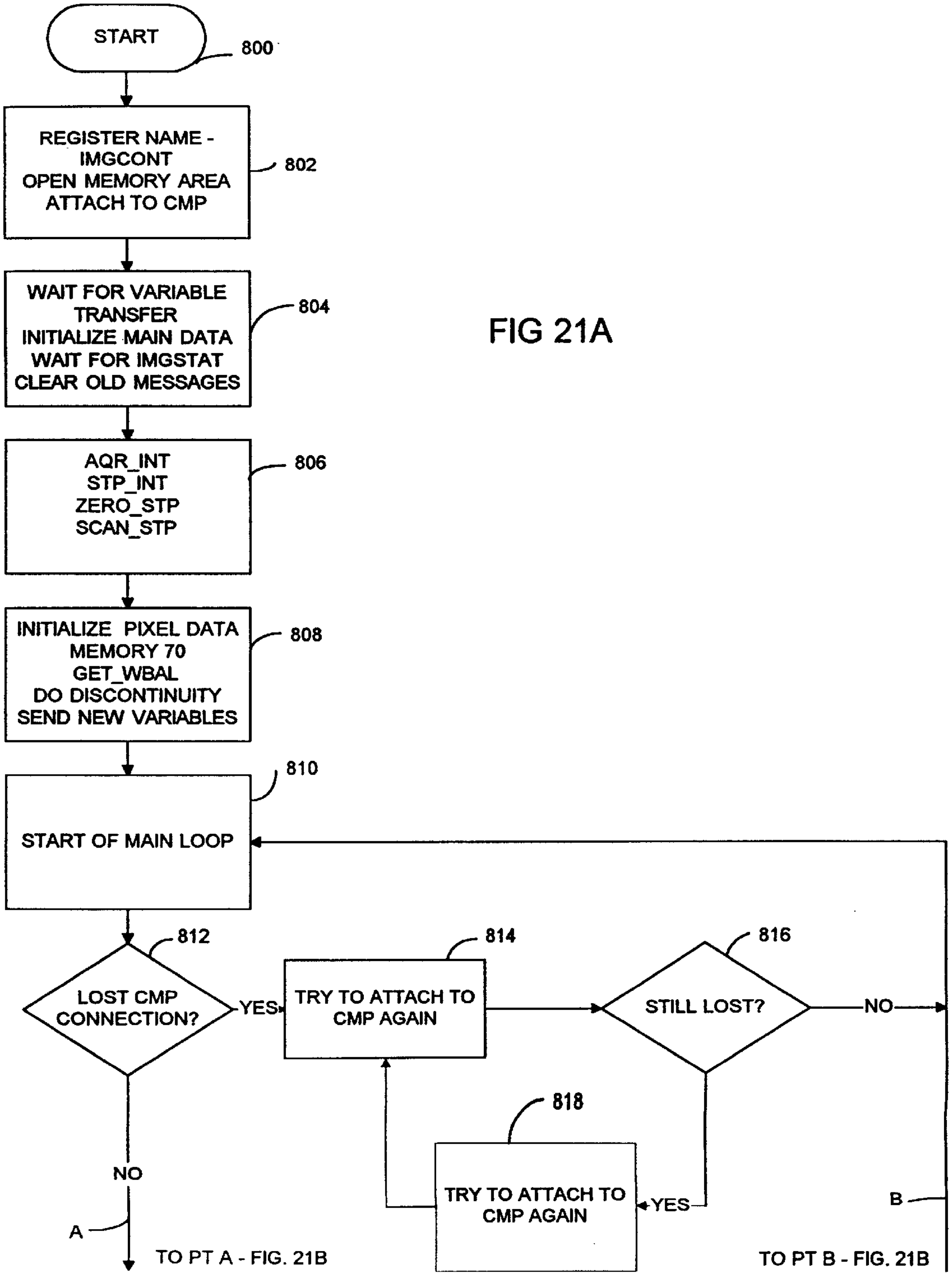
Figure 21B:
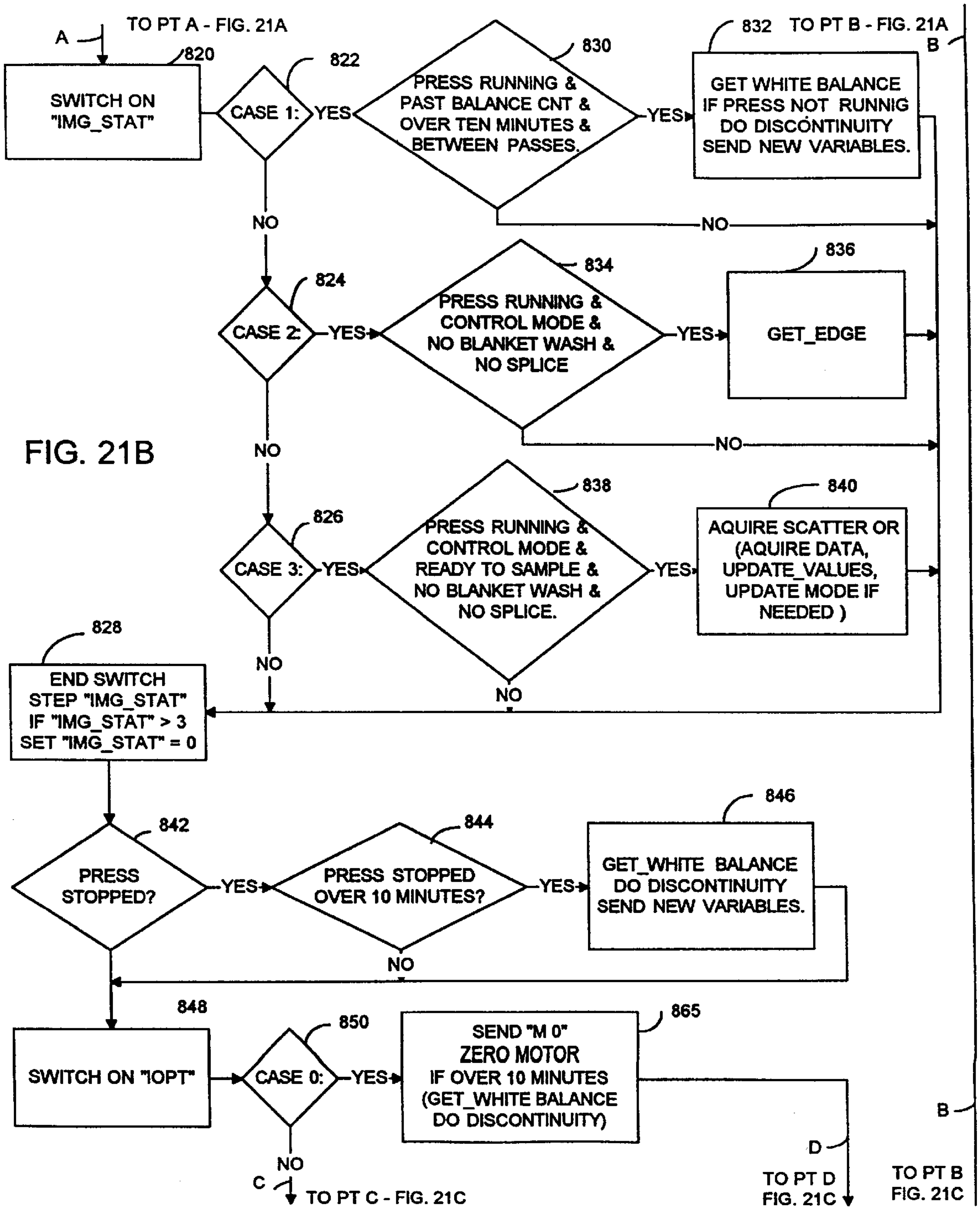
Figure 21C:
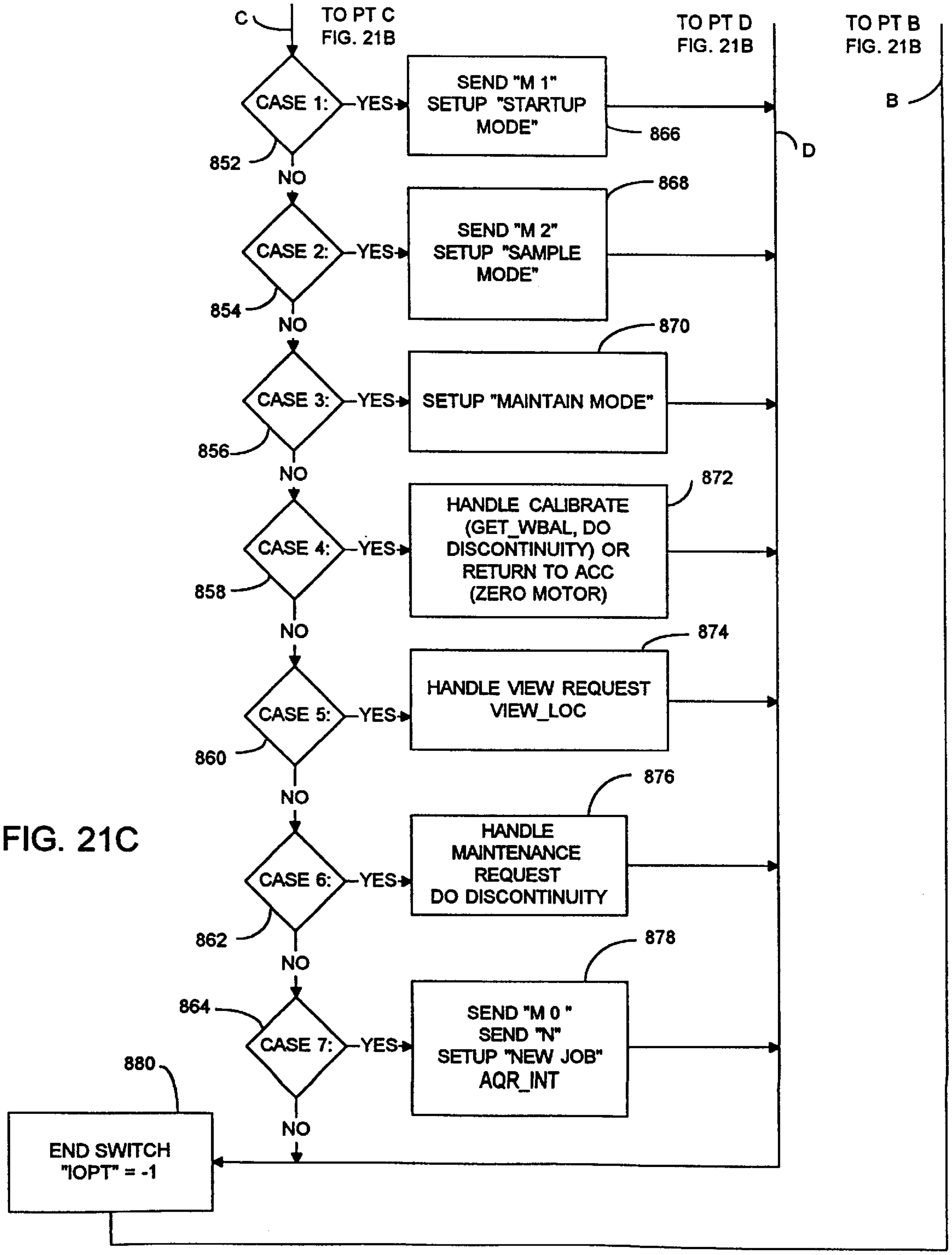
Figure 22A:
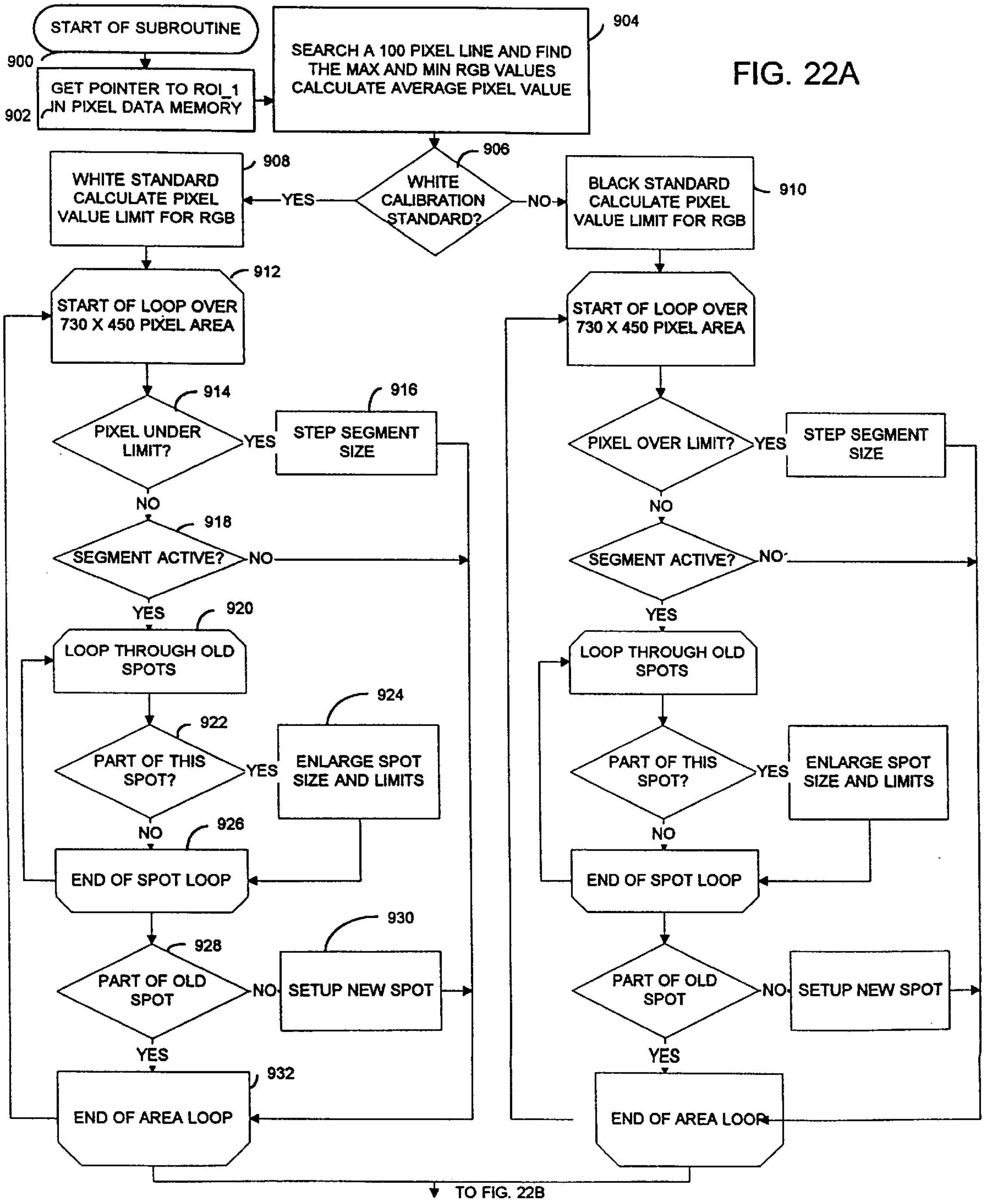
Figure 24:
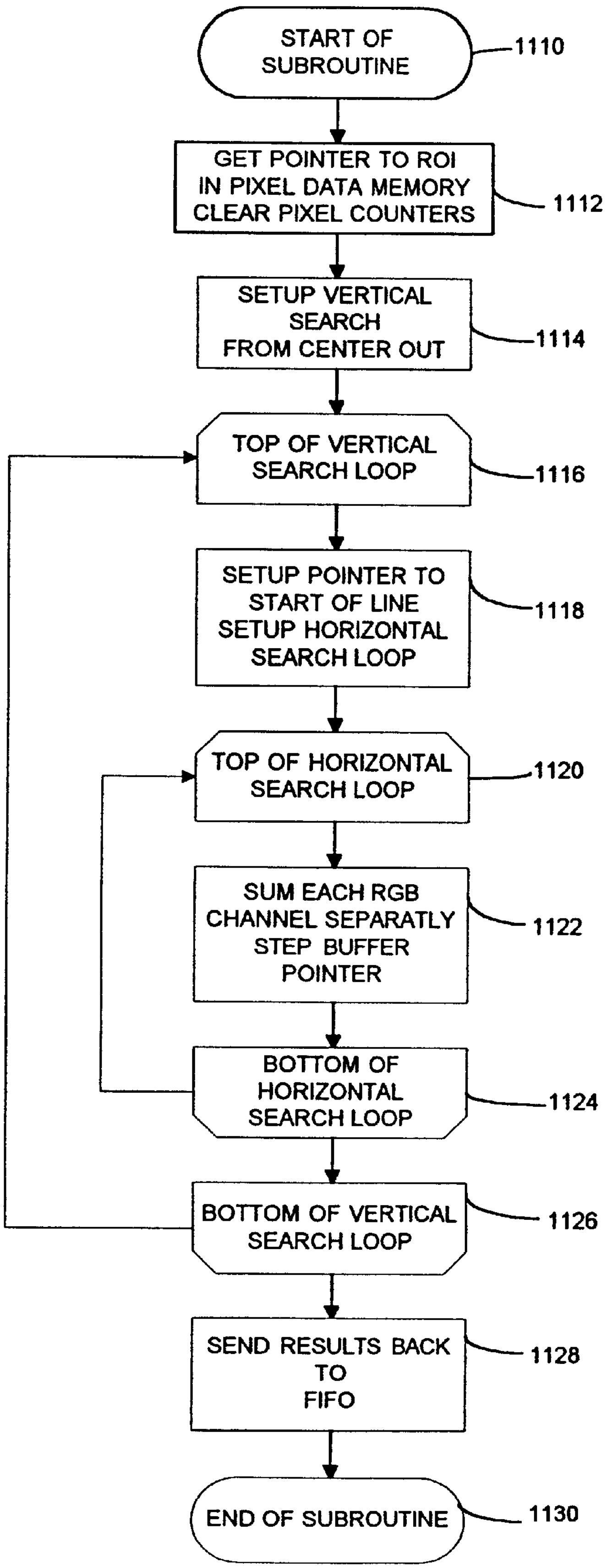
Figure 25:
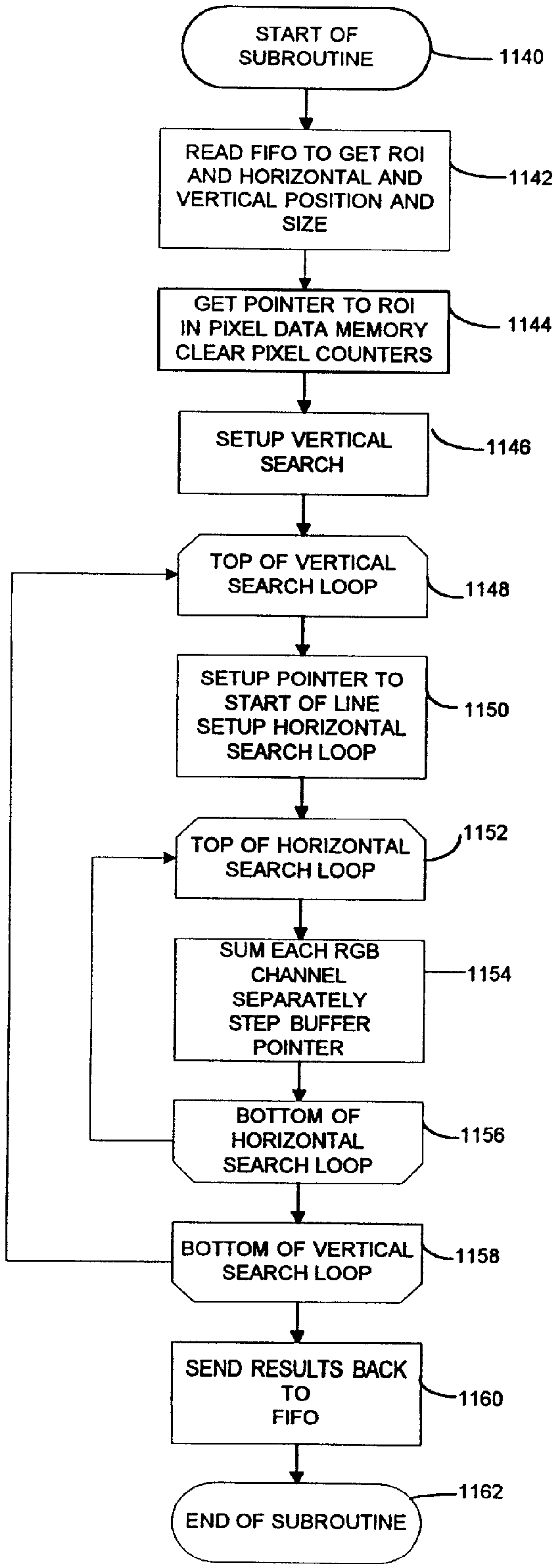
Figure 26:
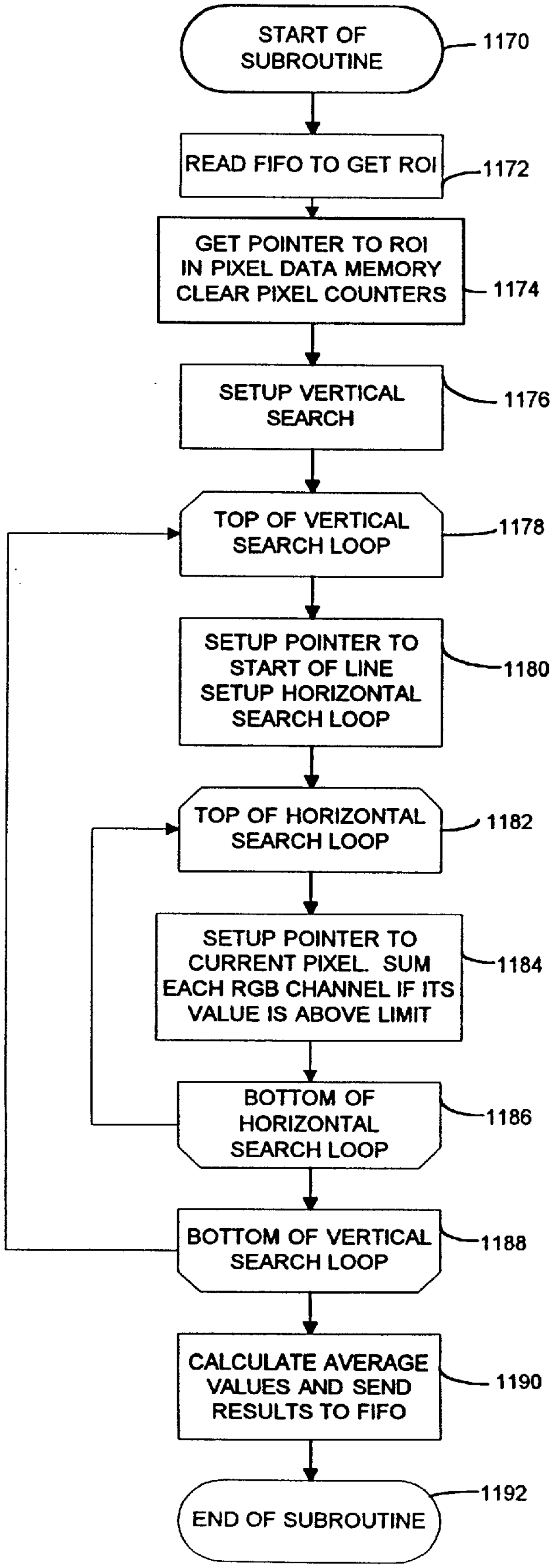

FIGS. 13A, 13B and 13C together comprise a flow chart for a software routine that is used in calibrating the digitizing portion of the apparatus at the maximum and minimum intensity levels for white and black, respectively;

FIG. 14 is a flow chart of a routine which is used to acquire data for compensating the measurement resulting from discontinuity of illumination from the strobe means;

FIGS. 15A, 15B and 15C together comprise a flow chart for a software routine that is used for determining light scattering compensation;

FIGS. 16A, 16B and 16C together comprise a flow chart of the routine which calculates the width of the web, locates the edge of the web and controls the execution of other edge finding routines in the event that the edge cannot be found by locating printed test areas;

FIGS. 17A, 17B and 17C together comprise a flow chart for another software routine that is used to find the edge of the web if the web contains printed matter;

FIGS. 18A, 18B and 18C together comprise a flow chart for a software routine that is used for acquiring data for the reflective density analysis;

FIGS. 19A and 19B together comprise a flow chart of a software routine for locating a minimum number of color blocks within a digitized image;

FIGS. 20A, 20B and 20C together comprise a flow chart for another software routine for searching for color blocks within a digitized image;

FIGS. 21A, 21B and 21C together comprise a flow chart for a software routine that is used to acquire an image, and is a more detailed illustration of the routine illustrated in FIG. 12;

FIGS. 22A and 22B together comprise a flow chart of a software subroutine that is used to find average values during the calibration of the digitizing system;

FIGS. 23A, 23B, 23C, 23D and 23E together comprise a flow chart for another software routine for searching for the locations of the sides of a solid color block and performs the reflective density analysis on valid color blocks;

FIG. 24 is a flow chart of a software subroutine for finding the average of a 300 by 300 pixel area;

FIG. 25 is a flow chart of a software subroutine for determining the average of pixel values for any area requested;

FIG. 26 is a flow chart for a software subroutine that sums pixels that are determined to be white within a digitized image; and, FIGS. 27A, 27B, 27C and 27D together comprise a flow chart for another software routine for searching for the locations of color blocks.

DETAILED DESCRIPTION

Broadly stated, the present invention is directed to an apparatus for determining reflective density values of each color of ink that is printed on a web, preferably a paper web, by a web printing press of the type which has a number of printing stations, each of which is adapted to print impressions of an individual color. Full color printing presses generally print cyan, magenta and yellow, in addition to black. The apparatus embodying the present invention is adapted to produce the reflective density values for each of the colors in a reliable and accurate manner in real time, while the web is moving at high speed during a printing operation.

The apparatus is adapted to produce the reflective density values by acquiring digitized images of the moving web using a stroboscopic illumination and thereafter analyzing the digitized images in various ways by examining the intensity of individual pixels of the image. The apparatus operates to acquire digitized images even while the press is running at speeds in excess of 3000 feet per minute and the reflective density values for each measurement can be produced in real time.

The apparatus utilizes a multiple color CCD matrix sensor which acquires a matrix image and which has an internal means such as a prism which separates or splits the light into the red, green and blue components which are then processed in separate channels. Thus, each matrix image that is acquired by the multiple color CCD matrix sensor produces a separate channel of the colors red, green and blue and these channels correspondingly measure the reflective density of the printed ink colors of cyan, magenta and yellow, respectively. It should be understood that the sensor may have other types of internal means for separating the light into the red, green and blue components, such as a mosaic filter or a striped filter, for example.

It is generally known to those skilled in the art that it is difficult to reliably and accurately measure printed ink reflective density, even using conventional hand-held densitometers that have existed for many decades. Such densitometers are prone to produce measurements that drift, and it is common for these devices to have to be manually recalibrated often. The present invention provides reflective density measurements that are accurate and reliable as a result of automatic calibration, and is adapted to convert reflective density values to substantially the same readings that are measured by a densitometer. While the densitometer readings theoretically range between 0 and approximately 3, with the higher number representing minimum reflectivity and the lower number representing 100% reflectivity, the working range is generally within approximately 0.5 and 2.5, with the 2.5 value representing the darkest black that is generally capable of being printed.

The apparatus utilizes certain test print areas that may include several sets of small solid color blocks of cyan, magenta, yellow and black. The color block sets are printed across the width of the web at specific locations associated with the ink zone adjusting control mechanisms (often referred to as keys) of the printing press. The test print area can include sets of solid color blocks as well as sets of screen color blocks, combination screen and solid color blocks and multiple solid color blocks that have been overprinted. As is well known in the art, the control mechanisms adjust the ink feed in zones that extend across the web. The mechanism varies the quantity of the ink that is present and available to be ultimately transferred to the web during a printing operation. The mechanisms are spaced apart from one another approximately 1 to 2 inches, so that for a 38 inch wide press, there are approximately 24 zones. The apparatus of the present invention utilizes print test areas at each key location so that reflective density can be measured every 1 to 2 inches.

In the preferred embodiment, each of the print test areas comprise color block sets which contain rectangular color blocks that are adjacent one another, with each color block set preferably having seven color blocks, including color blocks of black, blue, magenta and yellow in a preferred sequence. The color blocks are sized relative to the digitized image that is acquired so that a well placed image acquisition will include all seven color blocks which will necessarily result in at least one color block of each color including black. The digitized image is preferably comprised of 760 pixels by 480 pixels, with each pixel having an intensity value that can vary between 0 and at least 255. The correlation between the analog intensity value and digital density vlaue can be either linear or nonlinear.

However, as a part of a calibration capability, the white level is preferably set at an intensity value of greater than 200 and less than 255 and the black level is preferably set to have an intensity value of greater than 0 and less than 63. The white level is set by acquiring an image of a certified white standard (preferably 99% reflective), and the black level is set by acquiring an image of a certified black standard (preferably 2% reflective). The apparatus also compensates for variations in the intensity and color temperature of light produced during individual firings of the strobe units which can be as much as 5%. This is done by measuring the illumination of each firing of the strobe units to yield a correction value which is used in such compensation. The apparatus also compensates for any discontinuity of illumination across the area of the field of view of which the image is being acquired, and is referred to as light field discontinuity compensation. This light field discontinuity compensation data is stored in memory for use in compensating for such unevenness during operation.

Additionally, because of the nature of the optics, there is some degree of light scattering in the apparatus. This creates what is known as a light scattering effect in that the intensity of the pixels measured within the area of analysis are influenced by the amount of and location of reflected light in the field, i.e., the printed matter itself, and depending upon the content of the printed matter, there can be a variation in the intensity reading of the area of analysis itself. The apparatus compensates for such light scattering characteristics. The calibration and compensation for the light scattering and light discontinuity variations, and strobe illumination variations, are important in producing an accurate reflective density value during operation.

It should also be appreciated that a significant amount of paper contamination exist in a printing press environment and such contamination can greatly influence the accuracy of measurements. Also, the printing process is less than perfect and various anomalies can result in unwanted spots and blemishes on the test print areas themselves. Arrows and other indicia are also printed on the web for reasons unrelated to the test print areas and such indicia is occasionally printed overlying the test print areas which can create problems in the proper operation of the apparatus of the present invention. For these reasons, the apparatus includes analysis routines which insure accurate and reliable performance correcting for pixels that are not within intensity levels that are expected and performing analysis of measured values to provide a reliable resulting reflective density value.

Figure 1:
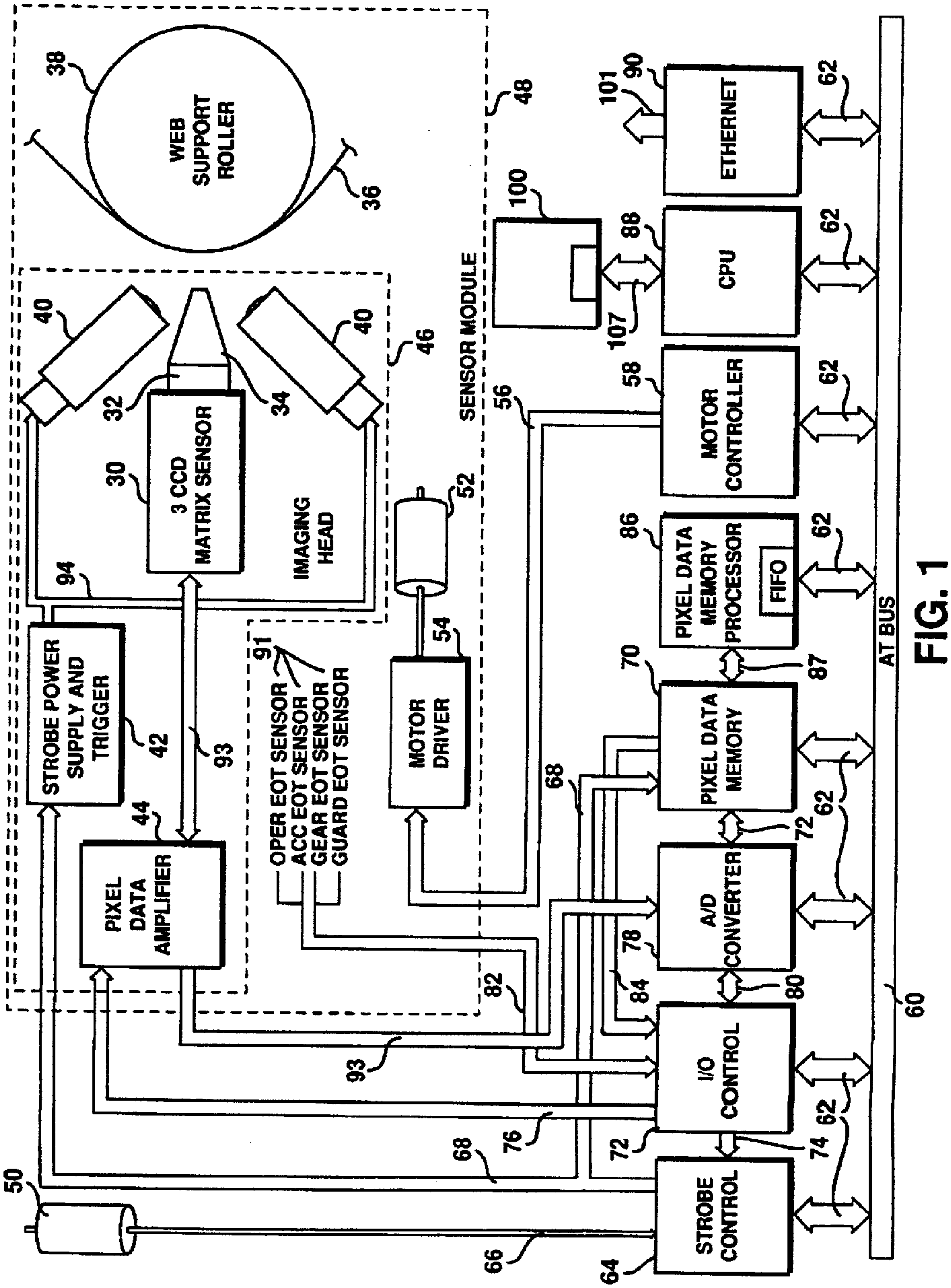
FIG. 1 is a block diagram of the apparatus embodying the present invention, which monitors matter printed by a web printing press on one side of a web.

Turning now to the drawings and particularly FIG. 1 which shows a block diagram of the apparatus embodying the present invention, it includes a CCD matrix sensor 30 having a lens 32 with a nozzle structure 34. The CCD matrix sensor 30 is adapted to acquire matrix images of a web 36 that is wrapped around a web support roller 38 so as to present the side of the web having indicia printed thereon so that the CCD matrix sensor 30 can acquire matrix images of portions of the web. A pair of strobe units 40 are provided adjacent to the CCD matrix sensor 30 which direct illumination toward the web from opposite sides and illuminate the area of the web 36 from which matrix images are acquired by the CCD matrix sensor during operation. The strobe units 40 effectively freeze the web so that matrix images can be acquired even though the web 36 may be traveling at high speed.

The CCD matrix sensor 30 and strobe units 40 as well as a strobe power supply and trigger module 42 and a cable interface and pixel data amplifier 44 are shown to be within a dotted line 46 which represents a carriage structure having an imaging head which is adapted to traverse the width of the scanner roll and beyond for the purpose of acquiring matrix images of the web. Another dotted line 48 represents the portion of the apparatus which is mounted on the sensor module. An encoder 50 is also interconnected with the press and measures the running speed of the press and is necessary to synchronize circumferential (the fire angle) so that the matrix images are acquired at the correct time to obtain the test print area in the view of the CCD matrix sensor.

A motor 52 is also mounted on the press so that it is adapted to drive the carriage back and forth to accurately control the position of the CCD matrix sensor. The motor 52 is preferably a stepping motor driven by a driver 54 which receives signals via lines 56 from a controller 58. The apparatus preferably includes a cabinet which contains the components and circuits that are shown near the bottom of FIG. 1. The motor controller 58 is connected to a 16 bit bus 60 via bus connection 62 which is similar to other bus connections to other components, including a fire control 64 which receives the encoder signals from the encoder 50 via lines 66 and which provides output signals to the strobe control 64 via lines 68 which also extend to a pixel data memory 70 which is adapted to receive the digitized images and perform some of the analysis steps with respect to the data in the digitized images.

A input/output (I/O) control 72 provides control for operation of the pixel data memory, the CCD matrix sensor, strobe control 64 and motor control portions of the apparatus. Lines 74 extend from the I/O control 72 to the strobe control 64 for controlling the synchronization of the firing of the strobes and acquiring of the matrix image by the CCD matrix sensor, the latter functionality being carried out by data that is sent over lines 76. The I/O control 72 also is interconnected with an analog-to-digital converter 78 via lines 80 and the I/O control 72 receives sensor information from the sensor module 48 via lines 82, as well as data relating to the operation of the pixel data memory 70 via lines 84. There is a pixel data memory processor 86 for the pixel data memory 70 and it is interconnected with the pixel data memory 70 by lines 87. Similarly, the A-to-D converter 78 which converts the analog matrix image acquired by the CCD matrix sensor to a digitized image in either a linear or nonlinear manner is interconnected with the pixel data memory 70 by lines 73. The converter 78 can be of the type which has a 32 bit processing capability. It should be understood that intensity levels from 0 to 255 for three colors occupies only 24 of the 32 bits, and therefore 2 additional bits could be utilized for the three colors to provide 10 bit resolution, i.e., 1024 intensity levels.

The main processing capability is performed by a CPU 88 and an Ethernet network card 90 is also provided for networking multiple apparatus. The sensor module 48 contains a number of sensors, including three end-of-travel (EOT) sensors 91 which provide signals indicating that the carriage has moved to a location that is at or near the end of its travel and which provides signals via lines 82 to the I/O control to stop the motor 52, further operation of which could cause damage to the apparatus. The CCD matrix sensor 30 provides analog signals of the acquired matrix image to the amplifier 44 via lines 93 and control signals for firing the strobes 40 are provided via lines 94.

Figure 2:
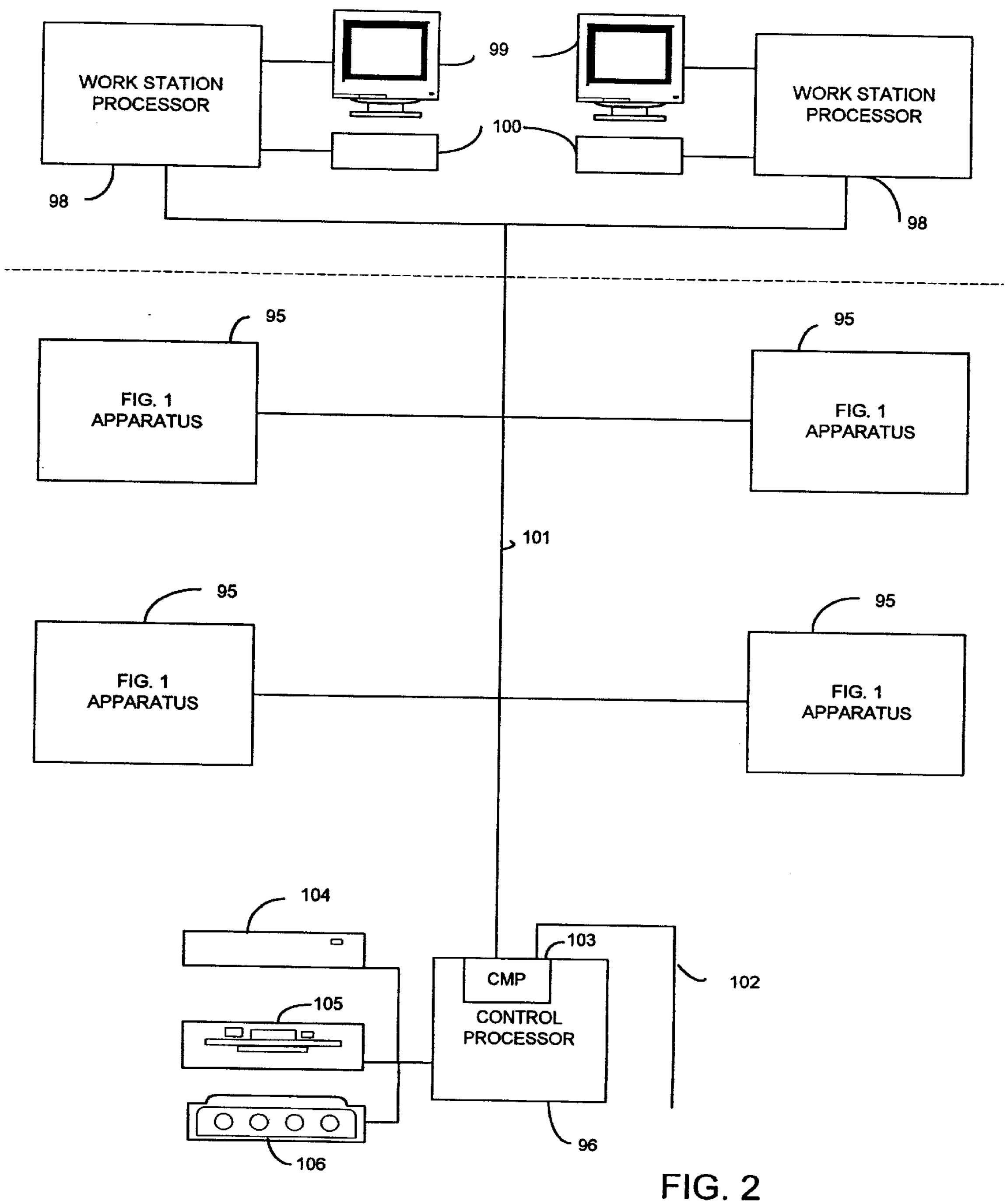
FIG. 2 is a block diagram of apparatus embodying the present invention which monitors matter printed on two sides of two webs.

While most of the operation of the apparatus is carried out by that shown in the block diagram of FIG. 1, it should be understood that the block diagram of FIG. 1 is only a part of a total installation on a printing press. Apparatus embodying the present invention is adapted to measure the reflective density and geometric measurements of print test areas for a complete press that generally involves printing on both sides of a web. It is also adapted to measure the reflective density of print test areas on two sides of two webs, such a system is shown in FIG. 2., which has four of the apparatus shown in FIG. 1, identified at 95, a control processor 96, a work station 98 for each web, with each work station having a monitor 99 and a keyboard 100. The work stations 98, individual apparatus 95 and control processor 96 are interconnected with an Ethernet network 101, and the control processor 96 may have a network 102 to link the apparatus to the printing establishment network. The control processor includes a central message passer (CMP) module 103 which operates to communicate messages from each component on the network 101 to another of the components. Thus, all messages from any processor to any other processor are controlled by the CMP 103. The apparatus also has a hard disk 104, a floppy disk 105 and a modem 106 connected to the control processor 96. Data relating to the status and operation of the apparatus can be stored on the hard disk 104, and data can be loaded and unloaded using the floppy disk. The modem 106 permits long distance diagnostic and maintenance work to be done on the apparatus.

It should also be understood that the CPU 88 of the apparatus of FIG. 1 is also a 486 microprocessor. As will be hereinafter described, there are microcode operations that are performed in the pixel data memory processor 86 which could be carried out by the CPU 88. Similarly, there may be functional operations performed by a particular component in FIG. 1 that may be carried out in other components. It is also expected that as the speed of processing continues to increase through advances in computer technology, fewer microprocessors may be necessary than are shown in FIG. 1.

The present invention essentially involves the implementation of concepts that are described herein, including particular routines and subroutines that are described herein which implement the invention as claimed. While unquestionably essential in that it must perform the calculations to carry out the routines in a very rapid manner, the particular hardware configurations may appear to be quite different from that shown in FIG. 1. For example, certain subroutines can be carried out in dedicated hardware.

Figure 3:
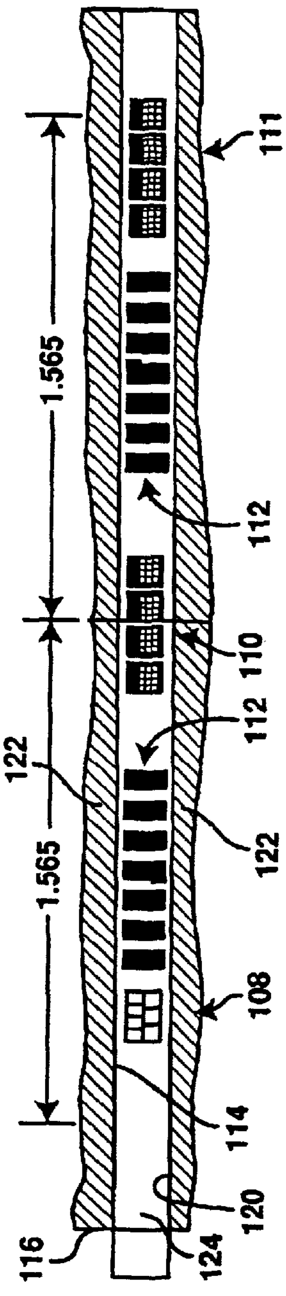
FIG. 3 is an enlarged plan view of a portion of a web having printed matter, in addition to two solid color block sets of a test print area that are used by the apparatus of the present invention.
Figure 3A:
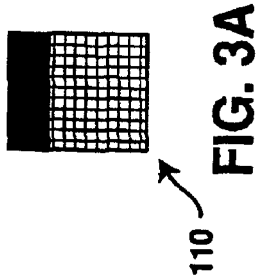
FIG. 3A is an enlarge portion of a combination screen and solid color block as shown in FIG. 3.
Figure 4:
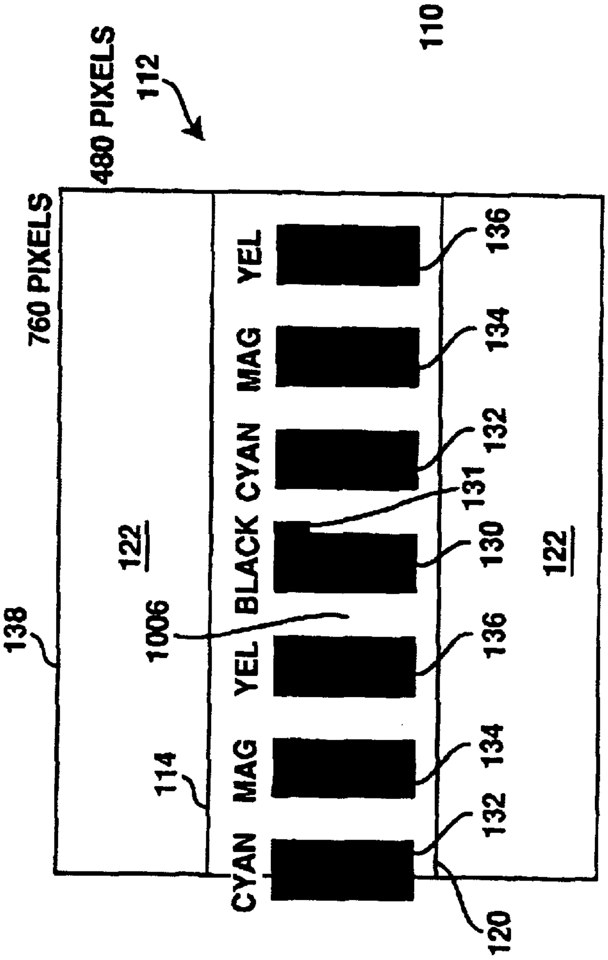
FIG. 4 is an enlarged single solid color block set of a test print area shown together with an outline of the approximate size of a matrix image that is acquired by the CCD matrix sensor.
Figure 5:
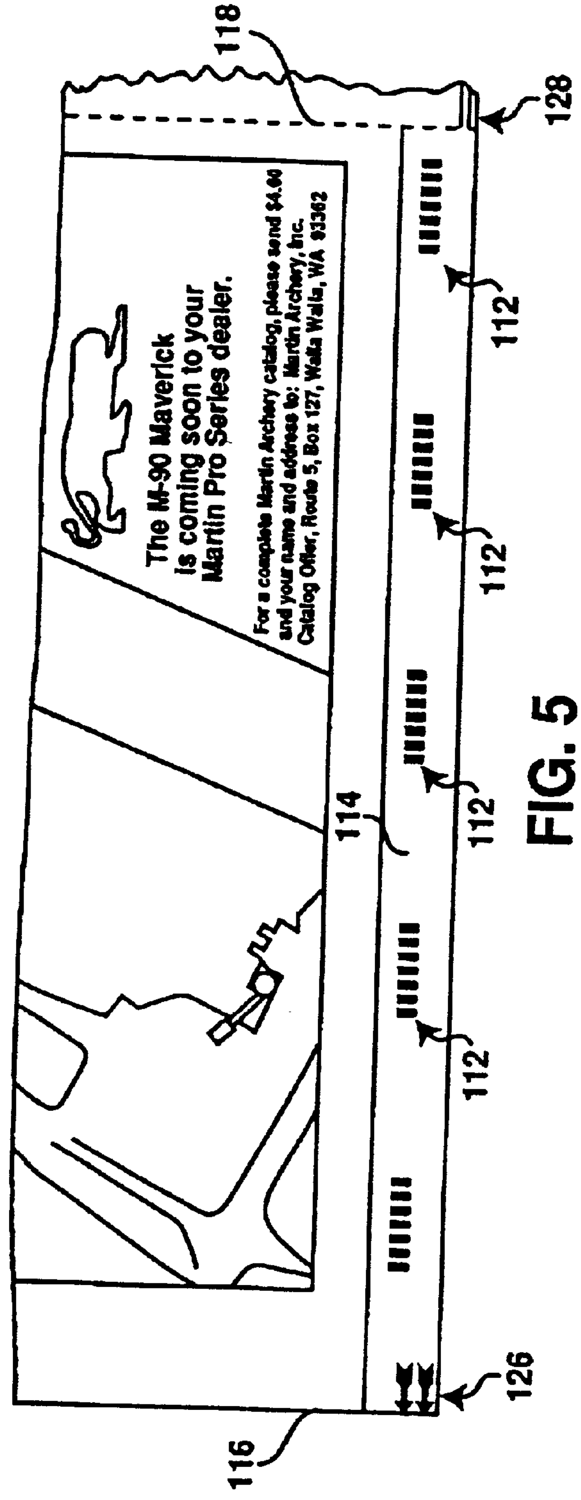
FIG. 5 is a reproduction of printed material which is reduced by approximately 20% and which shows a portion of page of a magazine having a width of approximately 8 inches and which has five solid color block sets of a test print area printed in an area outside of the printed page.

In accordance with an important aspect of the present invention, the apparatus utilizes test print areas that are printed on the web as shown in FIGS. 3, 3A, 4 and 5. FIG. 3 illustrates a trap target block 108 that is made by overprinting portions within the target block with ink combinations of the colors of magenta, cyan and yellow. FIG. 3 also has block sets 110 and 111 which are a combination of screen and solid portions. One of the sets 110 and 111 preferably has a 50 percent screen portion and the other a 75 percent screen portion. It should be understood that the screen portion is produced by printing predetermined sized dots in the screen area, and the screen may not appear exactly as shown in FIG. 3A. There are preferably four of such blocks per set, one for each of the colors of magenta, cyan and yellow. FIGS. 4 and 5 do not include the trap target block or combination screen and solid blocks, and particularly illustrate solid color block sets 112 that are used for determining the reflective density of the various color blocks that are a part of the set. Two of the color block sets are shown in FIG. 3, and an enlarged single color block set is shown in FIG. 4. FIG. 5 shows a reproduction of a portion of a printed page which includes five color block sets located near the bottom gutter below a line 114 which represents the bottom of a printed page of a magazine having one page that is approximately 8 inches wide as determined by a left edge 116 and a fold line indicated by the dotted line 118. The reproduction in FIG. 5 is approximately 80% of normal scale.

Referring to the enlarged illustration of FIG. 3, it also has the line 114 which represents the bottom of the printed matter of the page, the left edge 116 as well as a line 120 which represents the beginning of the printed matter for the following page. The printed matter is indicated generally by the hatched lines and is identified at 122. Each of the color block sets comprises seven color blocks located adjacent one another and each color block set 112 is positioned adjacent a control zone of the press which in FIG. 3 is shown to be on centers of 1.565 inches. The area between the lines 114 and 120 represents a gap 124 which contains indicia such as the color block sets 112 as well as other indicia for measuring and controlling cut lines and register control, for example. FIG. 5 illustrates arrows 126 as well as small lines 128 which are used to control cutting and forming of magazines and the like by the press.

Referring to the enlarged illustration of a single color block set shown in FIG. 4, the set comprises seven color blocks of the colors cyan, magenta and yellow, as well as black. While the particular number and type of color blocks may vary from the seven shown, the number illustrated in the color block set of FIG. 4 has proven to be an effective number. More particularly, there is a black color block 130 located in the center, a cyan color block 132 to the right of the black color block and at the left end, a magenta color block 134 is located adjacent the cyan, and a yellow color block 136 is positioned adjacent to the black color block and at the right end. The black color block 130 has a tab 131 in the upper right corner as shown in FIG. 4, and the tab is located at a different corner in sequence for each color block set that is printed on the web as shown in FIGS. 3 and 5. The tabs provide information as to which color block set has been located, and enables the apparatus to determine if a color block set has been skipped during a pass of the CCD matrix sensor. It should be understood that smaller or larger sized color blocks may be used.

Figure 6:
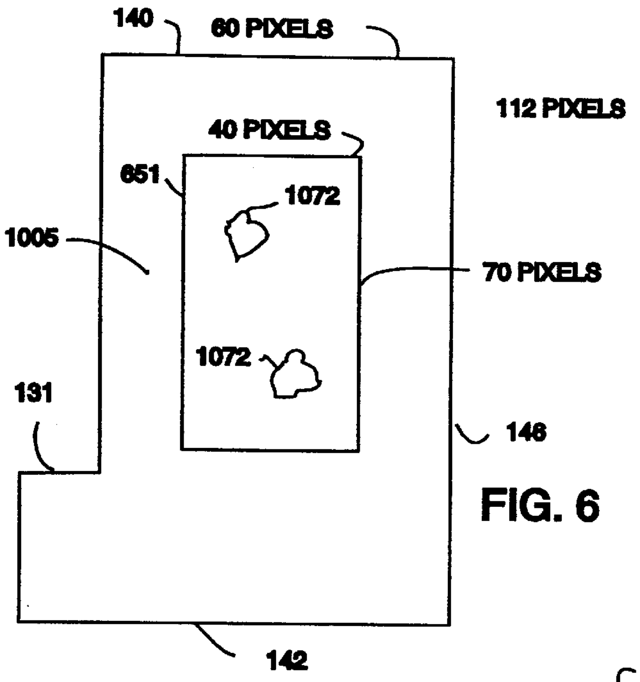
FIG. 6 is a view of a representation of a single color block, together with two spots.

The CCD matrix sensor 30 is positioned close enough to the web 36 that it obtains a matrix image that is approximately 500 thousandths by 380 thousandths of an inch. In FIG. 4, a rectangle 138 represents the approximate size of the matrix image that is acquired by the CCD matrix sensor 30 relative to the size of a color block set 112. This physical size produces a matrix image, which when digitized results in a matrix of individual pixels of 760 pixels by 480 pixels. The apparatus actually produces three of such matrix images, one for each of the colors of red, blue and green. With such a physical to pixel ratio, each pixel represents approximately 0.0006 in width and 0.0008 inches in height inches. This ratio enables the apparatus to determine the shape and size of printed objects, including the size of dots printed in various screens, and particularly the dots that are printed in screen targets used for calculating print contrast and dot gain. Additionally, with respect to the color blocks 112 shown in FIG. 3, their measurement in pixels is approximately 60 in width by 112 pixels in length and a single solid color block 136 is shown in FIG. 6. The outer boundaries of the color block 136 shown in FIG. 6 include a top end 140, a bottom end 142, a left end 144, a right end 146 and the tab 131.

The shape of the combination screen and solid blocks 110 and 111 is shown in FIGS. 3 and 3A. It should be appreciated that the solid and screen portions are adjacent one another in the circumferential direction of the web, rather than adjacent one another in the transverse direction, i.e., left and right as viewed in FIG. 3. For a combination block 110 that has a 75 percent screen, which is used to determine print contrast, an image of the block 110 can be acquired and the size of the individual dots can be accurately measured as a result of the aforementioned physical to pixel ratio. This enables the apparatus to measure dot gain and print contrast by geometric measurement of the pixels of the known blocks.

Utilizing reflective density, dot gain can be calculated by the well known Murray-Davies equation $$\% \text{ apparent dot area}=100\times(1-10^{-(D9t)-D(p))})/(1-10^{-(D(s)-D(p))})-50$$

where D(s) is density of the solid, D(t) is density of the screen, and D(p) is density of the paper.

With respect to the trap target 108, the apparatus is adapted to analyze an image of it and determine the apparent trap according to the equation $$\% \text{ apparent trap}=100\times(\text{Dop}-\text{D1})/\text{D2}$$

where Dop is the density of overprint minus paper density, D1 is the density of first-down ink minus paper density and D2 is the density of second-down ink minus paper density.

Similarly, print contrast can be determined by acquiring and analyzing a digitized image of the 75 percent screen/solid combination block and using the following equation $$\% \text{ print contrast}=100\times(D(s)-D(t))/D(s)$$

where D(s) is the major filter density of the solid and D(t) is the major filter density of the screen. The orientation of the combination screen and solid block 110 with the screen and solid portions being adjacent one another in the web direction provides more accurate print contrast measurements, because the comparison is done using the screen and solid portions that are in the same circumferential line, and there will be less potential for ink takeoff to change the inking of a screen portion relative to an adjacent solid portion.

Figure 11:
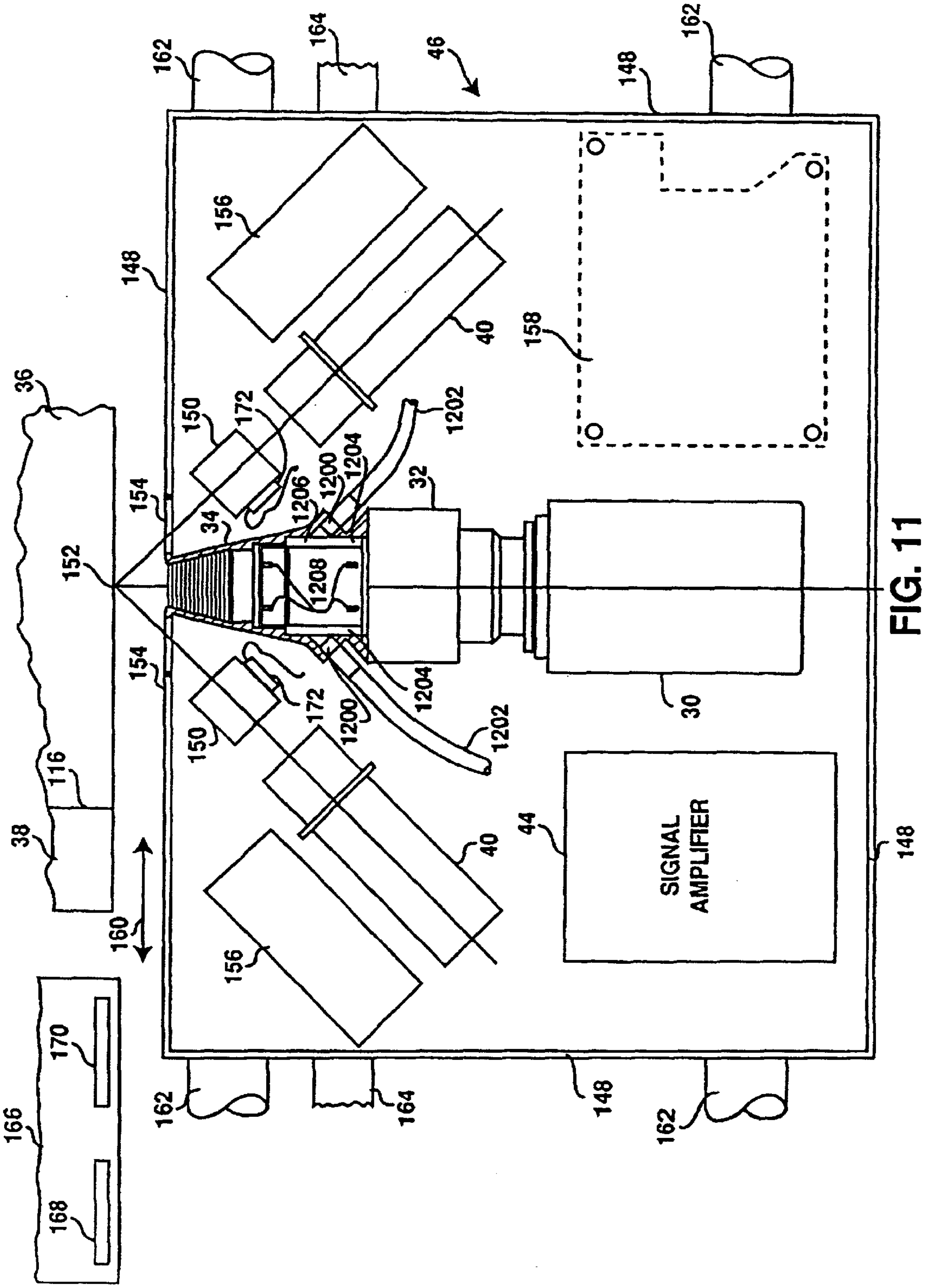
FIG. 11 is a plan view with portions removed and partially in cross section illustrating the imaging head, the head being shown in position to acquire a matrix image of a portion of a web.

With respect to the carriage mechanism 46, it is shown in more detail in FIG. 11 and comprises an enclosure having outer walls 148, which enclosure holds the CCD matrix sensor 30 and strobe units 40. While the illustration of FIG. 11 is greatly simplified, the strobe units 40 are shown to have collimating lenses 150 positioned near the output and direct the center of the strobe light to a point 152 that is also coincident with the center line of the CCD matrix sensor 30. Thus, the strobe illuminates the area of the image on the web 36. The light from the strobe units exits the wall 148 through transparent windows 154 that are located adjacent an opening through which the CCD matrix sensor nozzle 34 extends. Capacitors 156 are positioned adjacent the strobe units 40 and a power supply 158 for the strobe units is positioned in the lower right corner as illustrated. While the top of the enclosure is not illustrated, it should be understood that it is completely enclosed and preferably substantially sealed from the exterior so that dust particles cannot be admitted into the interior thereof In this regard, the only opening is the opening in the end of the cone 34 which is air purged of the CCD matrix sensor 30 so that the matrix images can be acquired of the web 36.

The carriage structure is moved laterally relative to the web, i.e., left and right as indicated by the arrows 160 by moving along a pair of rails 162 that are associated with cooperative mounting structures (not shown) on the underside of the carriage 46. The carriage is moved laterally by a belt drive 164 that is connected to a drive sprocket or the like connected to the motor 52 of FIG. 1. The exact structure of the rails 162 and belt 164 is well known to those of ordinary skill in the art and the particular structure that is used to accomplish the transverse movement of the carriage along the rail or comparable structure is not considered to be a novel feature of the present invention. The carriage 46 is adapted to move laterally along the web 36 and also may extend to the end of the web 116 as well as beyond the edge onto the web support roller 38 itself.

The carriage 46 may also be moved to an enclosure 166 that is schematically illustrated and which contains a white standard 168, and a black standard 170 which may be located near the end of the range of travel of the carriage 46. While not illustrated in FIG. 11, it is preferred that the standards 168 and 170 be contained in a dust free environment which means that the enclosure 166 is substantially sealed except for those times when images are acquired of the standards. It is preferred that the normal end of travel not extend to the enclosure 166, but that if images are to be acquired of the standards, then the carriage can be moved farther to the left and suitable actuation being accomplished to open substantially sealed doors or the like to expose the standards 168 and 170 so that images of them can be acquired.

In this regard, the operation end of travel sensor provides a signal indicating that the carriage 46 has moved to the end of the web support roller 38. The ACC end of travel sensor indicates the end of travel at the enclosure 166, with the opposite end of the roller 38 being controlled by the end of travel sensor 91. As will be explained hereinafter, photodiodes 172 are provided adjacent the collimating lenses 150 and are in position to provide a signal that is proportional to the output of the strobe units 40 and this signal is part of the information that is transmitted to the A-to-D converter 78 via lines 93 for use in adjusting the intensity values of pixels that are a part of the acquired digitized image after the analog matrix image has been digitized.

In accordance with an important aspect of the present invention, the CCD matrix sensor 30 is of the type which includes an internal prism that splits the light into three paths or channels, i.e., red, green and blue. Thus, each acquired matrix image provides three matrix images, one for each of these colors and the three matrix images are sent to the A-to-D converter 78 where they are digitized into three separate digitized images. The intensity values of the individual pixels of the digitized image will be low for the channel in which the ink color is of interest. It is desirable to provide a photodiode responsive to the color of each channel to compensate for variations in total intensity as well as color temperature, and in such event, there would be additional sensors provided, which are similar to the sensors 172 shown in FIG. 11. Such sensors may be manufactured to be responsive to individual colors of red, green and blue, or there may be filters attached to them to make them responsive to such individual colors.

While the red, green and blue components of the signal represent an additive process for producing the full range of the color spectrum, the printing of colors on a web is a subtractive process and there is a relationship between the CCD matrix sensor channels and the ink color being processed. For example, yellow takes away one of the channels, as does magenta and cyan take away one of the other two channels. Black is a color that takes away all three channels. Yellow is the absence of blue, so a blue channel of perfect yellow ink would yield no blue and 100% red and green. With cyan there is no red, so the red channel would be zero, and the green and blue channels would be approximately 100%. The magenta channel will have no green, but approximately 100% red and blue. Black is the absence of all 3 channels, so that perfect black would yield no red, green or blue. When yellow is printed on top of cyan, the blue and red channels are taken away and green is left. Thus, as is well known to those skilled in the art, when ink is printed, it is a subtractive process, whereas with light when red and green are added, yellow is obtained which is an additive process.

With the present invention, it is necessary to only look at one channel at a time and if its signal level is low, it will reveal a reflective density valuation because reflective density is the lack of reflectance of a color. A high density ink is very dark which means that it reflects less of that color. The reflective density is what is being determined by the present invention and it is only necessary to analyze the three channels individually to determine the reflective density of each of the three colors of cyan, magenta and yellow. Black reflective density is determined by a single channel or the average of all three channels.

With respect to the operation of the apparatus embodying the present invention, and referring to FIG. 12 which is a flow chart illustrating an overview of the operation of the apparatus, a start block 200 causes initialization of the system as shown by block 202 and this results in starting of the main loop (block 204) which results in a multiplexing function (block 206) which switches among various cases which control various aspects of the operation of the apparatus. The routine inquires whether it should calibrate the CCD matrix sensor (block 208) and does so during start-up (block 210). If the CCD matrix sensor has been recently calibrated, the routine then inquires if the edge of the web has been found (block 212) and if it needs to be found, then it executes a routine for finding the web edge (block 214).

As will be hereinafter described, there is more than one subroutine for finding the web edge, which generally is a function of whether there is printed material on the web or not. If the web is unprinted, then the determination of the edge of the web is more easily accomplished than if it is printed. In any event, once the web edge is found, the routine returns to the start of the main loop 204. If there is no need to find the web edge, i.e., it is known, then the routine sequences to case 3 to determine whether data should be acquired (block 216) and if so, a determination is made as to whether reflective density data should be acquired or light scattering data acquired (block 218). If the press run is new so that light scattering data has not been acquired, the apparatus acquires light scattering data (block 220). Once light scattering data has been acquired, then the apparatus is set up to acquire reflective density data (block 222). As will be described, during light scattering data acquisition, the apparatus sequences the CCD matrix sensor to acquired matrix images at each key location sequentially across the web, digitized the matrix image and performs an analysis to determine the content of the degree of whiteness in the acquired digitized image, with all pixels in the digitized image being measured with respect to a threshold white value to determine the amount of light scattering compensation that should be performed with respect to each particular image. This is a function of a printed matter adjacent to each key.

After reflective density data has been acquired, the end of loop block is reached (block 224) and the routine inquires as to whether the press is stopped (block 226). If the press is stopped, then the routine inquires as to whether it is time to calibrate the CCD matrix sensor again and if it is, then the CCD matrix sensor is again calibrated (block 230). If it is not time to calibrate, the routine returns to the start of the main loop 204. It is generally advisable to recalibrate the CCD matrix sensor if the press has stopped for a period in excess of 10 minutes. If the press has not been stopped, then the routine inquires as to whether there has been an operation request made (block 232). If such a request has been made, several service operations may be carried out (block 234). Service operations or normal printing operations may include a view request where an operator may request that an image be acquired of a particular location on the web that may be independent of the images that are acquired of the color block sets. In this regard, a press operator may wish to monitor a particularly critical area of an impression, such as a highlight, for example. Such an operation can be carried out generally concurrently with many of the other data acquisition operations by controlling the CCD matrix sensor to go to a particular location and acquire the data when time permits and then return to the normal operation of the apparatus. An operator can also request calibration of the CCD matrix sensor which is determined by the operator and is done independently of the calibrate CCD matrix sensor routines that occur during operation of the routine, such as shown at blocks 210 and 230.

With respect to the operation of the apparatus, it can operate in one of several modes including idle, start-up, sample and maintain. During idle mode, the apparatus is ready to acquire data, but is not commanded to do so. During initialization of a press run, the apparatus may be ready to operate, but once the CCD matrix sensor is calibrated, for example, it cannot acquire light scattering data until printed matter appears on the web which can be analyzed for light scattering compensation. The apparatus can determine the edge of the web before printed matter appears, and can determine the width of the web and then the system waits for printed matter to appear. Once the printed matter appears, the operator can change to a start-up mode. During light scattering passes, the CCD matrix sensor does a slow traverse to acquire light scattering data that is used to compensate for the light scattering. The slow passes for acquiring light scattering data is necessary because more data is analyzed, i.e., every pixel of the 760 by 480 pixel matrix is analyzed to determine the light scattering compensation. Once several passes are made for acquiring light scattering data, i.e., preferably approximately 6 passes, the data that is acquired is averaged over the 6 passes to provide a reliable light scattering compensation factor for use in determining reflective density.

It should be understood that light scattering compensation data must be acquired for each of the three channels of red, green and blue, and these three compensation factors are generated for each key location across the web. The resulting light scattering compensation factors are stored in memory for use during the printing of the job. It should be understood that real time scattering correction on an acquisition by acquisition basis is possible. To carry out such functionality, an inline dedicated processor may be required.

It is generally necessary to print 5,000 to 25,000 impressions to set color on a press. With the apparatus of the present invention, such set up can be accomplished with substantially fewer impressions, i.e., approximately 2,500 impressions.

After the start-up mode, the apparatus is switched into a run mode where reflective density data is acquired by taking a preferably minimum number of passes of data approximately every 500 impressions. These reflective density values are stored in memory. In the maintain mode, the apparatus takes multiple passes of data approximately every 500 impressions and also stores that data in memory for use in the preparation of press run reports.

During the reflective density data acquisition, the CCD matrix sensor is traversed across the web. The apparatus can acquire a digitized image of each color block and calculate reflective density in less than approximately 70 milliseconds so the traverse speed is synchronized to the web speed of the press so that the CCD matrix sensor moves approximately 1 ½ inch during each revolution. In the preferred embodiment illustrated and described herein, at press setup press speeds, the apparatus can acquire a digitized image every revolution of the impression roller so that during every second, there are approximately 12 locations of the color keys from which digitized images are acquired and analyzed.

As is well known to those in the printing industry, it has often been necessary to save samples of printing jobs for possible future use in the event that the customer has a complaint about the quality of the printing of a publication or the like and it is not uncommon that a substantial area be set aside in a printing plant where such samples are accumulated. It is an expensive use of valuable floor space within a printing plant.

In accordance with an important aspect of the present invention, the reflective density data that is acquired during the sample and maintain modes provide a detailed record of the color densities of each of the colors being printed approximately every 500 impressions throughout the course of the printing run. Such data can be used to generate reports which provide frequent "snapshots" of the reflective density and therefore provide a history of the print run which can be used to satisfy the customer about the quality of the printing.

The apparatus of the present invention essentially eliminates the need to save samples of a press run for the reason that the reflective density data is accumulated in memory and can be printed out after the job in the form of a report which indicates the quality of the printing essentially approximately every 500th impression. The apparatus has three lines in which the customer can identify the job including a six digit job number, a three digit form number, a three digit run number, a job name, job description and publication code.

The report also provides useful information for a press house in that it provides a record of changes that were made to the keys from the beginning until the end, including the corrections that were made in the course of reaching the point where the press was stable. This can be used as a teaching tool to keep pressmen from making unnecessary corrections in the beginning of the run. It is common for another piece of equipment in a press house to provide preset values for keys from which corrections can be made to reach a stable press operation. It is common for pressmen to make initial corrections that prove to be unnecessary in that they are premature and reflect reflective density key settings that are not stabilized before such corrections are made. With the reflective density data that is available from the present apparatus, it can be clearly shown to the pressmen that many of the initial early corrections were in fact unnecessary and that the keys were returned to a position or setting that was close to the presets, albeit many thousands of impressions later.

Figure 10A:
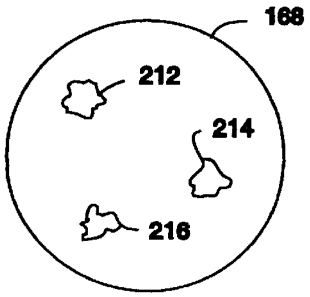
FIG. 10A is a side view of a highly reflective standard used for calibration of the digitizing portion of the apparatus of the present invention.
Figure 10B:
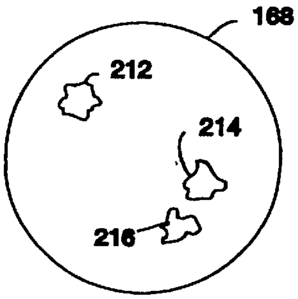
FIG. 10B is another side view of the highly reflective standard used for calibration of the digitizing portion of the apparatus of the present invention.

In accordance with an important aspect of the present invention and referring to FIG. 11, the carrier 46 can be moved to the left as shown so that the CCD matrix sensor 30 is in position to acquire a matrix image of either the white standard 168 or the black standard 170 for the purpose of calibrating the CCD matrix sensor and the digitizing portion of the apparatus. The standards are of a generally flat circular shape as shown in FIGS. 10A and 10B and are Spectralon color standards manufactured by Labsphere, Inc., P.O. Box 70, North Sutton, N.H. 03260. The standards are calibrated and are measured for 8 degrees/hemispherical spectral reflectance factor using a double beam ratio recording integrating sphere reflectometer. As previously mentioned, it is preferred that the standards 168 and 170 be housed in a protective enclosure 166 so that dust particles will not be present on the surface of the standards which can dramatically affect the intensity readings that are obtained for each pixel during the image acquisition by the CCD matrix sensor 30. It is for this reason that the carriage preferably has a mechanism that will open a cover or the like to enable the CCD matrix sensor to acquire a matrix image of the standards 168 and 170.

To calibrate the digitizing portion of the apparatus, the CCD matrix sensor acquires matrix images of the black and white standards and the matrix image is digitized so that each pixel of the digitized image has an the intensity level that can be within the possible range of 0 to 255. However, the calibration process sets the intensity value of the black standard to the value of preferably approximately 8 and sets the value for the white standard at approximately 240. This is accomplished on three independent channels of red, green and blue and all are handled individually.

To start the calibration process, the carriage 46 is moved to the location of the standards so that matrix images can be acquired. Referring to FIGS. 13A through 13C, which is a flow chart for obtaining the white level and the black level, the motor 52 (FIG. 1) is moved to its zero position which is the end of travel limit (block 202) of FIG. 13A and the pixel data memory 70 (FIG. 1) is tested and any bad data values are removed. After this is done, the main loop is started (block 204) and the routine determines if it is the second time through the loop (block 206). If it is the first time through the loop, it merely determines whether the pixel data memory 70 is not nonfunctional. If it is the second time through the loop, then the routine adjusts the horizontal phase (block 208). This is done to make sure that the acquired matrix image includes the active video portion rather than timing information such as the horizontal pulse. The phase is adjusted so that active video is acquired.

The routine checks for spots (block 210) on the standards as well as the strobe glass window 154. This can be appreciated by referring to FIGS. 10A and 10B which illustrate two matrix images of the white standard 168 which has spots 212, 214 and 216. The matrix image shown in FIG. 10B is an exaggeration of what would be acquired after having moved the CCD matrix sensor 0.020 to 0.030 inches relative to the matrix image of FIG. 10A. The apparatus is adapted to logically determine that the spot 216, by virtue of having moved to the right in FIG. 10B relative to its location in FIG. 10A was a result of dust being located on the window 154 rather than on the standard 168 itself. Since many of these spots will detrimentally affect the accuracy of the standards, the standards and the glass windows 154 should be cleaned when such spots are detected.

However, even though the standards and windows can be cleaned, the apparatus of the present invention also ignores the pixels where the spots are located during its analysis and does so by measuring the pixel intensity of each pixel and disregards the pixel if it is not within predetermined threshold values. In other words, if the matrix image is of the black standard, then the reflectance should be very low and a spot that has an intensity value above 40, for example, would be thrown out. Similarly, if the matrix image is of the white standard, then reflectance values below approximately 200 would be thrown out or disregarded during the calculation of the average of the pixel values for that standard.

After the spots are located as indicated from block 210, the routine causes the CCD matrix sensor to be moved to the black standard (block 212) and acquires a matrix image which is digitized and set to a predetermined level, which is preferably approximately 8. The CCD matrix sensor and associated components acquire successive digitized images until the level is at 8 plus or minus 0.25 pixels. If not within the range, there are adjustments made until that tolerance is met, and it may require about 8 acquisitions. The carriage 46 then moves the CCD matrix sensor to acquire a matrix image of the white standard 168 and the system is set to have the white level at 240 plus or minus 0.95 (block 214). There are successive digitized images acquired of the white standard until the white level is also within this tolerance. When this is completed (block 216), the routine returns to the start of the main loop (block 204) and the routine is repeated twice more, for a total of three times. Once this is completed, the apparatus returns to the black standard and acquires 10 digitized images which it averages to provide a value for use by the apparatus. It then does the same for the white standard and the averages are stored in memory 218.

The values that are used by the apparatus consists of only the average of the 10 digitized images for each standard that are acquired after the last pass through the routine. The reason for using these values is that there is an interaction between the black level and the white level, particularly when the black level is set to 8 and the white level to 240. Because of the slight interaction with each other, it is desirable to iteravely set the levels by going back and forth between the standards so that the resulting levels are accurate.

It should be understood that the calibration routine is run when the power to the apparatus is initially turned on, and is required to be recalibrated more frequently until the apparatus reaches stable running temperature. However, if the press is stopped, for example, the CCD matrix sensor is recalibrated to make sure that the levels are accurately set. Also, the calibration only requires approximately 30 seconds to one minute to complete.

The routine of FIG. 13A also employs some subroutines, particularly those of FIGS. 13B and 13C. The subroutine of FIG. 13C relates to acquiring a digitized image (block 220) which results in the pixel data memory 70 providing a sum of the pixel values (block 222) which is analyzed to determine if it has been successful (block 224) and if so calculates the average pixel values for the area (block 226) which results in the end of the subroutine (block 228). However, if the read successful determination (block 224) is no, then the subroutine steps the unsuccessful read counter (block 230) to attempt to find an area of good pixels, preferably an area of 300 by 300 pixels, and if it is unsuccessful in doing so after nine attempts (block 232), it resets the pixel data memory and strobe control 64 to acquire another digitized image (block 234). When that is done, the unsuccessful read counter is cleared (block 236).

With respect to the subroutine shown in FIG. 13C, the routine acquires a digitized image (block 250) and the pixel data memory 70 routine locates the spots in the digitized image (block 252) which if successfully completed (block 254) results in data identifying the spots being forwarded to memory (block 256). If the read was not successful, then the read counter is stepped (block 258) and if there are nine unsuccessful reads (block 260), the pixel data memory 70 is reset as is the strobe control 64 and another image is acquired (block 262). Once this is done, the read counter is cleared (block 264).

In accordance with yet another important aspect of the present invention and referring to FIG. 11, it is apparent that the strobe units 40 are positioned to direct the center of the light to a point 152 which is also the center line for the CCD matrix sensor 30. The light passes through the windows 154 to the area of the web and illuminates the web from two directions. Since the intensity of the pixels of an acquired matrix image is a function of the amount of light that is produced by the strobe units, it is important that the area of the acquired matrix image be uniformly illuminated or that the illumination of each area be known so that any variations can be compensated for.

The apparatus does an analysis of the intensity of the light produced by the two strobe units to determine what the light discontinuity characteristic is and provides compensation for any unevenness in light across the matrix image. The apparatus does this by analyzing areas of the total acquired digitized image taken from the white standard, with the areas being preferably about 64 by 64 pixels. The apparatus averages the intensity of the pixels within each area and then stores the average value with the address or location of each area so that during compensation, any compensation factor will be applied to the measured intensity values for the pixels that are located within each area. The compensation analysis is only required to be performed during initial alignment, and perhaps if optical components are adjusted or changed thereafter.

The software routine for performing the light discontinuity compensation is illustrated in FIG. 14 beginning at block 270. The first thing that is done is to clear the temporary storage values (block 272) and then start an image analysis loop which results in the CCD matrix sensor moving to the white standard to acquire a digitized image thereof (block 276) and reset maximum intensity values. The routine then starts an area loop 278 where sequential areas of 64 by 64 pixels are analyzed (block 280) and the average intensity value for each area is compared to noise measured and a maximum value is checked for. There are 12 by 7 of such 64 by 64 pixel areas and the light field discontinuity compensation factor is calculated by averaging the intensities in each of the areas approximately 20 times. The routine sequences through the entire acquired digitized image and continues to run through the loop until it is done with all of the 64 by 64 areas in the acquired digitized image (block 282). When it is, then the areas are normalized to the maximum and the normalized values are saved in memory (block 284). When all images have been completed (block 286), the average stored images are then stored in permanent memory.

It should be understood that there is a light discontinuity analysis done for each channel of the CCD matrix sensor system, i.e., the red, green and blue channels will each have a light discontinuity compensation factor for each of the 64 by 64 pixel areas within the image. The brightest intensity is then set at 1 and all others are then calculated relative to the brightest and are typically values such as 0.97, 0.98, 0.99 or 1.0.

In accordance with another important aspect of the present invention, the accuracy of the reflective density measurements is also influenced by the phenomenon that is referred to herein as light scattering, which means that the reflective density determination can be influenced by the relative location and content of the printed matter adjacent to the color blocks of the color block set 112 that is part of the matrix image that is acquired. As shown in FIGS. 3 and 4, the region 122 above the line 114 can and probably will contain printed matter, as will the region 122 below the line 120. The acquired matrix image 138 shown in FIG. 4 includes approximately seven color blocks that also necessarily includes a portion of the areas 122 of the acquired matrix image.

Since each color block set 112 may have printed matter 122 that varies in overall lightness depending upon the content of the printed material in the image, the number of light and dark pixels can vary at each key across the width of the web. Light scattering effects are substantially produced by higher reflective values, i.e., higher pixel intensity, located in the field of view. However, within the field of view, such higher intensity pixels have more effect, the closer the pixels are to the pixels being measured. Both of these effects, i.e., the amount of high intensity pixels and their closeness to the pixels being measured, are asymptotic in character. The CCD matrix sensor has a focusing lens and a CCD matrix sensor prism which splits the matrix image into red, green and blue channels and depending upon the amount of white that is present in the matrix image that was acquired, a small area such as a color block will produce one reading if it is surrounded by black and another reading if it is surrounded by white. The light scatters when it goes through the lenses and ends up changing the reading of the color block of interest.

It has been found that if a color block set is being analyzed and the area 122 (FIG. 4) around it is all white, it is generally measured to be about 94% white. This is due to the fact that of the seven color blocks, only black and the color block of interest in each channel are dark. Considering the three channels, there are therefore only 9 dark blocks in the three digitized images. If the areas 122 are black, the total white area drops to approximately 80% white.

A light scattering compensation must be determined for each of the three channels because the readings that are obtained from each of the red, green and blue channels varies relative to one another, depending on the content of the printed matter of the image being acquired. This is partly due to the fact that the strobe units are very bright in blue light, which makes yellow stand out. The strobe units are preferably Xenon strobes which have a predominant blue light component. While the output of the Xenon strobes are relatively constant, they can vary up to plus or minus 5% from one strobe firing to another and for this reason, the photo diodes 172 (FIG. 11) are positioned to measure the output of the strobe units 40 and the actual output for each strobe is fed back to the pixel data memory 70 and is used to compensate the intensity values that are obtained for the individual color blocks during the reflective density analysis. The photo diodes integrate the light put out by both strobes. While the intensity of light produced during individual firings of the strobe units can vary as much as 5%, it has been found that the variations are random and are generally about 1%. Such variations do not result in substantial variations in the intensity values produced, i.e., perhaps 0.75 pixels of intensity. However, compensation for such variations is desirable, and it may be advantageous to have three sensors for each strobe unit, with suitable filters positioned in front of the sensors, so that the intensity of the strobe unit can be measured for each color channel to have a more accurate measurement of the variations of the strobe firing for each color.

Figure 7:
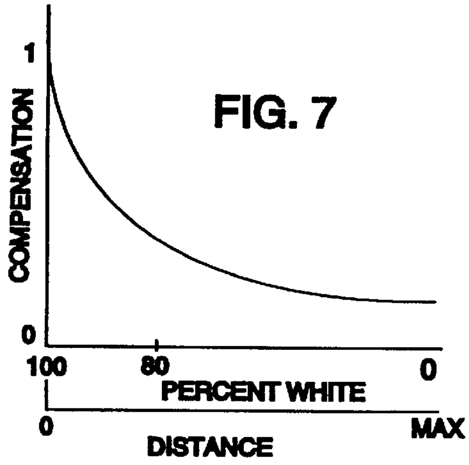
FIG. 7 is a graph of an approximate representative light scattering compensation curve.

To quantify the light scattering phenomenon, print test patterns can be used to model the scattering effect and obtain data that will approximate the light scattering compensation curve such as that shown in FIG. 7. The compensation for the light scattering phenomenon may be as much as 4 to 5 within the range of 8 to 240 and is enough that inaccurate readings would result if compensation were not made. This data is stored in memory for each color. This produced a series of data that resulted in an asymptotic chart as shown in FIG. 7 which produces intensity compensation factors that may be unity down to approximately 0.9, as the percentage of white pixels to the total pixels ranges from 100% to 0. The development of data that defines such a curve needs to be done only once for each color, and the curves are then used for each apparatus that is manufactured. However, it should be understood that the amount of light scattering compensation is done for each print job, and a point on the curve for each color for each key is stored in memory for use in compensating for the light scattering that is measured.

To develop the light scattering compensation data and light scattering curve shown in FIG. 7, the apparatus analyzes the acquired digitized image of each channel and counts the total number of white pixels within the total image to determine the percentage of white in the total image. The pixels are considered white if they have an intensity value that is greater than half way within the total range. Once the percentage is determined by averaging 6 light scattering passes of data, the light scattering data is stored in memory and is used to compensate the reflective density data that is measured during a reflective density analysis of each color block at each key during operation. It should be appreciated that the lowest percentage of white pixels possible is 80%, so the area of the curve that is actually used is the left portion of the curve shown in FIG. 7.

The routine that is used to acquire light scattering data is illustrated in FIGS. 15A, 15B and 15C, with starting block 300. The routine initially calculates the starting and ending locations for the pass of the CCD matrix sensor across the web. The manner in which the apparatus locates the edges of the web and the calculation of the width of the web will be described. Once the starting and ending locations are calculated (block 302), the apparatus reads the press speed and calculates the speed that is necessary to acquire images of the color block sets at each key location (block 304). The apparatus also calculates the acceleration time which is the time required for the carriage 46 to be ramped up to speed starting from a stopped position at a location that is left of the actual web edge 116 shown in FIG. 2. The press speed is obtained from the encoder 50. If the acceleration time is acceptable (block 306) then the routine sets up the motor speed, the strobe control 64 and pixel data memory 70 and priority is established for this operation (block 308). If the start up time is not acceptable (block 306), then the motor controller 58 changes the location of the carriage 46 so that it will be accelerated and be at the proper path speed by the time it reaches the first key (block 310). If the location is changed, then the press speed is read again, and the path speed and acceleration time recalculated. After the strobe control motor speed and pixel data memory has been set up, the routine then waits for the next strobe firing opportunity as well as waits for a calculated time using a high speed timer to delay and then starts the motor 52 moving and enables strobe interrupts (block 310).

With regard to the timing of the firing of the strobe, it should be understood that for each revolution of the encoder 50, there are 3600 counts. It is known that the apparatus wants to fire the strobe at a particular encoder count of 2000, for example, and that this time is 8 milliseconds, but depending upon how fast the encoder is rotating, it may or may not require a different number of earlier counts to get the strobe to fire at the appropriate time. To determine what the count should be, the apparatus counts up for ¼ of a revolution using a fixed speed clock and it times how long that takes and determines how many counts it needs to equal 8 milliseconds. When that is determined, it resets the CCD matrix sensor and then down counts and fires the strobe at the 2000 count.

The apparatus then calculates the position and calculates the distance to the closest key (block 312), confirms whether the carriage 46 is up to speed (block 314), which if yes, inquires as to whether the CCD matrix sensor is close to the key (block 316), and inquires whether the press speed has changed (block 318), and if not, it then does the next fire of the strobe and acquires an image (block 312). If the press speed has changed, then the motor speed must be adjusted to match the press speed (block 320). If the CCD matrix sensor is not close to a key (block 316), then the motor speed is recalculated to arrive at the next key on time (block 322). Also, if the carriage is not up to speed (block 314), the routine inquires as to whether the next key is on the web (block 324), and if not, returns to block 312. If the key is on the web, then the apparatus sets up the pixel data memory 70 and the strobe control 64 and it fires the CCD matrix sensor to acquire two images (block 326) and starts the analysis of the first image.

The routine then starts the main key loop (block 328) and calculates the position and the key number (block 330), determines whether it is close to the key (block 332), inquires if the press speed is changed if it is close to the key (block 334) and recalculates the motor speed to arrive at the next key on time if it is not (block 336). If the press speed has changed, it adjusts the motor speed to match the press speed (block 338) and if it has not, it starts the next acquire of an image (block 340) and analysis. The routine then determines if the previous key was the last key on the web (block 342) and if not, returns to block 328 to execute the loop until the last key has been acquired and then resets the pixel data memory 70 and the strobe control 64 (block 344).

The routine then stores the data acquired (block 346) and starts an analysis loop 348 which includes getting a intensity percentage which is mapped into the light scattering data (FIG. 6) and determines the compensation for each particular key (block 350). This loop is continued until all data has been analyzed (block 352) and the routine inquires whether data was found for all of the keys (block 354) and if has, it averages the past data into prior saved data and counts that particular light scattering pass (block 356). If it is not the final, i.e., the 6th light scattering pass, the routine reverses the path direction (block 358) and restarts the subroutine at block 300 until the sixth light scattering pass is completed which then ends the subroutine.

In accordance with yet another important aspect of the present invention, it is important to initially locate the edges of the actual web during operation to confirm the width of the web. This is done at the beginning of a press run, and does not need to be done again for that run. Knowing the width is important in order to determine the number of keys that are used in the control of the reflective density by the printing units across the web, with it being understood that there is a color block set 112 to be found for each key. It is also important to monitor at least one edge of the web after the width has been calculated so that the apparatus can determine whether the web has moved laterally relative to the roller 38 during operation of the press.

It is particularly important when the press running in either the maintain mode or the run mode wherein reflective density passes are made only approximately every 500 impressions and the apparatus is idle between the taking of such reflective density passes. However, the apparatus will track the edge of the web during its waiting state so that it can accurately calculate the location of the color block sets, and enable the color block sets to be located when it takes a reflective density pass.

The presence of printed matter at the edge of the web can complicate the finding of the location of the edge of the web. Given the fact that printed matter may be printed up to the very edges of the web, it is often difficult to distinguish printed matter on the web from the roller 38 surface. While the roller is typically made of steel which is highly reflective, in actuality, ink is often present on the roller surface adjacent the web so that it is difficult to distinguish the web from the roller. Basically, the edge of the web is determined by acquiring images of a known position in the web and then generally stepping toward the edge and analyzing the pixels to locate the edge, with the analysis relying on the fact that white paper, which is typically what the web is, has an intensity value which is known to be between 240 and approximately 128. If the roller has no ink on its surface, it generally produces intensity values of the maximum of 255. Therefore, if the intensity is over 240, it is known that the roller surface is being analyzed and if it is between 240 and 128, it is the web itself. If it is below 128, then it is determined to be the printed matter on the web or ink on the roller.

Figure 8:
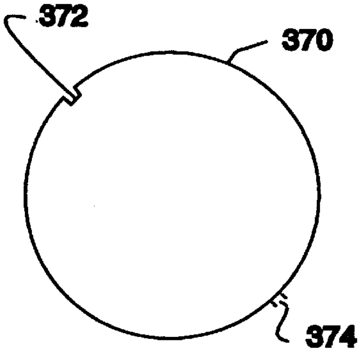
FIG. 8 is a simplified diagrammatic end view of a printing roller of a printing press.
Figure 9:
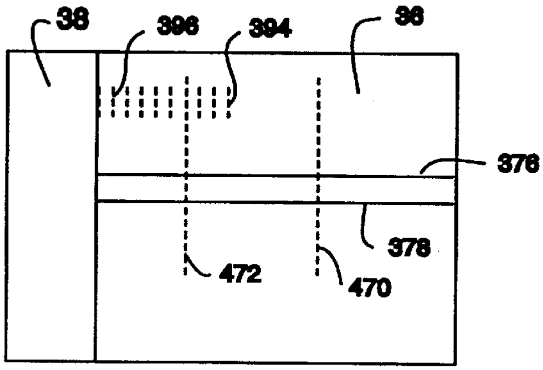
FIG. 9 is a simplified representational side view of a portion of a web on a roller.

The apparatus takes advantage of the fact that all printing presses have printing cylinders to which printing plates are attached. Referring to FIG. 8, which is an end view of a printing cylinder 370, the printing cylinder 370 has a gap 372 which is used to attach printing plates to the cylinder 370 and the printing plates extend from one side of the gap around the circumference of the cylinder 370 to the other side of the gap where it is attached. The importance of the gap is that it is present on every impression cylinder and provides a printing gap on the web because printed matter cannot be printed on the portion of the web that overlies the gap 372. The portion of the web that would be present in the area is represented by the area that results from the gap 372 is shown between the lines 376 and 378 as shown in FIG. 9.

The gaps 372 are becoming smaller in state of the art printing presses, and some presses now have a gap of only 0.040 inches, compared to a full 0.25 inches in many previous presses. The printing plates print two pages with the space between the impressions being identified at 124 where the color block sets are printed. In addition to reducing the dimension of the gap 372, the state of the art presses are also reducing the gap 124 shown in FIGS. 3 and 4, and may be only 0.100 inches. This requires the height of the blocks to be only 0.09375 inches, which is approximately 112 pixels. The height of the blocks may become even significantly smaller.

The apparatus locates the edge of the web using routines shown in FIGS. 16A, 16B and 16C as well as FIGS. 17A, 17B and 17C. Referring to the routine of FIG. 16A, it starts at block 380 and switches on a i-mod mode selection (block 382) and sets it to either case 1 or 2 (block 384) and if it is the first time through the routine, it initially sets a i-mod equal to 0 (block 386). When the routine is started, it is important that the apparatus know where it is and for that reason, the motor is moved to the left-most stop position so that it then can be moved to the correct position for starting the analysis.

The general scheme of this routine is to locate a color block which then enables it to verify the size of the paper and determine the color block set locations. This is for the purpose of making sure that the apparatus is acquiring images of the color block sets. Once it finds the end color block sets, it uses their existence to check how wide the paper is. If a press run is continuing in a maintain mode, the apparatus is continually scanning by looking for one of the color block sets on the edge of the paper to see if the web is moving either horizontally or circumferentially, i.e., it is tracking the web.

The routine runs in three modes, i.e., the start up mode where the first time it is run, it is attempting to locate the color block set and determine the width of the paper. Once it has done that successfully, it checks to make sure that the keys on the edge of the web are usable. The reason for this is that sometimes indicia is printed over the top of the color block sets or the end color block set may be half on or half off the web and is not capable of being used. Thus, the routine checks the outermost keys to see if the keys are valid and if the outermost key is not, it moves to the next key and uses that key color block set to track the web. Thus, in the start up mode, the apparatus locates the color block set, determines the width of the paper, and finds valid keys and once that has been accomplished, it merely analyzes the edge key during operation and if it loses the edge key, then it jumps back into a search loop looking for it. If that fails for some reason, the apparatus starts the whole process over by looking for the original color block set.

Returning to the routine shown in FIG. 16A, once i-mod is set to zero (block 386) the apparatus resets the old width and zeros the motor (block 388) and moves to i-mod equal 1 (block 390). This block inquires whether the impressions are off, meaning that there is no printed matter on the web and the web is therefore white. If this is the case, the routine scans the operator edge of the web (block 392) by examining pixels that are acquired in an image at locations such as beginning at location 394 (FIG. 8) using a routine that will be hereinafter described, and determines if the area of interest is at the edge of the web. If it is not, then it requires additional images and analyzes the pixels within those images such as at 396 of FIG. 9 until it reaches the edge 116. After having located the edge of the web 116, it identifies the location and then moves to the opposite edge of the paper (block 398) of FIG. 16A and determines the location of that edge. It then calculates the width of the web (block 400) and does so three times if possible (block 402) and calculates the average web width (block 404).

If impressions appear before the third time, the apparatus must switch to the routine that will be described in connection with FIGS. 17A, 17B and 17C. The above described portion of the routine is carried out whenever the press starts and it also runs constantly during the maintain mode of the apparatus where a sample is taken approximately every 500 impressions and this routine tracks the edge of the web. Returning to FIG. 16A, if the press is printing so that impressions are on the web, the apparatus initially searches for a color block set in the center of the web (block 406) and starts the search loop (block 408) which is a subroutine that will be described in connection with the flow chart shown in FIG. 20.

The first time that the routine is run it starts with i-mod equals 0 but then moves to i-mod equals 1. The routine attempts to initially locate a color block set which cannot be done if the impressions are off, i.e., no printing is occurring. However, if the impressions are on, it attempts to locate the color block set by moving the CCD matrix sensor to the last known location of a color block set and acquires an image. If the color block set is acquired, then it can continue the analysis (block 410). If the last known location does not produce a color block set, then it searches nine other previously known locations sequentially in an attempt to locate the color block set and if none of those locations reveals a color block set, then it performs a search of the full web to find a color block set (block 412).

Once a color block set is located, then the apparatus moves the CCD matrix sensor to center the color block set (block 414) then inquires whether the i-mod is greater than 1 (block 416). If it is greater than 1, it sets i-mod equal to 4 (block 418) and if not, it inquires whether it is equal to 1 (block 420). If i-mod is not 1, the routine attempts to find the first key (mode 422), then the last key (block 424) and it calculates the number of keys (block 426) and sets i-mod equal to 4 (block 28) which is the running mode of the apparatus. At i-mod equals 4, the end key is monitored as described above. Thus, the routine finds the end key (block 430) and then moves to case 4 (block 432) where it moves to the first key (block 434) and inquires whether the color block set has been found (block 436) which if yes, ends the routine (block 438). However if it does not find the color block set, the routine is switched to i-mod equals 3 (block 440) where it attempts to find the color block set.

In accordance with yet another important aspect of the present invention and referring to the routine illustrated in the flow charts of FIGS. 17A, 17B and 17C, this flow chart illustrates a routine for finding the edge of the web in the event that the impressions are on, i.e., there is printed matter on the web and none of the color block sets can be located. Basically the subroutine shown in FIGS. 17A through 17C operates to locate the edge of the web by locating the gap between lines 376 and 378 (FIG. 9) on the web and then finding the edge of the web using the gap area because it is known that no printed matter will be on the web at this location.

Referring to FIG. 17A, the routine begins at block 460 and it first determines the starting point for the edge search which is near the center of the web (block 462). The main loop is then started (block 464) and the pixel data memory 70 is tested and the FIFO buffers are cleared (block 466). The routine then acquires a image 468 and it analyzes the acquired image by reading two vertical lines of the acquired image, such as is shown at 470 and 472 of FIG. 9. The exercise is to acquire images and analyze vertically until there is concurrence in the analysis from traveling along the lines 470 and 472 until the gap between lines 376 and 378 is reached and confirmation that the images are indeed in the gap. At this point then the routine can move toward the edge as was described with respect to the points 394 and 396 described previously with respect to FIG. 9.

Returning to FIG. 17A, two vertical lines are read (block 474) and the search for the gap is started (block 476). The routine uses groups of four pixels to find an average pixel value throughout the analysis (block 478). The reason for using four pixels is that some paper webs have a texture which is very rough and can provide distorted readings because of the unevenness of the surface. When four pixels are averaged, there is good assurance that the value will be consistent regardless of the roughness of the paper.

The summed values are then analyzed to determine if the mean value is within a predetermined range (block 480) and if so, it is then marked as the beginning pixel in the gap (block 482) and the pixel count is then stepped (block 484). If the mean value is not within range, it determines whether there are more than 50 consecutive values previously in the range (block 486) and if not, it clears the pixel count (block 488) and causes the analysis to move down the vertical lines 470 and 472 of FIG. 9 by one pixel (block 490). If there were greater than 50 consecutive values in the range, then the pixel is marked as the end pixel (block 494) and the gap count is then stepped (block 496). After the analysis moves down the lines one pixel, it has reached the end of the gap search loop (block 492) and if it has not located the gap, the gap search loop is again started (block 476).

The routine makes sure that the gap is found on each of the lines 470 and 472 and also confirms that the gap 112 is in the same place for each of the lines (block 498). The routine then sets a pointer in the middle of the gap (block 500) and then analyzes two horizontal lines in the gap (block 502) and for each set of 20 pixels in the lines (block 504) finds the average pixel value (506) as well as the standard deviation (block 508) and then proceeds to the next set of pixels (block 510).

For every five sets of pixel and deviation data (block 512), it analyzes each line (block 514) and counts the number of values within the predetermined range (block 516) and then proceeds to the next line (block 518). The routine then determines if more than 80% of the values are within the range (block 520) and if not, determines that the analysis has stepped off of the web (block 522). If it is greater than 80%, then it sets an "on web" flag and stores the edge position (block 524).

The routine then indexes to other data arrays (block 526) and returns to block 512. The routine then determines whether the edge is within the acquired image (block 528) and if it is, analyzes whether there is more of the web shown than that of the roller, it invalidates the edge position. If the edge is not in the image, it inquires as to whether it is an invalid position (block 532). If it is an invalid position, it converts the position to inches (block 534). If it is not an invalid position, it inquires whether it was the first attempt and if the position is on the web (block 536). If it is not on the web, then the routine moves the CCD matrix sensor in (block 538) but if it is, it moves the CCD matrix sensor out (block 540). If the CCD matrix sensor is moved in, the routine inquires whether it is past the limits (542) and if not, it determines if the edge of the web has been found (block 544). If the CCD matrix sensor is past limits (block 542), it is set to the original search position (block 546). If the edge is found, it then returns the position of the edge of the web (block 546) and the routine is ended (block 548).

The aforementioned software routines are necessary in setting up the apparatus to acquire the actual reflective density data during operation and accurately determine a reflective density value. The routines effectively locate the color blocks of the color block sets for each key and calibrate the digitizing portion of the apparatus, as well as compensate for intensity of the strobe units, discontinuity of the light over the area of the image and compensate for light scattering.

The routine that is used to acquire reflective density data is illustrated in FIGS. 18A, 18B and 18C which after being started, calculates the starting and ending locations for each pass (block 560), reads the press speed and calculates the pass speed and acceleration time that is required (block 562). If the start up time is okay (block 564), it sets up the motor 52 speed, the strobe control 64, and the pixel data memory 70 and increases the priority of the acquisition of reflective density data so that the operation will not be interrupted (block 566). If the start up time was not okay, then the start-up distance is changed (block 568) in the same manner that has been previously described in connection with FIG. 15A when light scattering data is acquired. Assuming that the start up time was okay and the motor speed, strobe control and pixel data memory have been set up, the apparatus waits for the next strobe firing, waits to use the high speed timer, and starts the motor 52 moving and enables the fire interrupts (block 570).

The routine then calculates the position and the next closest key (block 572), inquires whether the carriage is moving at the desired speed (block 574) which if yes, then determines if the CCD matrix sensor is close to the key (block 576). If the motor is not up to speed, then the program inquires whether the next key is on the web (block 578) and if not, returns to block 572. If the next key is on the web, then the routine sets up the pixel data memory 70, the strobe control 64 and acquires two images and starts the analysis of the first block (block 580, FIG. 18B). From block 576, if the routine determines that the CCD matrix sensor is not close to the key, it recalculates the motor's speed to arrive at the next key at the right time (block 582). If the CCD matrix sensor is close to a key, the routine then inquires as to whether the press speed has changed (block 584) and if it has, it adjusts the motor speed to match the press speed (block 586) and if not, it makes the inquiry (block 578) as to whether the next key is on the web.

Once the image has been acquired for the initial key, the program starts the main key loop (block 588) and calculates the position it is in as well as the location of the next key (block 590), inquires whether it is close to the key (block 592) and if not, recalculates the motor speed to arrive at the next key on time (block 594), but if it is, it then inquires as to whether the press speed is changed (block 596). If it has, it adjusts the motor speed to match the press speed (block 598), but if it has not, it acquires another image and starts the next analysis (block 600). If the previous analysis results are done (block 602) it stores those results and uses the results to recenter the image (block 604). If there are not any results, it inquires whether the last key has been done (block 606) which if not, returns to the start of the main key loop (block 588). If the last key has been done, then it resets the pixel data memory 70 and the strobe control 64 (block 608) and reads the remaining analysis results and stores them in memory (block 610).

At this point, the routine starts the reflective density analysis loop and initially provides the average sum, the number of pixels, the color that is being analyzed, the position on the screen, and the calculated raw average of the reflective density (block 614). It then calculates the compensation for the light discontinuity that is required for the particular pixels of interest as well as the light scattering compensation (block 616) and obtains the white and black levels for the color being analyzed and calculates a compensated average (block 618). It then calculates the reflective density from the compensated average and white and black levels for the color being analyzed (block 620). It calculates the key number and stores the reflective density value under the key number and the color and sets a good reflective density status (block 622). It then inquires as to whether all data has been analyzed (block 624) and if not, returns to the start of the analysis loop (block 612). If it has, then it steps the number of the paths and reverses direction (block 626) and the subroutine is ended (block 628).

The data that is obtained from the reflective density analysis loop is the color that is being analyzed, the x and y coordinate positions on the image, the height and width of the area being analyzed, the sum of all the pixels in the area and the number of pixels that were summed.

The subroutine that is used to locate the color blocks within the color block set such as shown in FIGS. 3 and 4 is set forth in the flow chart of FIGS. 19A and 19B. The subroutine begins at block 640 and the apparatus is set up to acquire an image at the first key location (block 642). The image is acquired (block 644) and the color block set search routine hereinafter described with respect to FIG. 27 is invoked to locate all color blocks 130–136 that are present in the image (block 646). For each color block that is found (block 648), the routine reads the data for a block (block 650).

As shown in FIG. 6, the color blocks are approximately 60 pixels by 112 pixels in size and the analysis area is a rectangle 651 that is preferably located within the center of the color blocks and is preferably of a 40 by 70 pixel size. The routine then determines if the read is successful (block 652) which if it was, inquires whether there were four or more blocks (block 564) and the average vertical block location is calculated (block 656). It then determines if the block is greater than 50 pixels from the center of the color block (block 658) and if yes, adjusts the vertical position of the CCD matrix sensor (block 660) and resets the read counters (block 662). The apparatus then proceeds to the next block (block 664) which either returns to block 648 or proceeds to block 666 in FIG. 19B and inquires whether four or more blocks have been found. If four or more blocks have been found, the routine checks to see if the correct color block is being analyzed (block 668). This is done by verifying the correct order of the blocks, determining that the spacing is reasonable, confirming that every fourth block is the same color and confirming that the black block has a tab. The routine removes blocks that are not properly spaced (block 670). The routine then inquires to determine if the correct color block has been found (block 672) and if not, makes a horizontal adjustment of the CCD matrix sensor (block 674). If yes, the routine returns the number of blocks that were found (block 676).

Returning to FIG. 19A, if the read was not successful in block 652, the read counter is stepped (block 680) and if there are 20 unsuccessful reads (block 682), the routine times out and reacquires another image (block 684). If there are not 20 unsuccessful reads, the routine inquires there were greater than 40 unsuccessful reads (block 686) and if there were, it also resets and reacquires the image (block 688).

The subroutine that controls the searching to find a color block set, i.e., block 646 of FIG. 19A, is illustrated in FIGS. 20A–20C and starts at block 700. The routine of FIGS. 20A–20C therefore controls the movement of the carriage and CCD matrix sensor to locate the color block set if it has been lost. For each position where a search is done in the horizontal position (block 702), such as at locations 394 and 396, for example, in FIG. 9, the routine inquires whether the position is correct (block 704), and if not, position adjustments are made (block 706) and the CCD matrix sensor is then moved into position and is set up to acquire an image (block 708). For each vertical search, i.e., acquiring images vertically along the lines 470 and 472 of FIG. 9 (block 710), the vertical position and fire angle is calculated (block 712) and an image is acquired (block 714) after which the color block set search routine is executed (block 716).

For each block found (block 718), the data is read (block 720) and if the read was successful (block 722) the routine inquires whether there were four or more color blocks located (block 724). If the read was unsuccessful, the attempted read counter is implemented (block 726) and the routine inquires whether there have been 20 unsuccessful reads (block 728) which if there have been, the routine then times out and reacquires a image (block 730) (FIG. 20B). If there have not been 20 unsuccessful reads, then the routine inquires whether there have been more than 40 unsuccessful reads (block 732). If there are 40 unsuccessful reads, there is an assumption that the pixel data memory is malfunctioning and the routine totally resets the pixel data memory 70 and reacquires another image (block 734) and if not, proceeds to the next block 736. If there are four or more blocks located (block 724) the routine then calculates the average vertical block location (block 738) and inquires whether it is greater than 50 pixels from the center (block 740). If it is not, then the attempted read counter is reset (block 742). If it is greater than 50 pixels from the center, the program then adjusts the vertical position of the CCD matrix sensor (block 744) and resets the attempted read counter.

If four or more blocks are found (block 746), the routine checks to see if it is the correct color block (block 748) and inquires if all of the color block is on the screen (block 750) which if not, adjusts the horizontal position (block 752). The routine then removes blocks that are not properly spaced relative to one another (block 754). If the four or more blocks were not found, the routine inquires whether the color block has been found (block 756) which is also done after improperly spaced blocks have been removed. If the color block has been found, the routine returns the number of blocks that were found (block 758) and if the color block was not found, the routine inquires whether the image was close to the color block set (block 760) and if not, does the next vertical search (block 762) but if yes, makes a fine horizontal adjustment (block 764). For each vertical search, the routine returns to the routine block 710 (FIG. 20A) and if the next horizontal search is done (block 766), the routine returns to block 702 in FIG. 20A. If the color block set was not located within the given search space, the routine is then terminated.

The manner in which the apparatus operates to acquire data as a function of timing and press conditions and operations was generally described in FIG. 12, and is set forth in greater detail in the flow chart illustrated in FIGS. 21A, 21B and 21C. The routine starts at block 800 (FIG.

21A) and sets up a name in the control system 96, opens a memory area for storing data and attaches to CMP 103 (block 802). The routine then waits for the variable transfer, initializes the main data (block 804), waits for the image status and clears old messages (block 804). The system then initializes the motor, moves it to the left-most position and a sensor module scan to make a full traverse of the carriage (block 806) then initializes the pixel data memory 70, obtains white and black calibration data and also performs the light discontinuity data acquisition analysis and sends these variables through the CMP 103 to the processor 96 (block 808). The main loop is then started (block 810) which has been described in FIGS. 18A through 18C. If the routine has lost its CMP connection (block 812), it then tries to attach to the CMP again (block 814) and if it is still lost (block 816), it again tries to attach (block 818). If it is still not lost, it returns to the main loop 810. The subloop continues to try to attach until it is successful. If it has not lost its CMP connection, the routine then proceeds to an imaging status switchable loop 820.

Press conditions determine whether case 1, case 2 or case 3 conditions exist (blocks 822, 824 and 826) and the apparatus continuously loops through this subroutine in a manner whereby each time the routine goes through the main loop, either case 1, case 2 or case 3 will be run. The image status will then be stepped. If the image status is greater than 3, then it is set to 1 (block 828). Before the end switch block is reached, if case 1 is valid, or is set, the press is running, it is past the balance count (i.e., the count for triggering recalibration), it has been over ten minutes since a calibration has occurred and the apparatus is between passes (block 830). The apparatus performs a calibration and light discontinuity analysis (block 832) before ending the switch 828.

For case 2, if the press is running and is in the control mode, there is no blanket washing being done on the press and no splice being performed (block 834), the apparatus runs the get edge routines to locate the edge (block 836) before ending the switch (block 828). With respect to case 3, if the press is running in the control mode and it is ready to sample and there is no splicing and blanket washing being performed (block 838) the apparatus then acquires light scattering data or reflective density data and updates the values (block 840). After the end switch block is reached, the routine inquires whether the press is stopped (block 842) and if yes, determines whether it has been stopped over ten minutes. If it has been, it runs the calibration and light discontinuity routines (block 846). The routine then operates to switch on an IOPT loop (block 848) which is a switchable loop that sequences through cases 0 through 7 (blocks 850 through 864). Once it has sequenced through these cases, the routine returns to the start of the main loop (block 810).

Each of the cases 0 through 7 is initiated by the operator during operation of the apparatus. If case 0 is set, the apparatus is set to idle state. If it has been more than 10 minutes, the CCD matrix sensor is recalibrated and the light discontinuity analysis performed (block 865). If case 1 is set, the apparatus sends the mode ml status and sets up the start up mode (block 866). Case 2 sends a mode m2 command and sets up the run mode (block 868). Case 3 sets up the maintain mode (block 870). Case 4 is a user request to recalibrate the CCD matrix sensor (block 872) as well as perform a light discontinuity analysis or returns the motor to its home or zero position. Case 5 enables a view request to be handled and a particular portion of the web is located and an image acquired of that location which can be viewed by the operator. Case 6 permits a maintenance request to be handled and light discontinuity analysis to be performed (block 876). Case 7 sends a mode mo command and sets up a new job (block 878). If none of the cases are requested, the program ends the switch (block 880) and returns to the start of the main loop (block 810).

The software subroutine which calibrates the digitizing portion of the apparatus and performs spot analysis during the calibration is shown in the flow chart of FIGS. 22A and 22B and begins at block 900 which results in a pointer being established in the region of interest in the pixel data memory (block 902). The routine then searches a 100 pixel line and finds maximum and minimum red, green and blue values and calculates the average pixel value in the line (block 904). This is analyzed to determine whether the value is high enough that a white calibration standard is to be performed (block 906) and if so, the pixel value limit for the white standard in each channel is set up (block 908) and if not, the black standard pixel value limit for red, green and blue is established (block 910). The portion of the routine below the block 908 is virtually identical to that below the block 910 except for the distinction that pixels over a limit are not counted for the black standard, while pixels under the limit are not counted for the white standard. The steps that are carried out with respect to the white standard will only be described.

The routine starts to examine each pixel of a 730 by 450 pixel area (block 912) and determines whether each pixel is under the limit of approximately 120 (block 914). If it is under the limit, then the pixel is added to a segment indicating that a spot is present. If the pixel is a pixel of the white standard, then the routine inquires whether a segment is active (block 918). If it is active, the routine loops through known old spots 920, inquires whether the segment is part of a known spot (block 922) and if yes, enlarges the spot size before ending the spot loop (block 926). The routine inquires whether the segment is part of an old spot (block 928) and if not, it establishes a new spot (block 930). If it is part of an old spot, then that is the end of the area loop (block 932). The block 932 is connected to the block 912 and it should be understood that the entire pixel area must be analyzed. After the area loop is searched (block 932), a spot send loop is started (block 934) which forwards information relating to the spots to the processor 88. The routine sends the location size of the next spot 936 until the send spot loop is ended (block 938). The routine then sends the end of the data (block 940) and ends the subroutine (block 942).

The manner in which the apparatus performs the search for the color blocks and does the reflective density analysis is set forth in FIGS. 23A through 23E which starts at block 1000 and immediately sets a pointer to a region of interest in the pixel data memory and initializes the data to be analyzed (block 1002). Referring to FIG. 4 which illustrates a single bar, it is analyzed in the manner set forth in the flow chart of FIG. 23A through 23E. The routine sets up a vertical search from the center out (block 1004) and may start at a point 1006 in FIG. 4. The top of a vertical search loop is shown in block 1008 and the routine sets up a pointer to start a line horizontal search also from the center out such as at point 1006 in FIG. 4 (block 1010). The top of the horizontal search loop is indicated in block 1012 and the routine obtains red, green and blue averages for groups of four pixels at the start position (block 1014).

The routine then determines whether any of the three channel's average (red, green and blue) is below the white limit (block 1016) and if so, it determines the color of the average (block 1018). In this regard, the color block found will be one of the three color channels and the channel of the color that is the color of the actual color block being examined will be significantly lower in intensity level than the other two channels. If the block is black, then all three channels will be low and the apparatus uses a single channel for black color blocks.

In this regard, each channel receives only one of the colors of red, green and blue, and if the corresponding ink color which takes away from the signal level on the channel is present, then that channel will be low. The apparatus takes advantage of that fact by utilizing an exclusive-OR function in each channel, it can determine if that color is present. This is done by setting one input high (1) and if that color is present, a low (0) output from the exclusive-OR will be obtained. If the low output is not produced, then it is known that the particular color is no longer present or being measured.

After it has determined which color is being analyzed, the routine inquires whether this color has already been found (block 1020). If not, the routine sets up the various limits for block searches (block 1022) and sets up to search from the point 1005 in FIG. 6 to the left to determine the left edge 144 of the block (block 1024). The routine then steps left 5 pixels to get the RGB averages for the four pixels at that location (block 1026), determines whether they are within limits (block 1028), and if not, steps back within the block and the search of the left edge is completed (block 1030). If all pixels are within limit, the pixels are summed into the count (block 1032) and the routine inquires whether the analysis is at the edge of the image (block 1034) and if so, it sets the position to the edge of the image, and the search is completed (block 1036). If not at the edge of the image, then the routine inquires whether the search is completed (block 1038) and if not, it returns to block 1026 to step five pixels further left until the left edge is located.

Figure 23A:
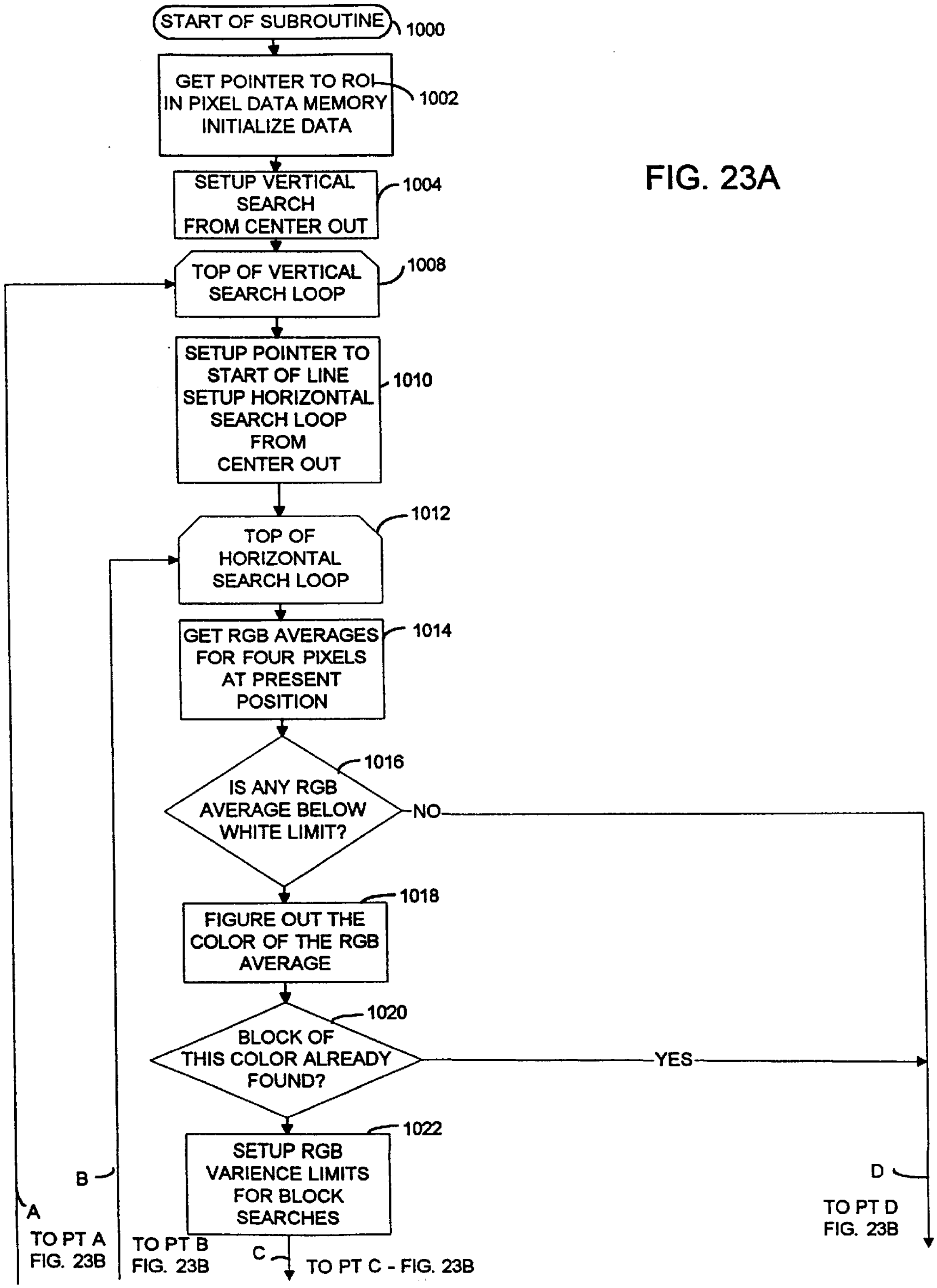
Figure 23B:
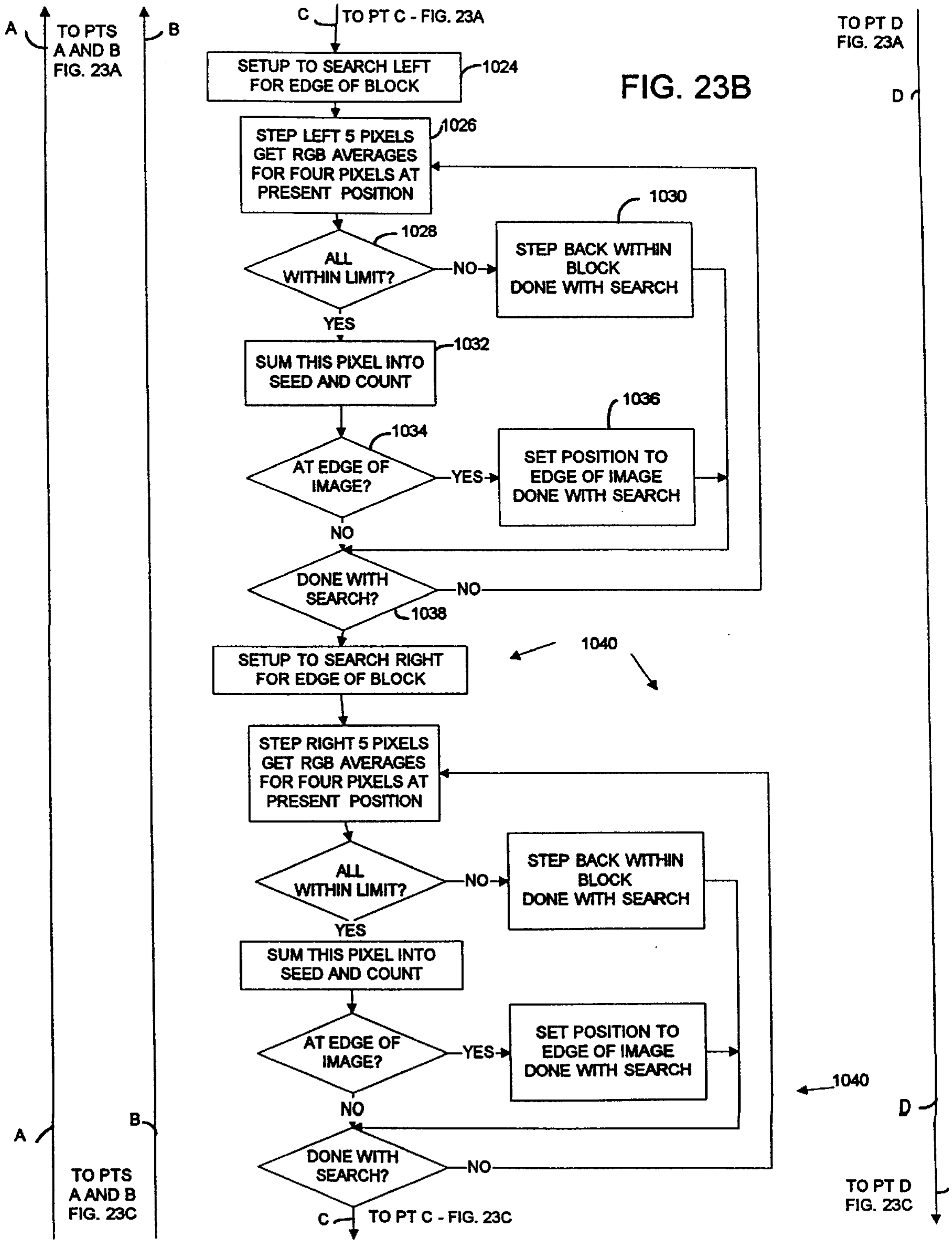
Figure 23C:
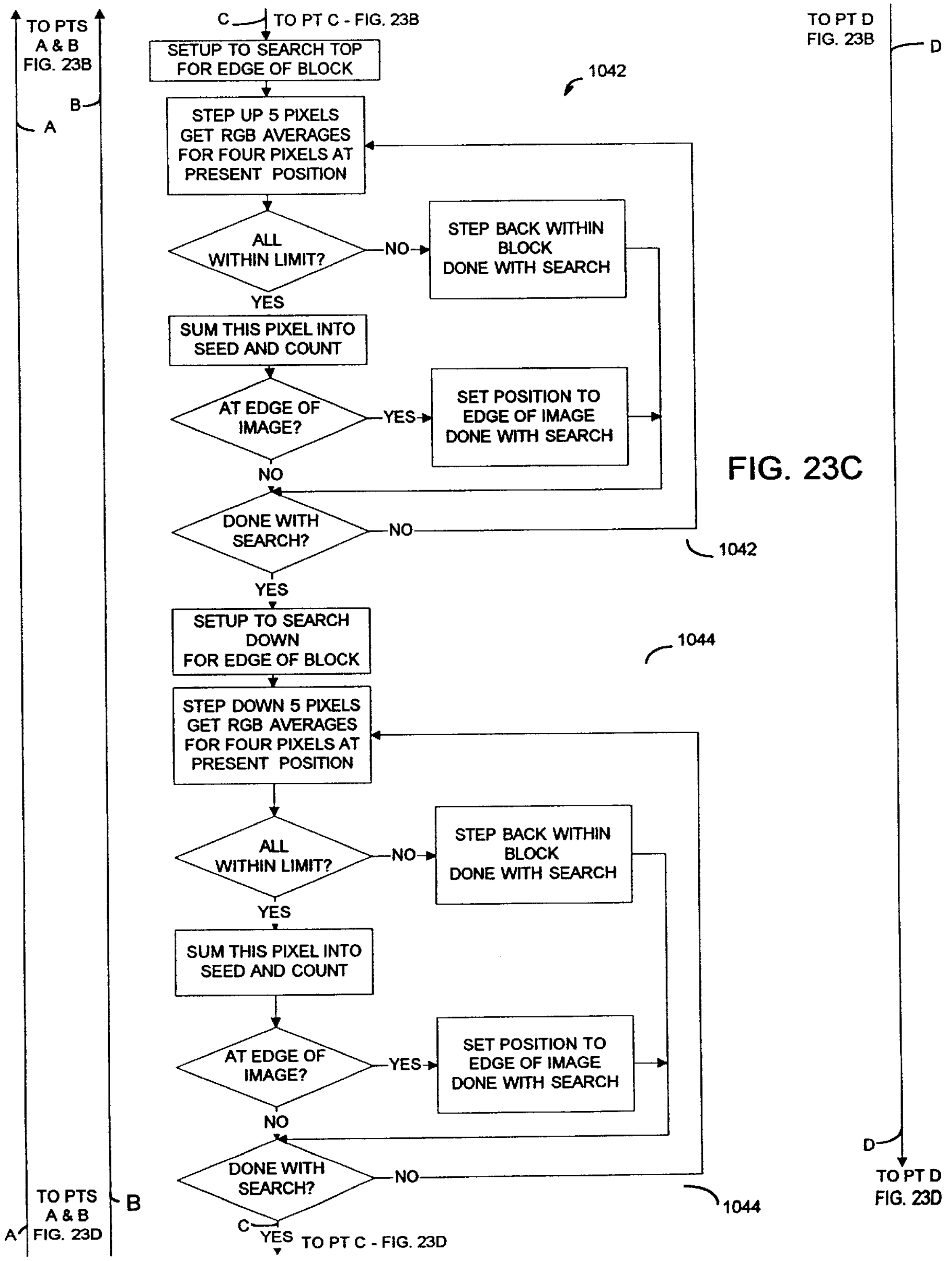
Figure 23D:
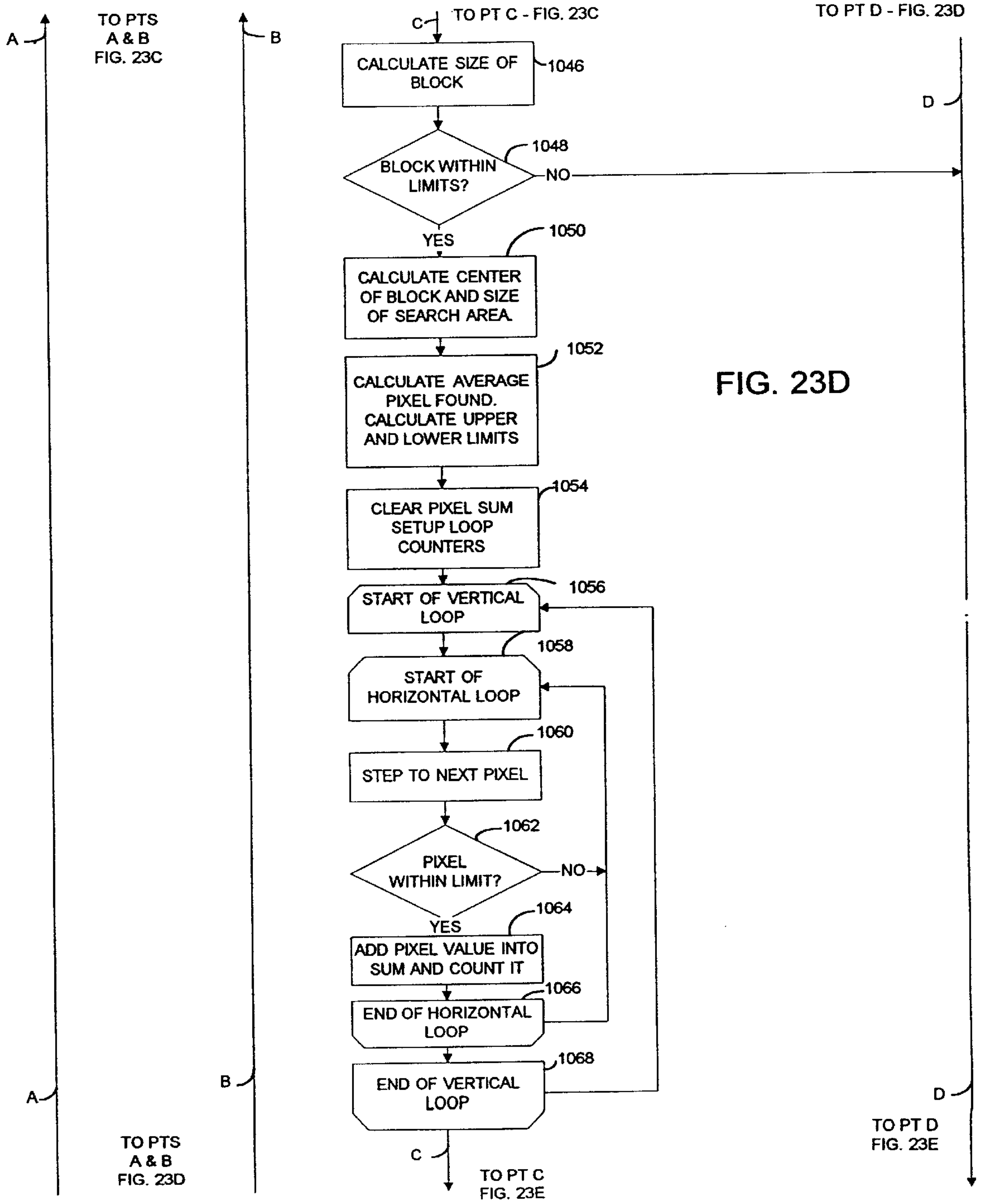
Figure 23E:
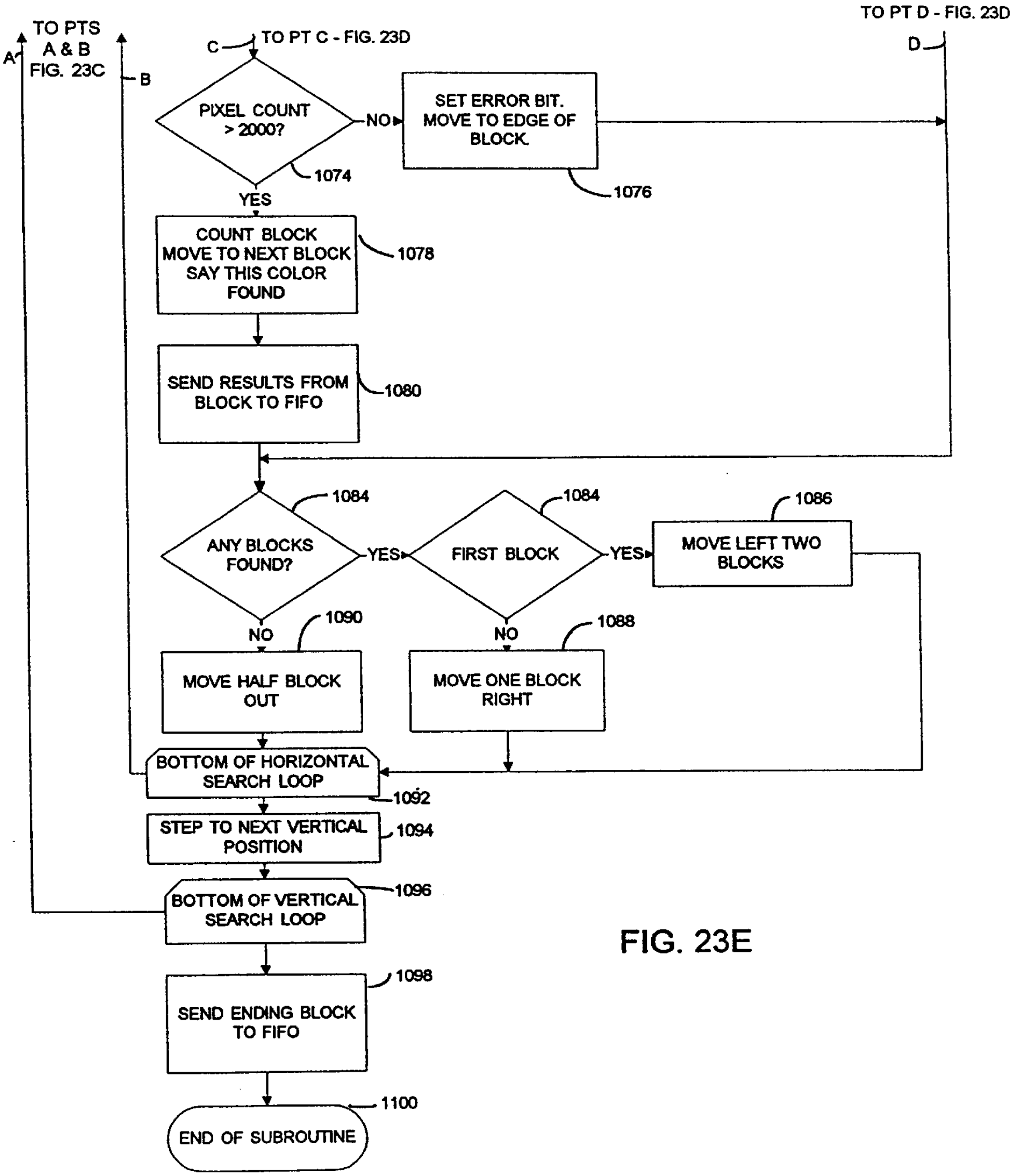

The routine then searches in the rightward direction to locate the edge 146 of the color block and this is accomplished using the same steps as has been described in blocks 1024 through 1038, with these steps being identified at 1040 in FIG. 23B. Similarly, the routine searches for the top edge 140 shown in FIG. 6 by carrying out the sets identified at 1042 in FIG. 23C followed by a search for the bottom edge 140 which is carried out by the steps identified at 1044 in FIG. 23C. Having identified each of the four boundaries of the color block 136, the routine then calculates the size of the color block (block 1046 in FIG. 23D) and determines whether the block is within desired dimensional limits (block 1048). In other words, the routine determines if a good color block has been identified. If it is within limits (including having a tab on a black block), the routine calculates the center of the block and the size of a search area (block 1050). It calculates the average of the pixels that were found and also upper and lower limits for the color that is being analyzed (block 1052). It then clears the pixel sum and sets up loop counters (block 1054) that will be used in connection with performing the reflective density analysis of the color of the color block.

The routine then starts a vertical loop (block 1056), a horizontal loop (block 1058) and steps to the next pixel (block 1060), inquires whether it is within limits (block 1062) and if so, adds that pixel value into the sum and counts the pixel (block 1064), which ends the horizontal loop (block 1066) and the vertical loop (block 1068). The area that is analyzed from blocks 1056 through 1068 is also shown in FIG. 6 to comprise an area defined by the rectangle 651 that is approximately 40 by 70 pixels in size. If the analysis area 651 has spots such as spots 1072, the pixels in the spots will not be counted into the number of pixels that are counted and their values will not be included. Effectively, the spots are ignored from being averaged. After the total good pixel count has been averaged, the routine determines if the pixel count is greater than 2000 (block 1074).

If there are less than 2000 pixels and are used in the average, the routine sets an error bit 1076 and moves to the edge of the rectangle 1070. It is believed that a pixel count in excess of 2000 is necessary to insure reliable reflective density readings. If the count is greater than 2000, then the analysis is counted (block 1078) and this color is then considered to be found and measured. The results are sent to the FIFO buffer (block 1080).

The routine then makes a general inquiry as to whether any blocks within the color block sets have been found (block 1082) and if yes, was this the first color block (block 1084). If yes, then move left two color blocks (block 1086) or right one color block if not (block 1088). If no color blocks were found, then the analysis is moved one half color block outwardly (block 1090) and the bottom of the horizontal search loop is reached (block 1092). The routine then steps to the next vertical position (block 1094) and the bottom of the vertical loop is reached (block 1096). The ending color block is then sent to the FIFO buffer (block 1098) and the routine ended (block 1100).

Figure 27A:
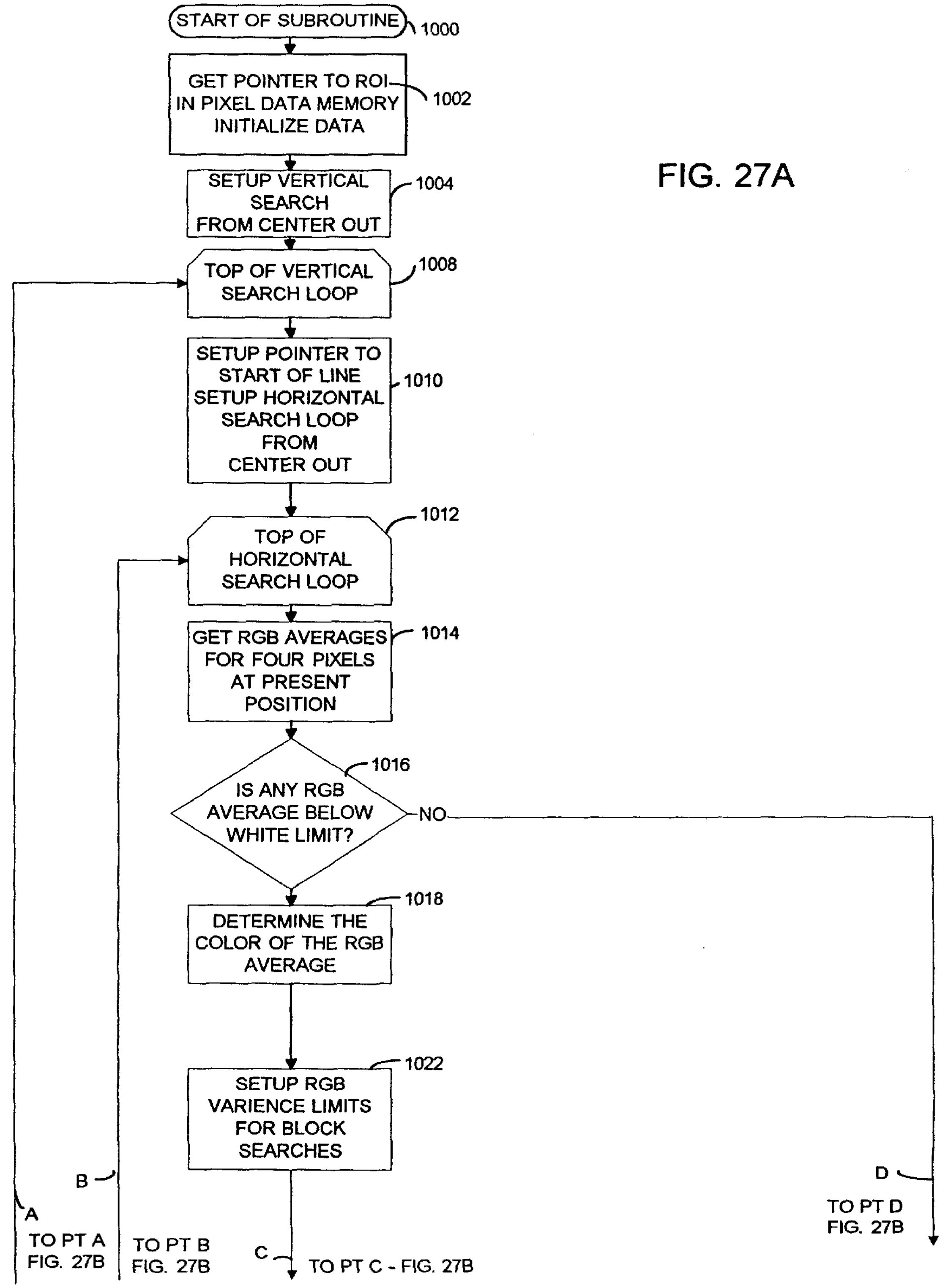
Figure 27B:
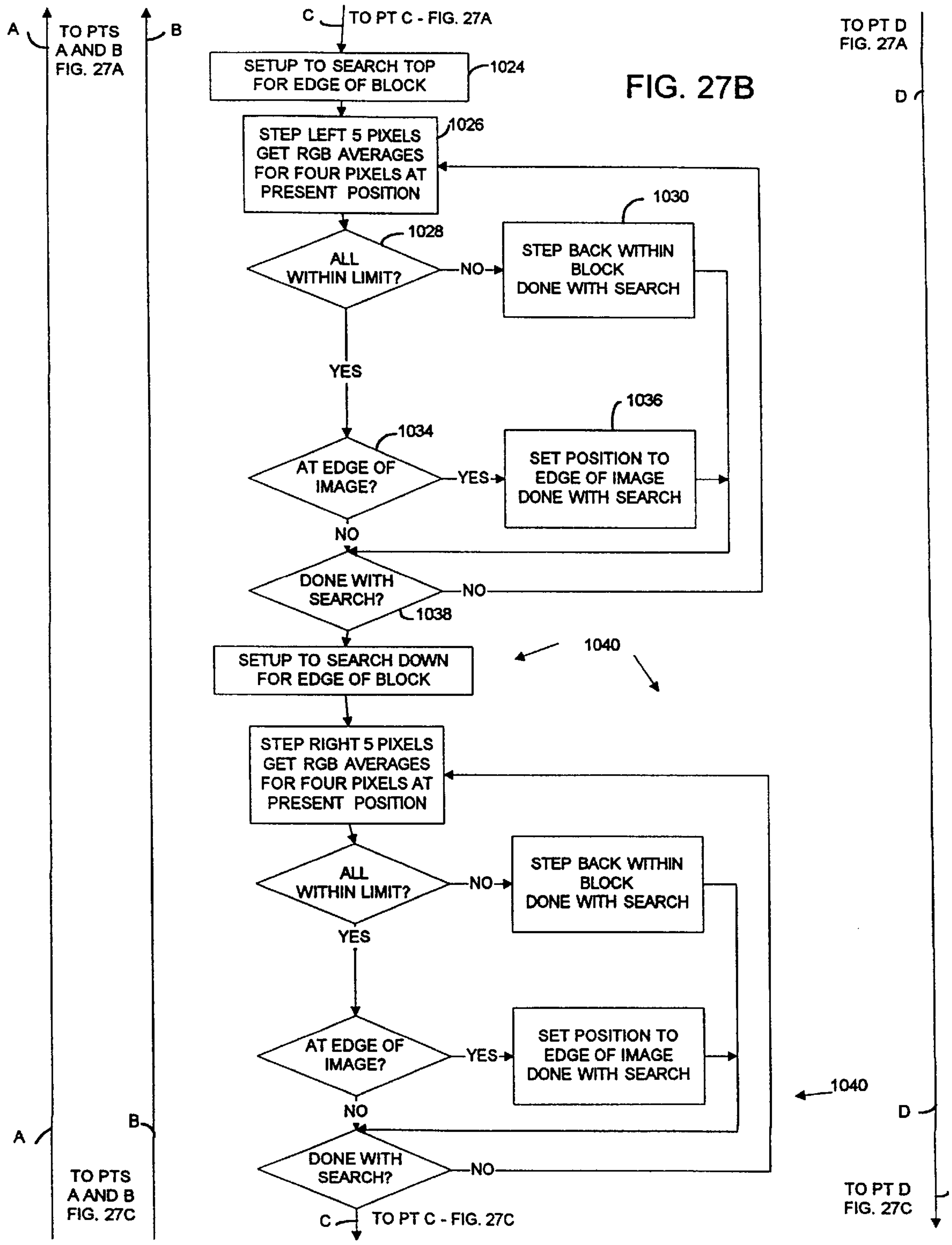
Figure 27C:
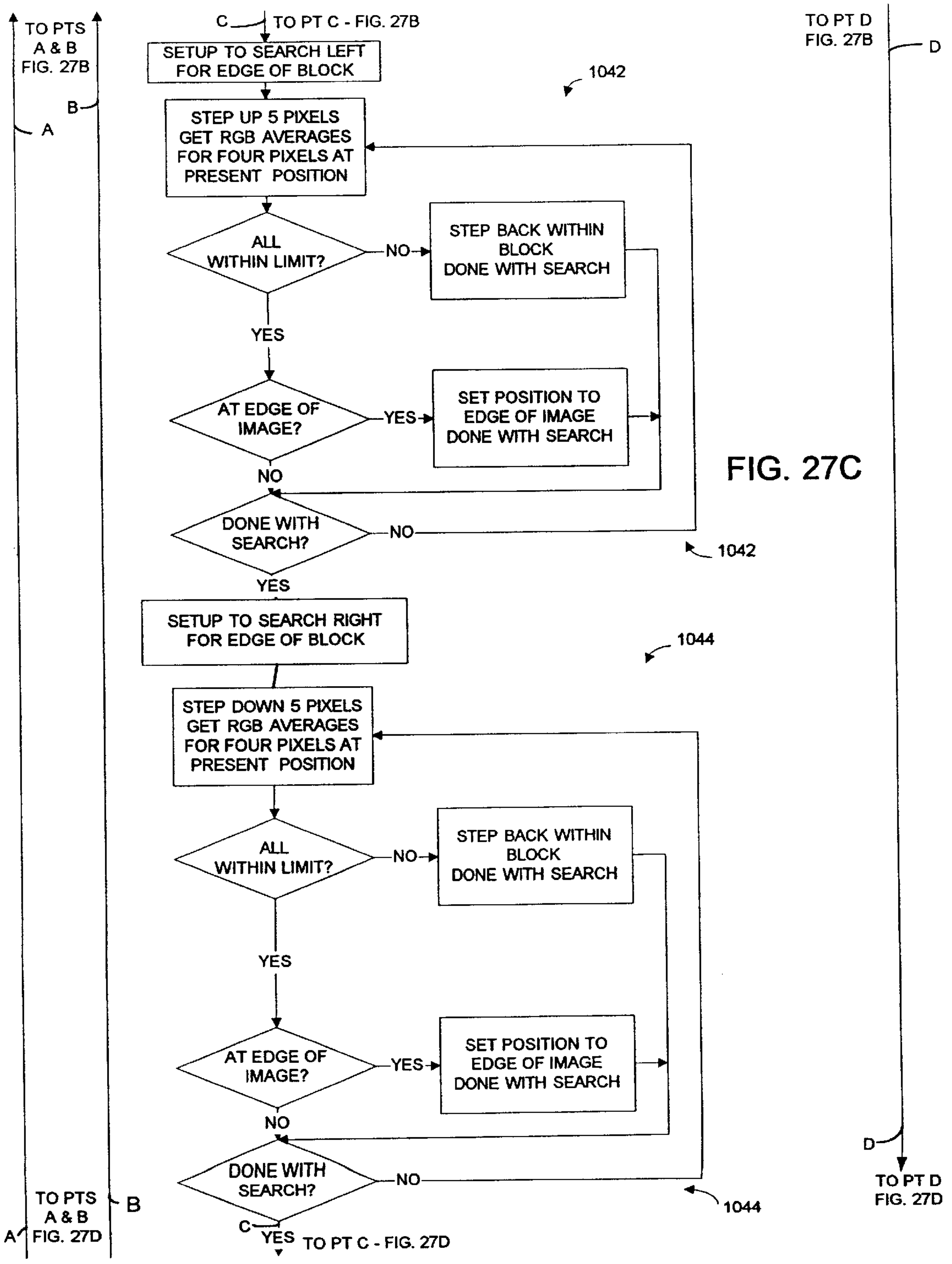
Figure 27D:
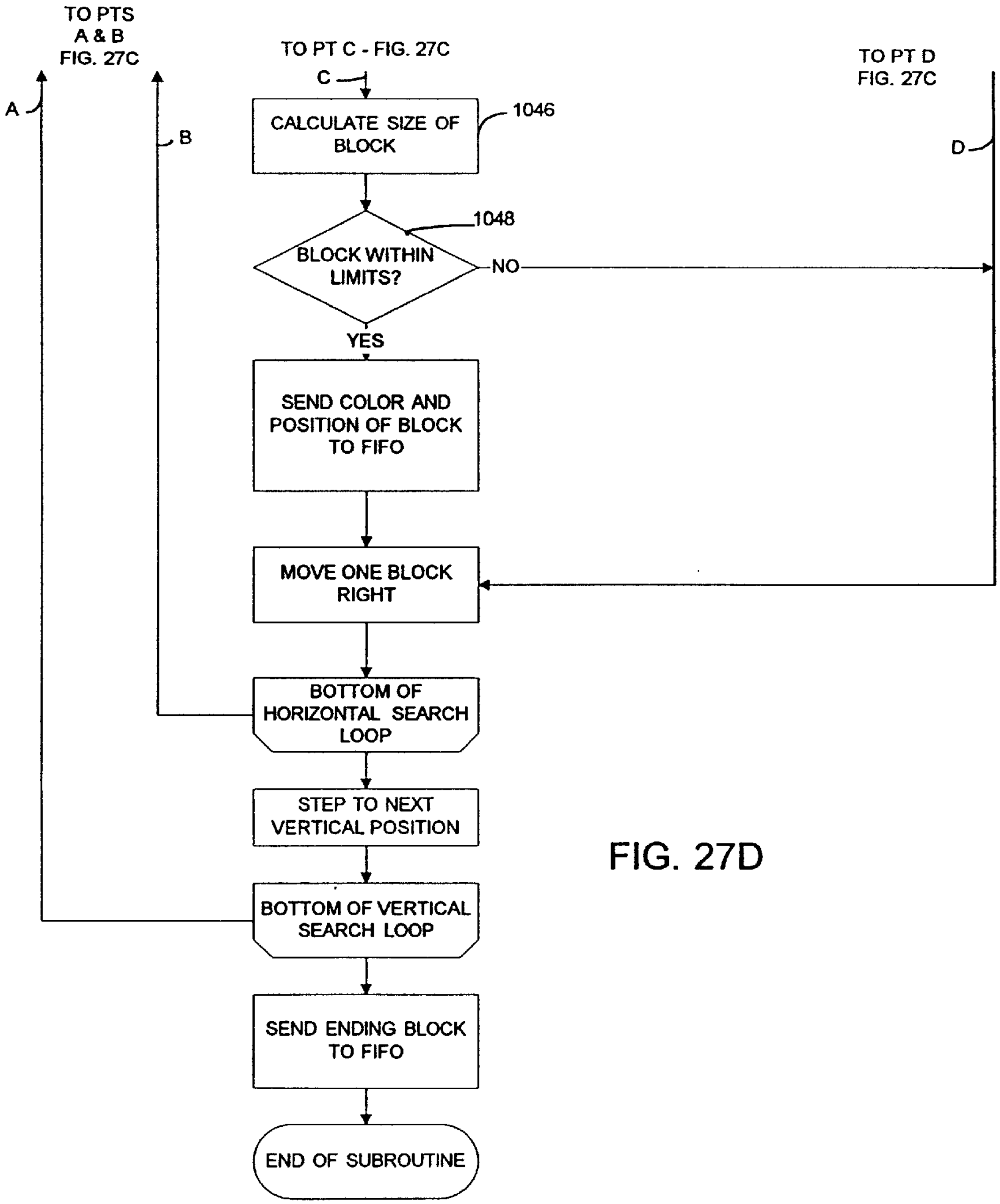

FIGS. 23A through 23E finds the color blocks by starting from the center and working out rather than working across the screen. If it finds one of each color and analyzes it, the reflective density analysis is carried out. Another routine that is very similar to that shown in FIGS. 23A–23E is shown in FIGS. 27A–27D, which operates to locate all color blocks in an image, but does not perform any reflective density analysis. The reference numbers of identical steps of the routine shown in FIGS. 23A–23E are used in FIGS. 27A–27D, and the final steps shown in FIG. 27D are apparent and do not need additional description. The routine of FIGS. 27A–27D is also used by the get edge routine shown in FIGS. 16A through 16C to find the color block set.

The apparatus also utilizes a number of averaging subroutines which are similar to one another. The 300 by 300 pixel averaging routine of FIG. 24 is used in the light discontinuity analysis. Referring to the averaging routine of FIG. 24, it starts at 1110, obtains the pointer through the region of interest in the buffer and clear pixel counters (block 1112), sets up a vertical search from the center out (block 1114) and starts at the top of the vertical search loop (block 1116). The routine sets the pointer to the start of a line and sets the horizontal search loops (block 1118) beginning at the top of the horizontal search loop (block 1120). The routine then sums each RGB channel separately and steps the buffer pointer after each pixel is summed (block 1122) and the routine then reaches the bottom of the horizontal search loop (block 1124) as well as the bottom of the vertical search loop (block 1126) and it sends the results back to the FIFO buffer (block 1128) before ending the subroutine (block 1130).

A routine for averaging any area request is illustrated in FIG. 25 which starts at block 1140 wherein a region of interest as well as horizontal and vertical position and size to be searched is read from the FIFO buffer (block 1142) and the pointer is set to a region of interest in the pixel data memory and the pixel counters cleared (block 1144). The routine then sets up a vertical search (block 1146), goes to the top of the vertical search loop (block 1148), sets up pointers to start a line and sets up the horizontal search loop (block 1150), goes to the top of that horizontal search loop (block 1152), sums each RGB channel separately and steps the buffer pointer as it does so. The routine then reaches the bottom of the horizontal search loop (block 1156) as well as the vertical search loop (block 1158), sends the results back to the FIFO buffer (block 1160) and ends the subroutine (block 1162).

Another averaging subroutine is illustrated in FIG. 26 which is a flow chart that of a subroutine that is used to determine how many pixels are white in the image that is acquired during the light scattering compensation analysis. The subroutine starts at (block 1170) and the FIFO buffer is read to obtain the region of interest (block 1172). The routine then sets the pointer to the region of interest in the pixel data memory (block 1174) and it clears the counters. A vertical search is then set up (block 1176) and the routine proceeds to the top of the vertical search loop (block 1178) followed by setting up a pointer to start at a line and set up a horizontal search loop (block 1180) and proceed to the top of the horizontal search loop (block 1182). The routine then sets up the pointer to a current pixel and sums each RGB channel if its value is above the limit, preferably 120 in intensity (block 1184). The bottom of the horizontal search loop is reached (block 1186) as is the bottom of the vertical search loop (block 1188). The routine then calculates the average values and sends the results to the FIFO buffer (block 1190) and the subroutine has ended (block 1192).

In accordance with another aspect of the present invention, it is comfortable for press operators who have used conventional hand-held densitometers for many years to have a densitometer reading produced by the apparatus of the present invention that is the equivalent of the densitometer reading that would be obtained from the hand-held units. Such a conversion is necessary in the strict sense of providing a reflective density analysis value that is accurate, it can be provided by the equation:

$$\text{Reflective density}=-\text{Log}_{10}[(\text{value}-B_{level})/(W_{level}-B_{level})]$$

where the $B_{level)}$ equals the pixel value for no reflection and the $W_{level)}$ equals the pixel value for 100% reflectance. Since the white level is preferably calibrated to be within the range of 200 to 240 and the black level within the range of 0 to 63, this is for standards that are not perfectly reflective (white) or perfectly nonreflective (black). The values can be further refined to a white level of 242 and a black level of 4, and if this is done, the expression above generally becomes $$\text{Reflective density}=-\text{Log}_{10}[(\text{value}-4)/242]$$

The apparatus reliably produces measurements that are substantially comparable to those produced by an accurately calibrated hand-held densitometer.

While there are many other subroutines which are utilized in the apparatus of the present invention, they are relatively straightforward in their structure and operation and are known to those of ordinary skill in the art and are therefore not set forth in detail herein.

In yet another important aspect of the present invention, and referring to FIG. 11, the nozzle 34 is designed to prevent admission of dust and other particles into the center thereof which could obstruct the lens of the CCD matrix sensor 32 and reduce the number of pixels that would be included in the various analyses that have been described above. The nozzle 34 has a pair of ports 1200 to which a air hoses 1202 are attached, and the hoses are connected to a source of positive air pressure so that air is admitted to the nozzle 34. The nozzle has an internal annular chamber 1204 with an inner wall 1206 which has a number of openings 1208 which direct the air into the center of the nozzle 34. The air is directed toward the main central opening and the openings 1208 are slightly angled relative to the center line of the CCD matrix sensor to create a swirling effect. The air stream thereby tends to restrict entrance of particles into the nozzle where they could reach the lens.

From the foregoing description, it should be understood that an apparatus for determining reflective density of the colors of cyan, magenta, yellow and black in an extremely accurate and reliable manner has been described. The accuracy and reliable operation is due to sophisticated calibration and compensation techniques as well as that are carried out in the digital domain. The apparatus can provide reflective density measurements in real time while the press is running at speeds in excess of 3000 feet per minute and can produce control signals that can be used to control the individual keys of a printing press to provide the desired ink reflective density during operation.

While various embodiments of the present invention have been shown and described, it should be understood that various alternatives, substitutions and equivalents can be used, and the present invention should only be limited by the claims and equivalents of the claims.

Various features of the present invention are set forth in the following claims.

What is claimed is:

1. Apparatus for measuring the reflective density of at least a first color printed on a moving web during operation of a web printing press of the type which has an adjustable ink zone control mechanism for controlling the amount of ink of said first color that is available to be transferred to the web at spaced locations across the width of the press during a printing operation and which has a printing roller which transfers ink to the web, there being a nonprint area that extends in the lateral direction of the web resulting from attachment of printing plates to the printing roller, the press having a color block set on the web generally at each spaced location, the color block set including at least said first color, said apparatus comprising:

means for acquiring a digitized image of predetermined size of the web, said image being comprised of a plurality of individual pixels, each having an intensity value within a predetermined range;

memory means for storing said digitized images;

strobe means for illuminating at least said predetermined area of the web when said strobe means is fired;

means for calibrating said acquiring means to provide predetermined values for high and low light reflectivity levels of said digitized images;

means for measuring the presence and intensity of printed matter located in an acquired digitized image of at least a portion of one of said color block sets, and generating light scattering compensation signals for compensating for the presence of printed matter that affects the measured reflective density of at least said first color;

processing means for analyzing an acquired digitized image of a uniform surface of a standard stored in said memory means, said processing means analyzing a digitized image to determine the intensity of illumination for a plurality of locations throughout said image acquired during the firing of said strobe means, and generating light discontinuity compensation signals for compensating for uneven illumination among said locations;

said processing means being adapted to analyze the digitized images containing at least said first color and produce a reflective density value thereof, said reflective density value having been corrected by said light scattering compensation signals and said light discontinuity compensation signals.

2. Apparatus as defined in claim 1 wherein said acquiring means includes a charge coupled device (CCD) matrix sensor means that is adapted to acquire said digitized image.

3. Apparatus as defined in claim 2 further including carriage means for mounting said CCD matrix sensor means and said strobe means and for moving the same across the width of the web for acquiring digitized images of desired areas of the web.

4. Apparatus as defined in claim 2 further comprising means for measuring the intensity of illumination and color produced by said strobe means during a firing thereof and producing an intensity signal indicative of the measured intensity and color, said processing means using said strobe intensity signal to produce said reflective density that is compensated for variations in strobe firing intensity and color.

5. Apparatus as defined in claim 4 wherein said color block set includes at least one color block of said first color.

6. Apparatus as defined in claim 5 wherein said color block set comprises solid color blocks, screened blocks, combinations of solid and screened blocks, and overprinted solid blocks.

7. Apparatus as defined in claim 5 wherein said memory means includes light scattering compensation data, which if collectively plotted would define a generally asymptotic curve of light scattering compensation signals versus the high reflectivity level of pixels and distance from a color block of interest in the digital image.

8. Apparatus as defined in claim 5 wherein said processing means analyzes substantially all of the pixels of a digitized image of the color block set to determine at least one light scattering compensation signal for the color block set, said processing means calculating said light scattering compensation signal for a block of interest of said color block set.

9. Apparatus as defined in claim 8 wherein said CCD matrix sensor means comprises at least one CCD matrix sensor having a lens and internal means for separating the light passing through the lens into three paths, each respectively containing red, green and blue light, said CCD matrix sensor means thereby having three channels, with each channel providing a digitized image of its color, said processing means analyzing substantially all of the pixels of a digitized image of each of the channels, said processing means thereby storing a light scattering compensation signal for said color block set.

10. Apparatus as defined in claim 2 wherein said CCD matrix sensor means comprises a CCD matrix sensor having a lens and an internal means for separating the light passing through the lens into three paths, each respectively containing red, green and blue light, said CCD matrix sensor means thereby having three channels, with each channel providing an image matrix of its color.

11. Apparatus as defined in claim 1 wherein said strobe means comprises first and second strobe lights located on opposite sides of said CCD matrix sensor means, said first and second strobe lights being directed toward the web to illuminate the area of the web from which the CCD matrix sensor means acquires said digitized image.

12. Apparatus as defined in claim 1 wherein said predetermined size of the web of which said digitized images are acquired are about 0.38 inches by 0.5 inches, and each of said pixels represents about 0.0006 inches of the web.

13. Apparatus as defined in claim 3 wherein said carriage means comprises a rail means extending across the width of the press and carriage structure carrying said CCD matrix sensor means and said strobe means that is moveable on said rail means, and motor means for moving said carriage structure along said rail means responsive to position control signals applied thereto.

14. Apparatus as defined in claim 1 wherein said intensity measuring means comprising at least one photodiode located adjacent said strobe means and adapted to produce a signal proportional to the intensity of the light produced by said strobe means during firing.

15. Apparatus as defined in claim 2 wherein said calibrating means comprises a first standard of predetermined size and high predetermined reflectivity from which said acquiring means can acquire a digitized image of said first standard and a second standard of predetermined size and low predetermined reflectivity from which said acquiring means can acquire a digitized image of said second standard, said processing means being adapted to analyze said digitized images of said standards and generate predetermined values for said first and second standards.

16. Apparatus as defined in claim 15 wherein said CCD matrix sensor means acquires a matrix image comprised of at least approximately 760 by 480 individual pixels, said range of intensity values being from 0 to at least 255 before said predetermined values are generated for said first and second standards.

17. Apparatus as defined in claim 16 wherein said predetermined value for said second standard is within the range of approximately 0 and 63 and said predetermined value for first standard is within the range of approximately 200 and at least 255.

18. Apparatus as defined in claim 15 wherein said processing means generates predetermined values for said first and second standards by calculating an average of the intensity values of a plurality of pixels of said digitized image of said respective first and second standards, said processing means excluding any pixels from the average calculation that have pixel values that are outside of predetermined ranges for said first and second standards.

19. Apparatus as defined in claim 16 wherein said processing means is adapted to identify the location and size of a group of pixels having values that are outside of said predetermined ranges, said group thereby being defined as a blemish, said processing means being adapted to compare the location and size of the blemishes for the images of the first and second standards, and thereby determine that particular blemishes result from contaminants being present on said CCD matrix sensor means or on said standards.

20. Apparatus as defined in claim 15 wherein each of said digitized images is comprised of a plurality of individual pixels, each of which has an intensity value which can vary over a range from near 0 to at least 255, said CCD matrix sensor means acquiring a matrix image of a surface of a highly reflective uniform standard, said apparatus storing the same in said memory means, said processing means examining the intensity value of a plurality of said individual pixels and determining a compensation factor for said pixels which have an intensity value that varies from a uniform intensity value, said compensation factor being proportional to the amount of discontinuity from said uniform intensity value, said compensation factor being stored in said memory means for use by said processing means in producing said reflective density value of said at least first color.

21. Apparatus as defined in claim 20 wherein said CCD matrix sensor means acquires said matrix image of said white standard, said processing means examining each pixel of said image and determining a compensation factor therefor.

22. Apparatus as defined in claim 13 wherein said motor means comprises a stepping motor which moves said carriage structure along said rail means, said processing means providing said position control signals to control said carriage structure so that said CCD matrix sensor means is positioned to acquire an image of the web.

23. Apparatus as defined in claim 2 which is adapted to locate the edge of the moving web during operation, whereby said processing means causes said carriage means to move said CCD matrix sensor means to move to a location on the web near an edge and acquire a matrix image of a portion of the web and activate said acquiring means in conjunction with firing said strobe means, the image being comprised of a matrix of individual pixels each having a low standard deviation of intensity values below a predetermined limit, with the pixels of an image of unprinted web having a low standard deviation of intensity values, the pixels of an image of the web support roller having a high standard deviation of intensity values, and the pixels of a printed web portion having a standard deviation of intensity values generally comparable to the standard deviation of intensity values of the web support roller;

said processing means analyzing said image to determine the existence of low standard deviation of intensity values of the pixels and determining an edge of the web by moving in a direction toward one of said edges and detecting the location of where the pixels cease having said low standard deviation of intensity values, thereby locating the edge of the web;

said processing means causing said carriage means to move said CCD matrix sensor means to move to a location where said acquiring means acquires one or more successive new digitized images in the longitudinal direction of the web in the event low standard deviation of intensity values were determined not to exist in each previous image and analyzing the pixels of the new digitized image generally in the longitudinal direction of the web until low standard deviation of intensity values of the pixels are determined to exist, and thereafter determining the edge of the web by moving in a direction toward one of said edges and detecting the location of where the pixels cease having said low standard deviation of intensity values, thereby locating the edge of the web.

24. Apparatus as defined in claim 2 wherein the web has a plurality of color block sets printed thereon in the lateral direction of the web at predetermined locations, said plurality of color block sets also having been printed at successive locations in the longitudinal direction of the web, said apparatus being adapted to locate the edge of the moving web during operation, whereby said processing means causes said carriage means to move said CCD matrix sensor means to move to a location on the web near an edge and said acquiring means acquires a digitized image of a portion of the web containing a color block set by moving said CCD matrix sensor means to a location on the web where a color block set is located and actuating said CCD matrix sensor means in conjunction with firing a strobe means for illuminating the web during the image acquiring step, the digitized image being comprised of a matrix of individual pixels, each having an intensity value within a predetermined large range, with the pixels of an image of unprinted web having a low standard deviation of intensity values, the pixels of an image of the web support roller having a high standard deviation of intensity values, and the pixels of a printed web portion having a standard deviation of intensity values generally comparable to the standard deviation of intensity values of the web support roller said processing means analyzing said digitized image to determine the location of a color block set;

said processing means causing said carriage means to move said CCD matrix sensor means to a location longitudinally displaced said predetermined longitudinal distance relative to the prior image containing the color block set and causing said acquiring means to acquire a new digitized image, said processing means analyzing the pixels of the new digitized image by moving in a direction toward one of the edges and detecting the location of where the pixels cease having said low standard deviation of intensity values, thereby locating the edge of the web.

25. Apparatus as defined in claim 23 wherein said processing means stores the location of said detected edge, and causes said carriage means to move in the opposite direction and cause said acquiring means to acquire successive digitized images to detect the location of the opposite edge and calculating the distance between said detected edge locations to determine the width of the web.

26. Apparatus as defined in claim 24 wherein said processing means stores the location of said detected edge, and causes said carriage means to move in the opposite direction and cause said acquiring means to acquire successive digitized images to detect the location of the opposite edge and calculating the distance between said detected locations to determine the width of the web.

27. Apparatus as defined in claim 10 wherein said digitized images of each channel are stored in said memory means, said processing means being adapted to analyze each of said digitized images and produce a reflective density value for each of said colors.

28. Apparatus as defined in claim 27 wherein the color block set printed on the web includes a color block of at least each of said three colors, said processing means examining the pixels of the digitized image to locate each of said color blocks and analyze the pixels of each color block to produce a reflective density value for each color.

29. Apparatus as defined in claim 28 wherein said processing means analyzes each digitized image from said three channels, each channel being adapted to analyze a specified one of said colors, said processing means locating a color block having the same color as the specified channel color by detecting the intensity value thereof, the intensity value of a color block having the same color as the channel color being low relative to a color block that is different from the channel color.

30. Apparatus as defined in claim 29 wherein said processing means analyzes said digitized image of said color block set to locate said color block, said processing means examining the pixels of said image to locate a group of pixels having said low intensity value, examining pixels in each direction vertically and horizontally until low intensity pixels cease to exist, thereby defining the coordinates of the outer periphery of one of said color blocks, examining each of a predetermined number of pixels from the interior of said color block to determine if the intensity value thereof is within predefined limits and averaging the intensity values for all of said pixels that are within said limits, to thereby produce an uncompensated reflective density value.

31. Apparatus as defined in claim 30 wherein said processing means discards said uncompensated reflective density value when the total number of pixels included in the averaging is below a predetermined limit.

32. Apparatus as defined in claim 31 wherein said predetermined number of pixels that are examined is approximately 2800 and said predetermined limit of total number of pixels averaged is approximately 2000.

33. Apparatus as defined in claim 30 wherein said processing means calculates the size of the color block and determines that it is within acceptable limits, and terminates the analysis of the color block if it is outside of acceptable limits.

34. Apparatus as defined in claim 1 wherein said reflective density value is stored in said memory means and is adapted to be read out together with other data relating to a printing job by the press.

35. Apparatus as defined in claim 34 wherein said other data comprises the date, press identification data, job identification data, and the number of the press run for which the reflective density values were produced.

36. Apparatus as defined in claim 2 wherein said memory means is adapted to simultaneously store at least two digitized images, said processing means controlling said CCD matrix sensor means, strobe means and carriage means so that a successive image is acquired by said acquiring means and is stored in said memory means while said processing means is analyzing a prior acquired digitized image to produce said reflective density value for said first color.

37. Apparatus as defined in claim 36 wherein said processing means controls said carriage means so that it is positioned laterally away from one of the edges of said web and is accelerated to a predetermined speed before it reaches said edge so that it traverses the width of the web while said CCD matrix sensor means is acquiring a matrix image of each of the color block sets at each location on successive revolutions of said printing roller.

38. Apparatus as defined in claim 37 wherein each reflective density analysis requires about 70 milliseconds.

39. Apparatus as defined in claim 10 further including a generally sealed housing means mounted to said carriage means for containing said CCD matrix sensor means, said housing means including a nozzle means having a light admitting opening aligned with said lens of said CCD matrix sensor means, said nozzle means including means for admitting air near said lens and directing the air toward the opening for preventing dust and the like from entering the opening.

40. Apparatus as defined in claim 39 further including connecting means for transmitting air from a source of positive air pressure to said nozzle means.

41. Apparatus as defined in claim 1 wherein said color block set includes color blocks of cyan, yellow, magenta and black located adjacent one another.

42. Apparatus for measuring the reflective density of at least a first color printed on a moving web during operation of a web printing press of the type which has an adjustable ink zone control mechanism for controlling the amount of ink of said first color that is available to be transferred to the web at spaced locations across the width of the press during a printing operation and which has a printing roller which transfers ink to the web, there being a nonprint area that extends in the lateral direction of the web, the nonprint area resulting from attachment of printing plates to the printing roller, the press having a color block set on the web generally at each spaced location, the color block set including at least said first color, said apparatus comprising:

a multiple CCD matrix sensor for acquiring a matrix image of the web of predetermined size;

means for digitizing said image so that it is comprised of a large number of individual pixels, each of which can have an intensity value within a predetermined range, memory means for storing at least one digitized image;

strobe means for illuminating the web when said strobe means is fired in response to strobe control signals being applied thereto;

carriage means for mounting said CCD matrix sensor and said strobe means and for moving the same across the width of the web for acquiring digitized images of desired areas of the web in response to position control signals being applied thereto;

means for calibrating said CCD matrix sensor means and said digitizing means to provide respective predetermined values for high and low light reflectivity levels of said digitized images;

means for measuring the presence and intensity of printed matter located in an acquired digitized image of a color block set, and generating a light scattering compensation signal for compensating for the presence of printed matter that affects the measured reflective density of at least said one color;

processing means for analyzing said digitized images acquired by said CCD matrix sensor means and stored in said memory means;

said processing means analyzing a digitized image of a uniform highly reflective surface produced by the firing of said strobe means to determine the intensity and color of illumination at a plurality of locations throughout said image of predetermined size and generating light discontinuity compensation signals for compensating for discontinuities of illumination at said locations where said intensity is determined;

said processing means being adapted to analyze the digitized images of said color block sets and utilizing said light scattering compensation signals and said light discontinuity compensation signals, produce a reflective density value of said at least first color that is compensated for light scattering and light discontinuity.

43. Apparatus as defined in claim 42 further including means for measuring the intensity and color of illumination produced by said strobe means during a firing thereof and producing an intensity signal indicative of the measured intensity and color, said processing means utilizing said intensity signal to produce a reflective density value that is also compensated for variations of strobe light intensity and color.

44. Apparatus for measuring the reflective density of at least one color block printed on a moving web having a predetermined width during operation of a web printing press of the type which has an adjustable ink zone control mechanism for controlling the amount of ink of said first color that is available to be transferred to the web at spaced locations across the width of the press during a printing operation and which has a printing roller which applies ink on the web, said press having printed a color block set on the web at predetermined locations relative to each ink zone control mechanism spaced location, the color block set at least including the color block of said first color, said apparatus comprising:

a multiple CCD matrix sensor for acquiring a matrix image of the web of predetermined size;

means for digitizing said image so that it is comprised of a large number of individual pixels, each of which can have an intensity value within a predetermined range;

memory means for storing at least one digitized image;

strobe means for illuminating the web when said strobe means is fired in response to strobe control signals being applied thereto;

carriage means for mounting said CCD matrix sensor and said strobe means and for moving the same across the width of the web for acquiring digitized images of desired areas of the web in response to position control signals being applied thereto;

means for calibrating said CCD matrix sensor means and said digitizing means to provide predetermined values for high and low light reflectivity levels of said digitized images;

means for measuring the presence and intensity of printed matter located in an acquired digitized image of a color block set, and generating a light scattering compensation signal for compensating for the presence of printed matter that affects the measured reflective density of at least said first color;

processing means for analyzing said digitized images and stored in said memory means;

said processing means being adapted to analyze the digitized images of said color block sets and utilize said light scattering compensation signals to produce a reflective density value of said at least first color that is compensated for light scattering.

45. Apparatus as defined in claim 44 wherein said processing means analyzes a digitized image of a uniform surface to determine the intensity and color of illumination at a plurality of locations throughout said image produced during the firing of said strobe means and generating light discontinuity compensation signals for compensating for discontinuities of illumination at said locations where said intensity is determined, said processing means utilizing said light discontinuity compensation signals to produce a reflective density value that is compensated for light discontinuities.

46. A method for determining the reflective density value of ink of at least a color block of a first color printed on a moving web having a predetermined width during operation of a web printing press of the type which has an adjustable ink zone control mechanism for controlling the amount of ink of said first color that is available to be transferred to the web at spaced locations across the width of the press during a printing operation and which has a printing roller which applies ink on the web, there being a nonprint area that extends in the lateral direction of the web resulting from attachment of printing plates to the printing roller, said press having printed a color block set on the web at predetermined locations relative to each ink zone control mechanism spaced location, the color block set including the color block of said first color, said method comprising:

acquiring a matrix image of the color block set by activating a CCD matrix sensor and a strobe means at a portion of the web containing the color block set;

digitizing said matrix image to produce a digitized image, said digitized image being comprised of a large plurality of individual pixels, each pixel having an intensity value within a predetermined range;

identifying the pixels of said color block and analyzing a predetermined number of said color block pixels to determine valid pixels, said pixels being valid when their associated intensity values are below a predetermined threshold;

adjusting the intensity values of each of said valid pixels to compensate for discontinuities in the total amount of light produced by the strobe means during the acquiring of the image;

adjusting the intensity values of each of said valid pixels to compensate for light scattering effects that are influenced by the existence and nature of printed matter within the image adjacent to the color block set; and, averaging the adjusted intensity values of said predetermined number of valid pixels to produce said reflective density value.

47. A method as defined in claim 46 wherein said large plurality of pixels comprises approximately 480 rows of 780 pixels, substantially all of said pixels having an intensity value within the predetermined range of about 0 to 255.

48. A method as defined in claim 46 wherein said predetermined number is approximately 2000.

49. A method as defined in claim 46 wherein said predetermined threshold is in the lower half of said predetermined range.

50. A method for determining the edge of a moving web during operation of a web printing press, said press being of the type which has a printing roller which transfers ink to the web, there being a nonprint area in printing that extends in the lateral direction of the web because of the attachment of a printing plate to the roller, said method comprising the steps of:

acquiring a digitized image of a portion of the web by moving a CCD matrix sensor means to a location on the web near an edge and activating the CCD matrix sensor means in conjunction with firing a strobe means for illuminating the web during the image acquiring step, the image being comprised of a matrix of individual pixels each having an intensity value within a predetermined large range, with the pixels of an image of unprinted web having a low standard deviation of intensity values, the pixels of an image of the web support roller having a high standard deviation of intensity values, and the pixels of a printed web portion having a standard deviation of intensity values generally comparable to the standard deviation of intensity values of the web support roller;

analyzing said image to determine the existence of low standard deviation of intensity value of the pixels and determining the edge of the web by moving in a direction toward one of the edges and detecting the location of where the pixels cease having said low standard deviation of intensity values, thereby locating the edge of the web, acquiring one or more successive new images in the longitudinal direction of the web in the event low standard deviation of intensity value were determined not to exist in each previous image and analyzing the pixels of the new image generally in the longitudinal direction of the web until low standard deviation of intensity value of the pixels are determined to exist, and thereafter determining the edge of the web by moving in a direction toward one of the edges and detecting the location of where the pixels cease having said low standard deviation of intensity values, thereby locating the edge of the web.

51. A method for determining the edge of a moving web during operation of a web printing press, wherein the web has a plurality of color block sets printed thereon in the lateral direction of the web at predetermined locations, said plurality of color block sets also having been printed at successive locations in the longitudinal direction of the web, the color block sets including a color block of at least a first color, the press being of the type which has a printing roller which transfers ink to the web, there being a nonprint area in printing that extends in the lateral direction of the web because of the attachment of a printing plate to the printing roller, the nonprint area being a predetermined longitudinal distance from said plurality of predetermined color block set locations, said method comprising the steps of:

acquiring a digitized image of a portion of the web containing a color block set by moving a CCD matrix sensor means to a location on the web where a color block set is located and activating the CCD matrix sensor means in conjunction with firing a strobe means for illuminating the web during the image acquiring step, the image being comprised of a matrix of individual pixels each having a standard deviation of intensity values within a predetermined large range, with the pixels of an image of unprinted web having a low standard deviation of intensity values, the pixels of an image of the web support roller having a standard deviation of intensity values less than that of the unprinted web, and the pixels of a printed web portion having a standard deviation of intensity values generally comparable to the standard deviation of intensity value of the web support roller;

analyzing said image to determine the location of a color block set;

acquiring a new image longitudinally displaced said predetermined longitudinal distance relative to the prior image containing the color block set and analyzing the pixels of the new image by moving in a direction toward one of the edges and detecting the location of where the pixels cease having said low standard deviation of intensity values, thereby locating the edge of the web.

52. A method for measuring the reflective density of at least a first color printed on a moving web during operation of a web printing press, said press having printed a color block set on the web, the color block set including a sample of said first color, said method comprising the steps of:

acquiring a digitized image of a highly reflective standard by moving a CCD matrix sensor means to a location where said highly reflective standard is located, acquiring a matrix image thereof, digitizing the matrix image and generating a predetermined reflectivity value therefor;

acquiring a digitized image of a highly nonreflective standard by moving a CCD matrix sensor means to a location where said highly nonreflective standard is located, acquiring a matrix image thereof, digitizing the matrix image and generating a predetermined reflectivity value therefor;

analyzing said acquired digitized image of said reflective standard by measuring the pixel values at a plurality of locations throughout said acquired image and generating light discontinuity compensation signals for compensating for discontinuities of illumination at said locations where said values are measured;

acquiring a digitized image of a portion of the web by moving a CCD matrix sensor means to a location on the web where the color block set is printed and activating the CCD matrix sensor means in conjunction with firing a strobe means for illuminating the color block set during the image acquiring step, acquiring a matrix image thereof, digitizing the matrix image;

storing the digitized images of said color block set in a memory means;

measuring the intensity of illumination produced by said strobe means during a firing thereof and producing an intensity signal indicative of the intensity and color measured;

measuring the presence and intensity of printed matter located in an acquired digitized image having a color block set, and generating a light scattering compensation signal for compensating for any light scattering effects that are influenced by the presence and nature of printed matter in the image that affects the measured reflective density of at least said first color in the image;

analyzing the stored digitized images of said color block sets and producing a reflective density value of at least said first color, said reflective density value having been compensated for by said strobe intensity and color signals, said light scattering compensation signals and said light discontinuity compensation signals.

53. Apparatus for measuring the reflective density of at least a first color of a color block set printed on a moving web during operation of a web printing press, said apparatus comprising:

means for acquiring a digitized image of predetermined size of the web, said image being comprised of a plurality of individual pixels;

memory means for storing said digitized images;

strobe means for illuminating at least said predetermined area of the web when said strobe means is fired;

means for calibrating said acquiring means to provide predetermined values for high and low light reflectivity levels of said digitized images;

processing means for analyzing said digitized images containing at least said first color and produce a reflective density value thereof.

54. Apparatus as defined in claim 36 wherein said memory means is adapted to store an image of an area other than the area that contains the color block sets, said apparatus further including monitor means for displaying selected images for an operator.

55. A printed target pattern for printing on a test print area of an elongated web by a web printing press, said pattern being adapted for use in determining a print contrast value of ink printed on the web, said target pattern comprising:

a solid print area;

a nonsolid generally uniformly screened print area having ink printed thereon which covers a percentage of said nonsolid print area, said percentage being within a predetermined range;

wherein said solid print area and said nonsolid print area are positioned adjacent one another substantially in the longitudinal direction of the web.

56. A pattern as defined in claim 55 wherein said predetermined range is approximately 70 to 80 percent.

57. Apparatus for measuring the reflective density of a block of predetermined size and color printed on a moving web of a web printing press, said apparatus comprising:

means for acquiring a digitized matrix image of a predetermined size of the moving web including said block, said digitized image being comprised of a plurality of individual pixels having an intensity value within a first predetermined range;

means for analyzing said image to determine that said image contains a first predetermined number of pixels of said block to comprise a valid block, said analyzing means analyzing said pixels of said valid block to determine the reflective intensity thereof.

58. Apparatus as defined in claim 57 wherein a said valid block comprises a first predetermined number of pixels having intensity values within a second predetermined range within said first predetermined range.

59. Apparatus as defined in claim 57 wherein said analyzing means analyzes said pixels of said block to determine the size and shape of said block to determine that said block is valid.

* * * * *

UNITED STATES PATENT AND TRADEMARK OFFICE

CERTIFICATE OF CORRECTION

PATENT NO. : 6,058,201
DATED : May 2, 2000
INVENTOR(S) : Sikes et al.

It is certified that error appears in the above-identified patent and that said Letters Patent is hereby corrected as shown below:

<u>Column 9</u>,
Line 23, after "0.0006" insert -- inches --.
Line 24, delete "inches".

Signed and Sealed this

Twenty-fifth Day of December, 2001

*Attest:*

JAMES E. ROGAN
*Director of the United States Patent and Trademark Office*

*Attesting Officer*